(12) United States Patent
Laramie et al.

(10) Patent No.: US 12,341,181 B2
(45) Date of Patent: Jun. 24, 2025

(54) SYSTEMS AND METHODS FOR FABRICATING LITHIUM METAL ELECTRODES

(71) Applicant: Sion Power Corporation, Tucson, AZ (US)

(72) Inventors: Michael G. Laramie, Tucson, AZ (US); David Child, Tucson, AZ (US); Dominic Weinstock, Tucson, AZ (US)

(73) Assignee: Sion Power Corporation, Tucson, AZ (US)

(*) Notice: Subject to any disclaimer, the term of this patent is extended or adjusted under 35 U.S.C. 154(b) by 593 days.

(21) Appl. No.: 17/125,124

(22) Filed: Dec. 17, 2020

(65) Prior Publication Data
US 2021/0193984 A1    Jun. 24, 2021

Related U.S. Application Data

(60) Provisional application No. 62/952,204, filed on Dec. 20, 2019, provisional application No. 62/952,206, filed on Dec. 20, 2019, provisional application No. 62/952,197, filed on Dec. 20, 2019.

(51) Int. Cl.

| | | |
|---|---|---|
| H01M 4/04 | (2006.01) |
| H01M 4/134 | (2010.01) |
| H01M 4/1395 | (2010.01) |
| H01M 4/36 | (2006.01) |
| H01M 4/38 | (2006.01) |
| H01M 10/052 | (2010.01) |
| H01M 4/02 | (2006.01) |

(52) U.S. Cl.
CPC ....... *H01M 4/0428* (2013.01); *H01M 4/0409* (2013.01); *H01M 4/134* (2013.01); *H01M 4/1395* (2013.01); *H01M 4/366* (2013.01); *H01M 4/382* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | Jonghe et al. |
| 4,917,974 A | 4/1990 | De Jonghe et al. |

(Continued)

FOREIGN PATENT DOCUMENTS

| | | |
|---|---|---|
| CN | 207441857 U | 6/2018 |
| CN | 105006558 A | 10/2018 |

(Continued)

OTHER PUBLICATIONS

International Search Report and Written Opinion for International Application No. PCT/US2020/065584 mailed Jun. 24, 2021.

(Continued)

*Primary Examiner* — Tracy M Dove
(74) *Attorney, Agent, or Firm* — Wolf, Greenfield & Sacks, P.C.

(57) ABSTRACT

Lithium metal electrodes, modular lithium deposition systems, and associated articles and methods are generally described.

18 Claims, 32 Drawing Sheets

(56) References Cited

U.S. PATENT DOCUMENTS

| | | |
|---|---|---|
| 5,162,175 A | 11/1992 | Visco et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,183,901 B1 | 2/2001 | Ying et al. |
| 6,201,100 B1 | 3/2001 | Gorkovenko et al. |
| 6,238,821 B1 | 5/2001 | Mukherjee et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,808,901 B2 | 8/2014 | Wang et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,249,502 B2 | 2/2016 | Albano et al. |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0206992 A1 | 8/2011 | Campbell et al. |
| 2011/0256450 A1 | 10/2011 | Campbell et al. |
| 2011/0294005 A1 | 12/2011 | Kuriki et al. |
| 2012/0040233 A1* | 2/2012 | Kim ............... H01M 6/40 429/162 |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0122318 A1 | 5/2013 | Wietelmann |
| 2013/0177808 A1 | 7/2013 | Wang et al. |
| 2013/0260024 A1 | 10/2013 | Jodin et al. |
| 2013/0316072 A1 | 11/2013 | Scordilis-Kelley et al. |
| 2014/0123477 A1 | 5/2014 | Safont Sempere et al. |
| 2014/0272565 A1 | 9/2014 | Gronwald et al. |
| 2014/0272594 A1 | 9/2014 | Safont Sempere et al. |
| 2014/0272595 A1 | 9/2014 | Cristadoro et al. |
| 2014/0272597 A1 | 9/2014 | Mikhaylik et al. |
| 2015/0162586 A1 | 6/2015 | Fleischmann et al. |
| 2015/0188194 A1 | 7/2015 | Mikhaylik et al. |
| 2015/0221973 A1 | 8/2015 | Upaddhyaya et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0344067 A1 | 11/2016 | Laramie et al. |
| 2016/0359161 A1 | 12/2016 | Nozue et al. |
| 2017/0141385 A1 | 5/2017 | Scordilis-Kelley et al. |
| 2017/0141402 A1 | 5/2017 | Affinito et al. |
| 2018/0006303 A1 | 1/2018 | Mikhaylik et al. |
| 2018/0115021 A1 | 4/2018 | Lee et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0351148 A1 | 12/2018 | Schneider et al. |

(56) References Cited

U.S. PATENT DOCUMENTS

| | | |
|---|---|---|
| 2018/0351158 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0237810 A1 | 8/2019 | Visco et al. |
| 2019/0267632 A1 | 8/2019 | Affinito et al. |
| 2019/0341618 A1 | 11/2019 | Mane et al. |
| 2019/0348668 A1 | 11/2019 | Kim et al. |
| 2019/0348672 A1 | 11/2019 | Wang et al. |
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0099108 A1 | 3/2020 | Laramie et al. |
| 2020/0119324 A1 | 4/2020 | Laramie et al. |
| 2020/0144594 A1 | 5/2020 | Metzger et al. |
| 2020/0185764 A1 | 6/2020 | Liao et al. |
| 2020/0194773 A1 | 6/2020 | Zankowski et al. |
| 2020/0194822 A1 | 6/2020 | Laramie et al. |
| 2020/0208265 A1 | 7/2020 | Hsieh et al. |
| 2020/0212447 A1 | 7/2020 | Woo et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0227785 A1 | 7/2020 | Mikhaylik et al. |
| 2020/0235420 A1 | 7/2020 | Yushin et al. |
| 2020/0243824 A1 | 7/2020 | Wang et al. |
| 2020/0259341 A1 | 8/2020 | Mikhaylik et al. |
| 2020/0313225 A1 | 10/2020 | Scordilis-Kelley et al. |
| 2020/0343533 A1 | 10/2020 | Herle |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2021/0050593 A1 | 2/2021 | Brewer et al. |
| 2021/0104723 A1 | 4/2021 | Chae et al. |
| 2021/0193985 A1 | 6/2021 | Laramie et al. |
| 2021/0193996 A1 | 6/2021 | Laramie et al. |
| 2023/0069989 A1 | 3/2023 | Laramie et al. |

FOREIGN PATENT DOCUMENTS

| | | |
|---|---|---|
| JP | 2005-158633 A | 6/2005 |
| JP | 2008-019458 A | 1/2008 |
| KR | 2016-0037636 A | 4/2016 |
| KR | 2017-0011357 A | 2/2017 |
| WO | WO 99/33130 A1 | 7/1999 |
| WO | WO 2018/148518 A1 | 8/2018 |
| WO | WO 2019/117669 A1 | 6/2019 |

OTHER PUBLICATIONS

[No Author Listed], Böhler W360 ISOBLOC Product Brochure. Böhler. Kapfenberg, Austria. Feb. 2004:12 pages.

Anders, A Structure Zone Diagram Including Plasma Based Deposition and Ion Etching. Thin Solid Films. May 2010;518(15):4087-90.

Brunauer et al., Adsorption of Gases in Multimolecular Layers. J. Am. Chem. Soc. Feb. 1938;60:309-19.

Fisher et al., New Tool Steel for Warm and Hot Forging. 6th International Tooling Conference. Karlstad University. Sep. 2002:129-39.

U.S. Appl. No. 17/125,070, filed Dec. 17, 2020, Laramie et al.

U.S. Appl. No. 17/125,110, filed Dec. 17, 2020, Laramie et al.

Extended European Search Report for EP Application No. 22207061.7 dated Apr. 5, 2023.

Brewer et al., Anodes for Lithium-Based Energy Storage Devices. U.S. Appl. No. 62/886,177, filed Aug. 13, 2019.

Hafez et al., Stable Metal Anode enabled by Porous Lithium Foam with Superior Ion Accessibility. Adv Mater. Jul. 2018;30(30):e1802156. doi: 10.1002/adma.201802156. Epub Jun. 14, 2018.

Partial Supplementary European Search Report for EP Application No. 20904217.5 dated Feb. 2, 2024.

Extended European Search Report for EP Application No. 20904217.5 dated Jun. 20, 2024.

* cited by examiner

SYSTEMS AND METHODS FOR FABRICATING LITHIUM METAL ELECTRODES

RELATED APPLICATIONS

This application claims priority under 35 U.S.C. § 119(e) to U.S. Provisional Application No. 62/952,206, filed Dec. 20, 2019, and entitled "Lithium Metal Electrodes", to U.S. Provisional Application No. 62/952,197, filed Dec. 20, 2019, and entitled "Lithium Metal Electrodes and Methods", and to U.S. Provisional Application No. 62/952,204, filed Dec. 20, 2019, and entitled "Systems and Methods for Fabricating Lithium Metal Electrodes", each of which is incorporated herein by reference in its entirety.

FIELD

The present disclosure relates generally to lithium metal electrodes, modular lithium deposition systems, and associated articles and methods.

BACKGROUND

Lithium metal electrodes are desirable for use in lithium batteries because they have a high energy density. However, lithium metal electrodes are often prone to undergoing undesirable reactions during electrochemical cell fabrication and cycling. Accordingly, improved lithium metal electrodes, modular lithium deposition systems, and associated articles and methods are needed.

SUMMARY

The present disclosure relates generally to lithium metal electrodes, modular lithium deposition systems, and associated articles and methods. The subject matter disclosed herein involves, in some cases, interrelated products, alternative solutions to a particular problem, and/or a plurality of different uses of one or more systems and/or articles.

In some embodiments, an article for inclusion in an electrochemical cell is provided. The article for inclusion in an electrochemical cell comprises a layer comprising lithium metal and a passivating layer disposed on the layer comprising lithium metal. The passivating layer comprises boron, phosphorus, antimony, selenium tellurium, hydrogen, and/or a halogen.

In some embodiments, an article for inclusion in an electrochemical cell comprises a layer comprising lithium metal and a passivating layer disposed on the layer comprising lithium metal. The passivating layer comprises a plurality of columnar structures having an aspect ratio of greater than or equal to 0.5 and less than or equal to 5.

In some embodiments, an article for inclusion in an electrochemical cell comprises an electroactive layer comprising lithium metal. The layer is porous. The layer further comprises boron, phosphorus, antimony, selenium tellurium, hydrogen, and/or a halogen.

In some embodiments, a method is provided. The method comprises exposing a layer comprising lithium metal to a gas to form a passivating layer disposed thereon. The gas comprises a species comprising boron, phosphorus, antimony, selenium, tellurium, hydrogen, and/or a halogen.

In some embodiments, a method comprises exposing a layer comprising lithium metal to a gas to form a passivating layer disposed thereon. The passivating layer comprises a plurality of columns having an aspect ratio of greater than or equal to 0.5 and less than or equal to 1.

In some embodiments, a method comprises depositing an electroactive layer from a plurality of gases. The electroactive layer is porous, the plurality of gases comprises lithium, and the plurality of gases comprises a species comprising boron, phosphorus, antimony, selenium, tellurium, hydrogen, and/or a halogen.

In some embodiments, a method comprises depositing a layer comprising lithium and/or a reaction product thereof onto a first portion of a substrate in a first module in a modular lithium deposition system. The layer comprising lithium metal and/or the reaction product thereof is deposited from a gas, a second portion of the substrate in a second module is not exposed to the gas, and the modular lithium deposition system further comprises a lithium metal source and a roll-to-roll handling system passing through the first and second modules.

In some embodiments, a method comprises depositing a layer comprising lithium onto a substrate from a first lithium metal source and depositing lithium metal onto the first layer comprising lithium metal from a second lithium metal source to form a final layer comprising lithium metal. The first lithium metal source is contained in a first container, the second lithium metal source is contained in a second container, the final layer comprising lithium metal has a lower variation in thickness in the cross-web direction than the first layer comprising lithium metal, and the method is performed in a vacuum chamber positioned in a modular lithium deposition system further comprising a roll-to-roll handling system passing through the vacuum chamber.

Some embodiments relate to modular lithium deposition systems. In some embodiments, a modular lithium deposition system comprises a first module, a second module, a lithium source, and a roll-to-roll handling system passing through the first module and the second module. The first and second modules are configured to be reversibly placed in fluidic communication with each other.

In some embodiments, a modular lithium deposition system comprises a plurality of modules, a lithium source, and a roll-to-roll handling system passing through the plurality of modules. The roll-to-roll handling system comprises a plurality of drums configured to translate a substrate through the plurality of modules, each drum in the plurality of drums is in thermal communication with a cooling system, and the cooling system is configured to maintain each drum in the plurality of drums at a temperature of greater than or equal to −35° C. and less than or equal to 60° C.

In some embodiments, a modular lithium deposition system comprises a vacuum chamber, a lithium metal source, and a roll-to-roll handling system passing through the vacuum chamber. The lithium metal source is contained in a container, the container comprises a cooling system comprising a plurality of cooling channels arranged within one or more walls of the container, and the cooling channels are configured to cool an exterior surface of the container to a temperature of less than or equal to 50° C. and greater than or equal to 15° C.

In some embodiments, a modular lithium deposition system comprises a vacuum chamber, a lithium metal source, and a roll-to-roll handling system passing through the vacuum chamber. The lithium metal source is contained in a container comprising a shutter and the shutter is configured to reversibly place the vacuum chamber and an interior of the container containing lithium in fluidic communication with each other.

In some embodiments, a modular lithium deposition system comprises a plurality of modules, a plurality of lithium metal sources, a plurality of wire feed systems, and a roll-to-roll handling system passing through the plurality of modules. The plurality of lithium metal sources is disposed in a plurality of crucibles in thermal communication with a heating system. Each wire feed system is configured to feed a wire comprising lithium into one of the plurality of crucibles.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
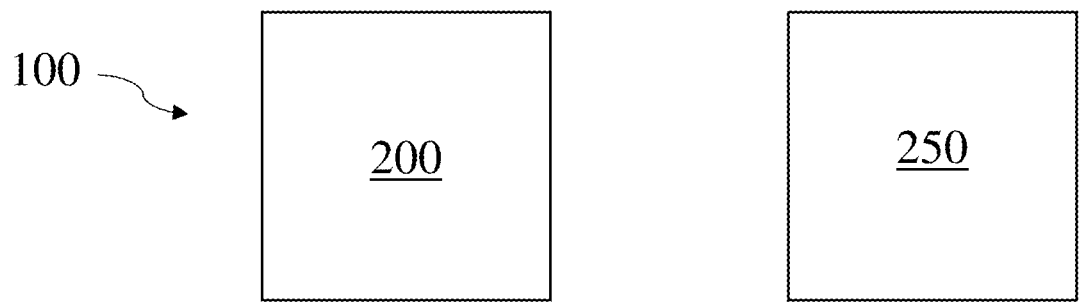
FIG. 1 is a schematic depiction of a modular lithium deposition system, in accordance with some embodiments.

Articles for inclusion in electrochemical cells comprising lithium metal, methods of forming and/or altering such articles, and modular lithium deposition systems are generally described. In some embodiments, the articles described herein may be suitable for use as and/or in lithium metal anodes. Similarly, the methods and/or modular lithium depositions systems described herein may be suitable for forming lithium metal anodes and/or components thereof.

Some systems described herein are suitable for forming articles for inclusion in electrochemical cells in a desirable manner. In some embodiments, a system comprises two or more modules, each of which is capable of and/or configured to perform one or more fabrication processes. By way of example, a system may comprise one or more modules capable of and/or configured to deposit a material onto a substrate (e.g., lithium metal, a species passivating lithium metal). As another example, a system may comprise one or more modules capable of and/or configured to perform a reaction on an article therein (e.g., a passivating reaction on lithium metal present in an article positioned therein). The modules may be capable of and/or configured to be reversibly placed in and out of fluidic communication with each other. Advantageously, this may both allow for separate processes to be performed in separate modules without cross-contamination therebetween and allow for a single article (or portion of a single article) to be transported through the system to different modules (e.g., in which different processes, and/or subsequent identical processes, can be performed). In some embodiments, one or more features of a modular system may be advantageous for depositing lithium metal. Such features are described in further detail below.

In some embodiments, an article for inclusion in an electrochemical cell comprises lithium metal and further comprises one or more passivating species. The passivating species may passivate the lithium metal, thereby reducing its reactivity. There are several points in time during which it is desirable for the lithium metal to be passivated. By way of example, it may be desirable for the lithium metal to be passivated when undergoing one or more further fabrication processes that expose lithium metal deposited during a prior fabrication process to species reactive with lithium metal. As another example, in some embodiments it may be desirable for lithium metal to be passivated when present in an electrochemical cell undergoing cycling. Passivated lithium metal may desirably be less reactive and more stable than unpassivated lithium metal during these processes. For this reason, smaller amounts of lithium metal may be lost to chemical reactions, allowing a smaller amount of lithium metal to be used compared to an electrochemical cell without passivated lithium, all other factors being equal. Additionally or alternatively, the use of passivated lithium may result in the formation of electrochemical cells including lower levels of non-functional species.

Some embodiments relate to methods of forming articles for inclusion in electrochemical cells and/or to methods of using the modular deposition systems described herein. Such methods may advantageously result in the formation of layers comprising lithium metal having a desirable type and/or quantity of passivation, arrangement of a passivating species, morphology, and/or other chemical and/or physical features of interest.

Figure 2:
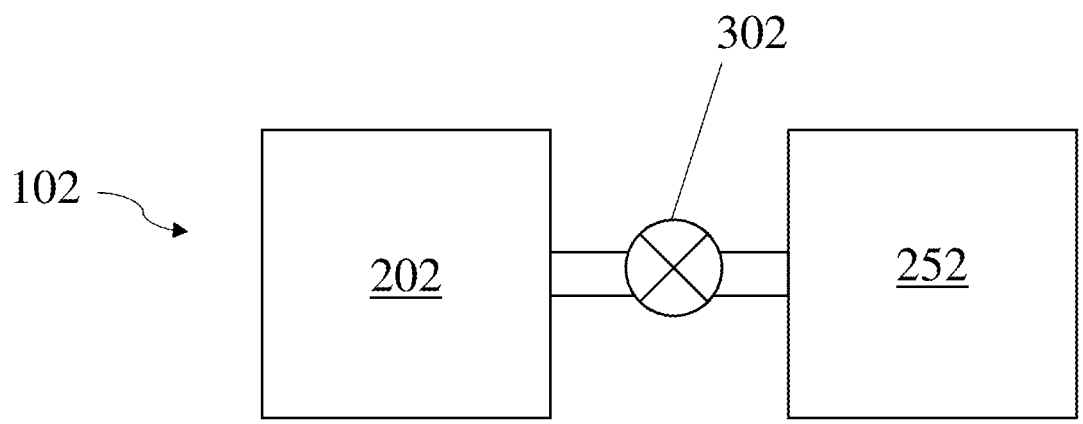
FIG. 2 is a schematic depiction of a modular lithium deposition system comprising a connector positioned between two modules, in accordance with some embodiments.

FIG. 1 shows one non-limiting example of a modular lithium deposition system. In FIG. 1, the modular lithium deposition system 100 comprises a first module 200 and a second module 250. In some embodiments, the first and second modules may be capable of being and/or configured to be placed in fluidic communication with each other reversibly. FIG. 2 shows one non-limiting example of a modular lithium deposition system 102 having this property in which a connector 302 (e.g., a conductance seal; a valve, such as a gate valve) is positioned between the first and second modules 202 and 252 and is capable of reversibly placing these modules in fluidic communication with each other. The valve (or other portion of the modular lithium deposition system capable of placing the two modules in fluidic communication with each other) may be opened to allow a substrate on which an article for inclusion in an electrochemical cell is being formed to pass between the modules and may be closed to fluidically isolate the modules from each other.

In some embodiments, like the embodiment shown illustratively in FIG. 1, a modular lithium deposition system comprises two modules. It is also possible for modular lithium deposition systems to comprise three modules, four modules, or even more modules. Such modules may comprise two or more modules that are identical to each other and/or may comprise two or more modules that are different from each other.

A variety of suitable modules may be included in the modular lithium deposition systems described herein. In some embodiments, a modular lithium deposition system comprises one or more modules that comprise a vacuum chamber. The vacuum chamber may be a vessel that can be held at a vacuum of less than or equal to 1 mTorr for an indefinite period of time. It may be formed of a material and/or combination of materials that can withstand a relatively large pressure difference across the interior of the vacuum chamber and the exterior of the vacuum chamber (e.g., a pressure difference of the difference between atmospheric pressure and 1 mTorr). Similarly, it may be formed of a material and/or combination of materials that can seal off the interior of the vacuum chamber from an environment exterior thereto to an appreciable degree (e.g., such that a pressure difference between atmospheric pressure and the pressure inside the vacuum chamber can be maintained without pumping and/or with minimal pumping for a period of time of seconds, minutes, hours, or longer). The vacuum chamber may be made from a rigid material and/or combination of materials (e.g., a material and/or combination of materials that maintains substantially the same shape when subject to the above-mentioned pressure difference) and/or from a deformable material and/or combination of materials (e.g., a material and/or combination of materials that does not maintain substantially the same shape when subject to the above-mentioned pressure difference).

In some embodiments, a vacuum chamber further contains, and/or is capable of being placed in fluidic communication with, one or more further system components (e.g., within the module, in another module). Such vacuum chambers may be advantageous for systems in which it is desirable to perform one or more processes in a vacuum chamber that require more than exposure to a vacuum. For instance, in some embodiments, a vacuum chamber may further contain and/or be capable of being placed in fluidic communication with a source of a material to be deposited on a substrate and/or a source of material reactive with a substrate and/or a material deposited thereon. The vacuum chamber may be capable of being and/or configured to be placed in fluidic communication with the further system component(s) when held at reduced pressure. This may be advantageous for, for example, processes in which it is desirable to deposit a material onto a substrate positioned in a vacuum chamber under reduced pressure and/or to perform a reaction on a material positioned in a vacuum chamber under reduced pressure.

Some modular lithium deposition systems described herein are capable of and/or configured to operate in a roll-to-roll manner. Advantageously, this manner of operation may allow for the modular lithium deposition system to be used in a more efficient manner. By way of example, in some embodiments, roll-to-roll operation of a modular lithium deposition system allows for two (or more) different modules to perform two (or more) different processes on two (or more) different portions of a substrate simultaneously. This may allow for different substrates to be fabricated efficiently, as they may be sequentially passed through modules that are operated simultaneously. As another example, in some embodiments, a roll-to-roll operation of a modular lithium deposition system may allow for a single module to perform a process on different portions of a substrate sequentially while minimizing exposure of the module to an environment external thereto. The module may need to only be exposed to an environment external thereto when the substrate is being translated therethrough, and, in embodiments in which the entire roll-to-roll handling system is positioned in a vacuum chamber or other desirable environment, the environment to which the module is exposed during this process may be relatively similar to the environment therein during the process it is configured to perform (e.g., it may be a vacuum environment, it may lack and/or include in only small quantities one or more components of the earth's atmosphere that are undesirable, such as species reactive with lithium metal).

Figure 3:
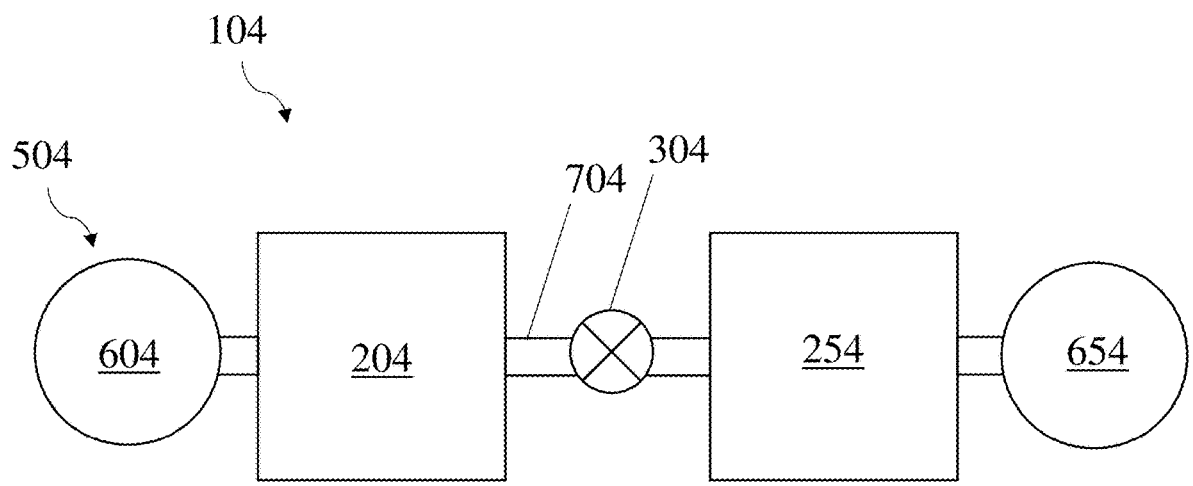
FIG. 3 is schematic depiction of a modular lithium deposition system comprising a roll-to-roll handling system, in accordance with some embodiments.

FIG. 3 shows one example of a modular lithium deposition system comprising a roll-to-roll handling system. In FIG. 3, the roll-to-roll handling system 504 comprises a first roll 604, a second roll 654, and a chamber 704 positioned between the first module and the second module. The roll-to-roll handling system may be capable of transporting and/or configured unwind a substrate from the first roll, transport it through the system (e.g., through the modules, through any chambers positioned between the modules), and wind it onto the second roll. The substrate may be sufficiently long such that it is capable of simultaneously comprising portions disposed on the first roll, portions positioned in one or more modules of the modular lithium deposition system, and portions disposed on the second roll. Accordingly, as described above, different portions of the substrate may be positioned in different environments and/or may have different processes performed thereon simultaneously. In some embodiments, the rolls of a roll-to-roll handling system may be positioned external to the modules in the lithium deposition system (e.g., as shown illustratively in FIG. 3). In other embodiments, one or more rolls in a roll-to-roll handling system are positioned inside modules. By way of example, a roll may be positioned inside a vacuum chamber. In some embodiments, the first roll is positioned inside a first module and the second roll is positioned inside a second, different module.

As used herein, when a component is referred to as being "on" or "adjacent" another component, it can be directly on or adjacent the component, or an intervening component also may be present. A component that is "directly on", "directly adjacent" or "in contact with" another component means that no intervening component is present.

Figure 4:
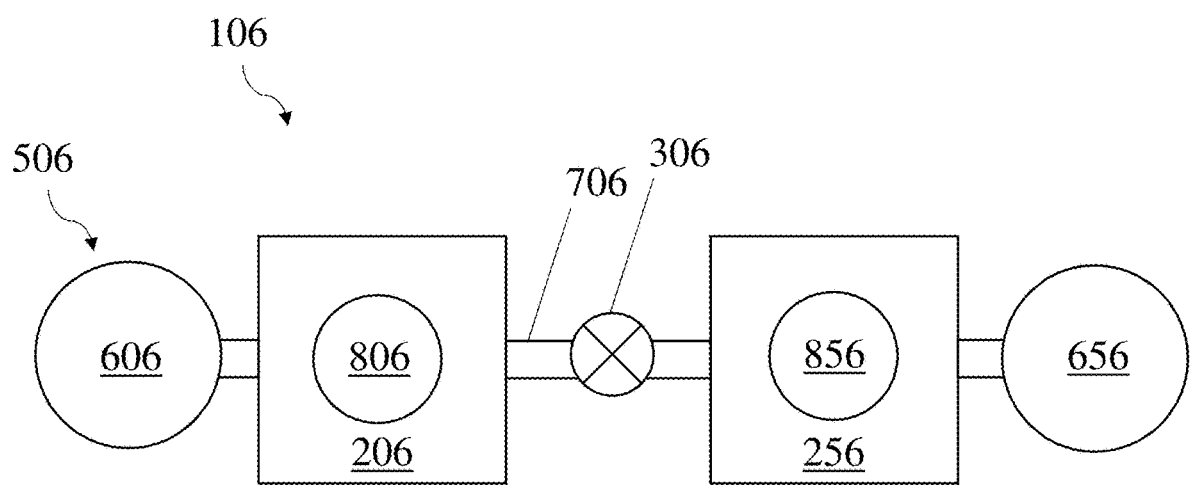
FIG. 4 is schematic depiction of a roll-to-roll handling system comprising two drums, in accordance with some embodiments.
Figure 5:
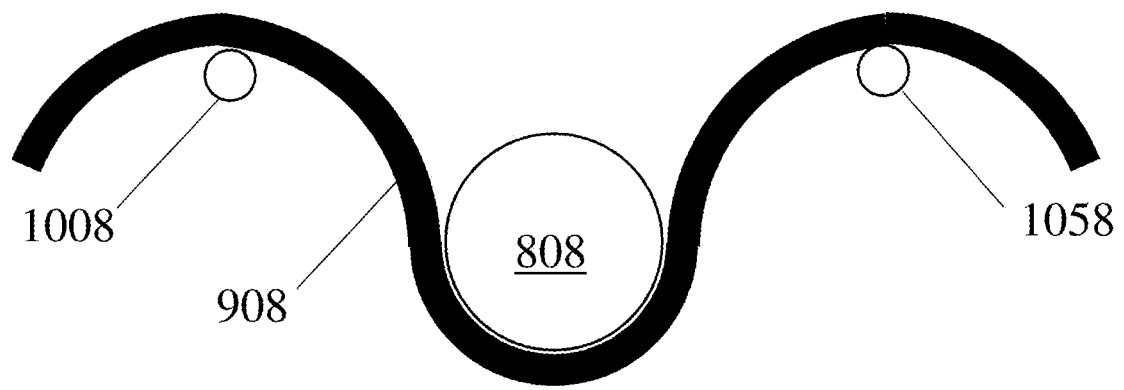
FIG. 5 is a schematic depiction of a drum over which a substrate is passed by two rollers, in accordance with some embodiments.

In some embodiments, a roll-to-roll handling system further comprises a plurality of drums. The roll-to-roll handling system may be configured such that it is configured to pass the substrate over the drums as it is being transported through the modular lithium deposition system. For instance, the drums may be configured to translate the substrate through the modular lithium deposition system and/or a plurality of modules therein. It is also possible for the roll-to-roll handling system to comprise rollers that are configured to translate the substrate through the modular lithium deposition system (e.g., in conjunction with the drums and/or instead of the drums). FIG. 4 shows one non-limiting example of a roll-to-roll handling system comprising two drums, one in each module. In FIG. 4, the first chamber 206 comprises a drum 806 and the second chamber 256 comprises a drum 856. It should also be understood that some modules may lack drums and/or rollers and some modules may comprise two or more drums and/or two or more rollers. FIG. 5 shows a further example of a drum 808 over which a substrate 908 is passed by two rollers 1008 and 1058. The rollers and/or drum may be configured to rotate to translate the substrate forwards and/or backwards.

Some drums may be capable of and/or configured to be cooled and/or heated. The cooled or heated drum may then cool or heat any portions of the substrate disposed thereon. This may be advantageous for drums positioned in environments which would otherwise be heated or cooled by their ambient environments to temperatures that are undesirable for the portions of the substrates disposed thereon and/or configured to be disposed thereon. For instance, the ambient environment in a module in which a drum is positioned may be heated by a process being performed therein. By way of example, a module in which a layer is deposited from a gas may be heated by the gas and/or by a solid source of the species forming the gas that is heated to form the gas. It may be undesirable for the substrate to be heated to this same temperature for a variety of reasons. For instance, heating the substrate to this same temperature may undesirably cause substrates having a low melting point to melt and/or substrates that are thermally unstable to begin to degrade. As another example, it may be easier to condense the gas to form a layer onto a cooled substrate and/or a cooled substrate may assist with the formation of a layer comprising the gas that has a desirable morphology.

Cooling and/or heating a drum may be accomplished by use of a cooling and/or heating system in thermal communication with the drum. The cooling and/or heating system may be configured to remove heat from and/or provide heat to the drum. In some embodiments, the cooling and/or heating system may be configured to maintain the drum at a set temperature, within 1° C. of a set temperature, or within a range differing from the set temperature by less than or equal to the resolution of a temperature sensor employed with the cooling and/or heating system. Cooling and/or heating a drum may be accomplished by a variety of suitable types of cooling systems, including a system circulating a cooled and/or heated fluid across one or more surfaces of the drum and/or through one or more walls of the drum. In some embodiments, a drum is heated by a heating system employing resistive heating. The cooling and/or heating system may further comprise a temperature sensor (e.g., as part of a feedback loop configured to maintain the cooling and/or heating system at a set temperature and/or within a set temperature range). Non-limiting examples of suitable temperature sensors include thermocouples and RTD sensors. Each drum in a modular lithium deposition system may be independently cooled and/or heated by different cooling and/or heating systems, or two or more (or all) drums in a modular lithium deposition system may be cooled and/or heated by a common cooling and/or heating system. Similarly, each drum in a modular lithium deposition system may be cooled and/or heated to a different temperature, or two or more (or all) drums in a modular lithium deposition system may be cooled and/or heated to a common temperature.

In some embodiments, one or more features other than a drum may assist with the maintenance of a substrate at a desired temperature. As one example, a substrate may be cooled and/or heated by exposure to a gas that is at a lower or higher temperature than the substrate. For instance, the temperature of a substrate may be modified by exposure to an inert gas. The inert gas may be provided concurrently with a gas provided at a temperature higher than that of the substrate, such as a gas that may condense on the substrate to form a layer disposed thereon. Upon exposure to the substrate, it may have a temperature lower than that of the substrate surface exposed to it or may have a temperature similar to or higher than that of the substrate surface exposed to it. In the former case, the inert gas may directly cool the substrate. In the latter, the inert gas may cool the gas it is provided with, which may reduce or eliminate any thermal damage caused to the substrate by exposure to that gas. The exposure of a substrate to both an inert gas, such as a cooled inert gas, and another gas concurrently may have other advantages, as described in more detail elsewhere herein.

Figure 6:
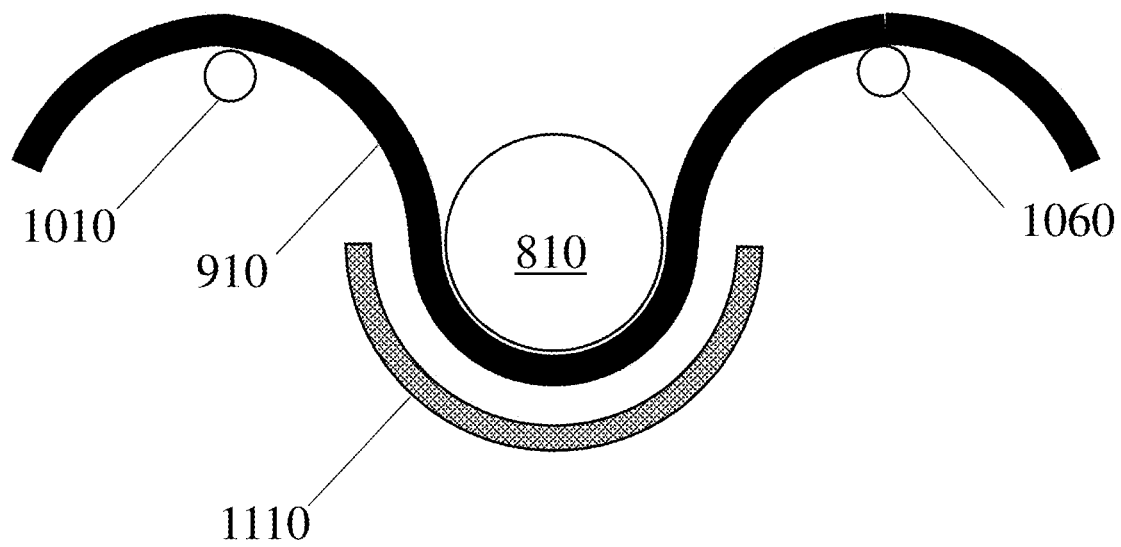
FIG. 6 is a schematic depiction of an arrangement of a drum, a substrate, and a shield positioned proximate the substrate, in accordance with some embodiments.
Figure 7:
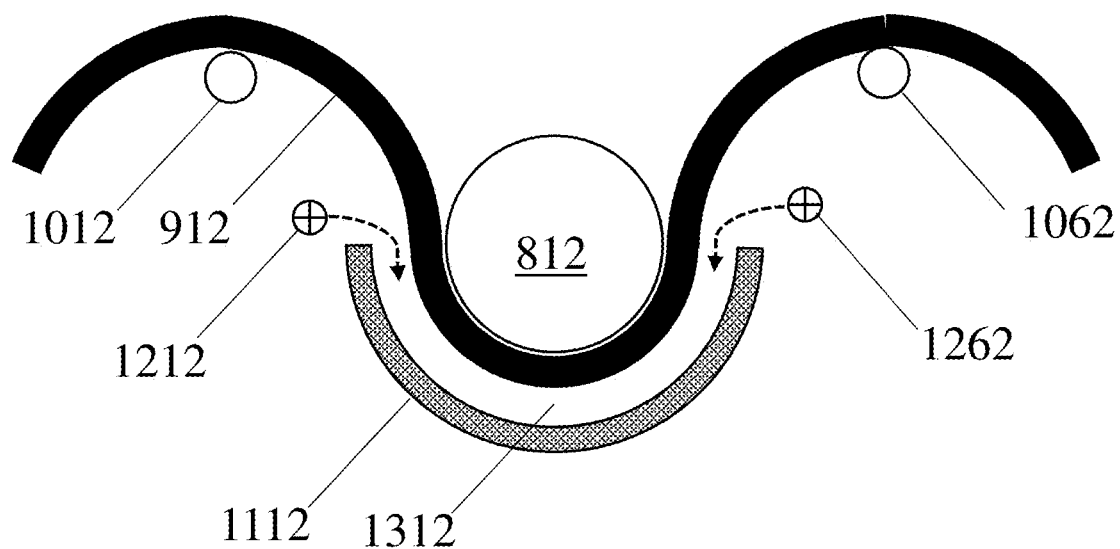
FIG. 7 is a schematic depiction of an arrangement of a drum, a substrate, a shield positioned proximate the substrate, and two ports configured to introduce a gas, in accordance with some embodiments.

As another example of a feature of a module that may assist with the maintenance of a substrate at a desired temperature, in some embodiments, a shield is positioned proximate the substrate (and/or a location at which the substrate is configured to be positioned, such as a drum). In some embodiments, a shield may be positioned in between the substrate or location at which the substrate is configured to be positioned (e.g., a drum) and a source of heat (e.g., a container containing a source and/or a source, such as a source of lithium metal and/or a source of a gas). FIG. 6 shows one non-limiting embodiment of an arrangement of a drum 810, a substrate 910, and a shield 1110 positioned proximate the substrate 910. The shield may restrict the mobility of any gas positioned between the shield and the substrate and/or may tend to maintain a relatively constant atmosphere in this location. Accordingly, a cooled gas introduced into the space between the shield and the substrate may serve to cool the substrate for an appreciable period of time and/or may block the introduction of warmer species therein. As shown in FIG. 7, in some embodiments, a cooled gas (e.g., a cooled inert gas) may be introduced into this space by one or more ports. In FIG. 7, the ports 1212 and 1262 are configured to introduce a cooled gas species into the space 1312 positioned between the substrate 912 and the shield 1112. The ports may be in fluidic communication with a source of the cooled gas and may be capable of reversibly placing the source of the cooled gas in fluidic communication with the space positioned between the substrate and the shield.

It is also possible for a shield to be configured such that one or more further species may be introduced into the space between it and a substrate. As an example, a shield may have an opening positioned proximate a source and/or proximate a shutter of a container comprising a source, as described in further detail elsewhere herein.

Figure 8:
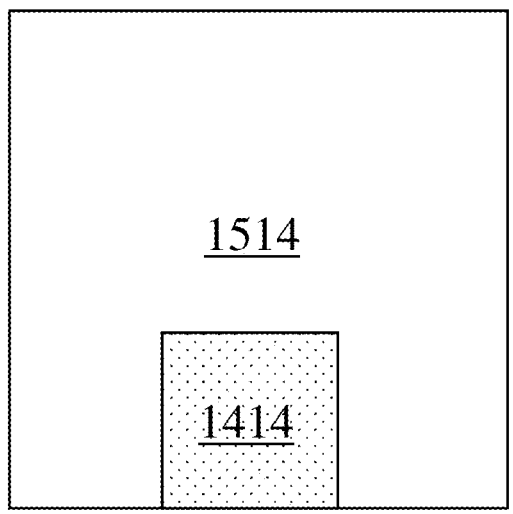
FIG. 8 is a schematic depiction of a source positioned in a container, in accordance with some embodiments.

In some embodiments, a modular lithium deposition system comprises one or more sources of material configured to be introduced into one or more modules therein. Such sources may be positioned in one or more of the modules (e.g., in a vacuum chamber), external to the modules (e.g., in a location that may be placed, possibly reversibly, in fluidic communication with a module and/or component thereof, such as a vacuum chamber), and/or may form their own modules (e.g., in a module that may be placed, possibly reversibly, in fluidic communication with another module and/or component thereof, such as a vacuum chamber). In some embodiments, a source is positioned in a container (e.g., a container positioned in one or more of the above-referenced locations). FIG. 8 shows one non-limiting embodiment of a source 1414 positioned in a container 1514.

Some sources may comprise a species that is configured to be incorporated into a layer deposited therein and/or is configured to undergo a reaction in the module to form a reaction product to be incorporated into a layer deposited therein. Non-limiting examples of such sources include sources of lithium metal and sources of species reactive with lithium metal. The former source may be suitable for forming a layer comprising lithium metal and/or a reaction product thereof (e.g., a passivating layer), and the latter source may be configured to form a layer disposed on lithium metal and/or comprising a reaction product of lithium metal (e.g., a passivating layer).

Some sources may comprise a material that is not configured to be incorporated into a layer deposited therein or configured not to undergo a reaction in the module to form a reaction product to be incorporated into a layer deposited therein. By way of example, some sources may be sources of gases inert to lithium metal and/or gases generally-considered to be inert gases (e.g., argon, helium, other noble gases). Such gases may be configured to modulate the interaction of one or more other types of gases (e.g., gases comprising lithium, gases reactive with lithium) with each other and/or with one or more components of the module. For instance, as described above, in some embodiments, an inert gas may assist with cooling one or more portions of a module. As another example, an inert gas may affect the morphology of one or more layers deposited on a substrate. Without wishing to be bound by any particular theory, it is believed that inert gases may interact with gases comprising lithium and/or gases comprising a species reactive with lithium to reduce the tendency of these gases to form porous layers and enhance the tendency of these gases to form denser, more crystalline layers. It is believed that this effect is enhanced when the inert gas has a temperature sufficient to cool the relevant gas(es) depositing to form the layer, such as a gas provided at a lower temperature than these gas(es). It is also believed that this effect is enhanced when the inert gas is present in a manner sufficient to cause the local pressure at the location at which the relevant layer is being deposited to be of a character that promotes the formation of such layers.

Some sources and/or their containers may be configured to be heated and/or cooled. Heating a source may be advantageous when the source is a material that is not gaseous as provided (e.g., that is a solid or a liquid at room temperature and pressure, that is a solid or liquid at a temperature and pressure of the module into which it is introduced) but which is desirable to introduce into a module in the form of a gas and/or to deposit onto a substrate from a gas. The source may be heated by a heating system with which it is in thermal communication. The heating system may resistively heat a container in which the source is positioned and/or a location on which the substrate is disposed. In some embodiments, a heating system may heat the container and/or location by providing a source of heat at a set temperature (or within 1° C. of a set temperature, or within a range differing from the set temperature by less than or equal to the resolution of a temperature sensor employed with the cooling and/or heating system) in a manner that maintains the source at a set temperature (or within 1° C. of a set temperature, or within a range differing from the set temperature by less than or equal to the resolution of a temperature sensor employed with the cooling and/or heating system). It should also be understood that, as described elsewhere herein, some modules may comprise one or more sources of a material that is provided as a gas (e.g., a material that is a gas at room temperature and pressure, a material that is a gas at the temperature and pressure of the module into which it is introduced). Such sources may be provided in addition to, or instead of, sources of a material that is not provided as a gas.

Cooling a source may be advantageous when it is desirable to operate the modular lithium deposition system at high speeds and/or when it is desirable to have a fairly short time between successive uses thereof. When the source is at an elevated temperature, it may evaporate and/or sublimate to form a gas that would be undesirable to introduce to an environment external to that in which the source is positioned, such as an environment external to a module and/or a component thereof (e.g., a vacuum chamber) in which the source is positioned. For instance, it may be undesirable to place molten lithium in fluidic communication with an environment external to the module because the molten lithium may be undesirably reactive and/or undesirably volatile. Accordingly, the ability to rapidly cool a source, such as a source comprising lithium, to a temperature at which it undergoes minimal evaporation and sublimation may allow for modules to be placed in fluidic communication with each other rapidly after performing a process in which a source positioned in one of the chambers is heated and/or to place a module in fluidic communication with the atmosphere after such a process. A source may be cooled by its container (e.g., when its container comprises and/or is in thermal communication with a cooling system). Like the cooling system that may be employed to cool one or more drums, the cooling system configured and/or capable of cooling a container for a source may be configured to maintain one or more portions of the container (e.g., one or more external surfaces thereof, one or more internal surfaces thereof) at a set temperature or within 1° C. of a set temperature and/or within a range differing from the set temperature by less than or equal to the resolution of a temperature sensor employed with the cooling and/or heating system.

It noted that some modular lithium deposition systems may comprise separate cooling and heating systems associated with a source therein (e.g., both a heating system configured to heat the source and a separate cooling system configured to cool the source) and that some modular lithium deposition systems may comprise heating and cooling systems capable of and/or configured to be operated together to maintain a source at a set temperature.

In some embodiments, a cooling system for a container for a source comprises a plurality of channels arranged in one or more walls and/or across one or more surfaces of the container. A cooled fluid may be flowed through these channels (e.g., with the assistance of a pump and/or possibly chilled by a chiller), which may cool the container, one or more external and/or internal surfaces thereof, and/or a source contained therein (e.g., by contact with a cooled internal surface thereof). Non-limiting examples of suitable cooled fluids include cooled gases (e.g., cooled inert gases, such as cooled argon, cooled helium, and/or another cooled noble gas) and cooled liquids (e.g., cooled water). In some embodiments, the cooled fluid may be a fluid that does not have a boiling point between the temperature at which it is provided to the channels and the temperature of the source (e.g., the cooled fluid may be provided as a gas and remain a gas after flowing through the channels, the cooled fluid may be provided as a liquid and remain a liquid after flowing through the channels).

Figure 9:
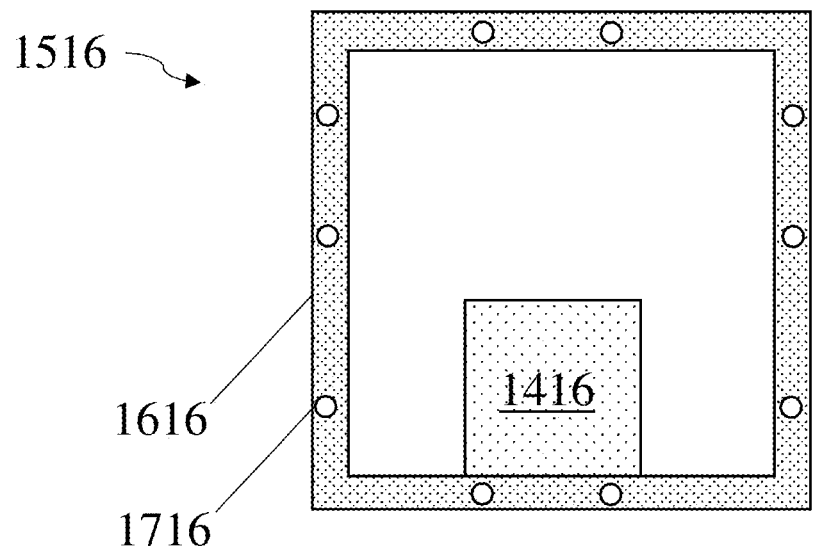
FIG. 9 is a schematic depiction of a cooling system comprising walls in which channels are arranged, in accordance with some embodiments.

FIG. 9 shows one non-limiting embodiment of a cooling system 1516 comprising walls 1616 in which channels 1716 are arranged. Like the container shown in FIG. 9, some containers may comprise channels in all of their walls. Other containers may comprise channels in some, but not all, of their walls. For instance, some containers may comprise channels only in the wall or walls to which a source is directly adjacent. Similarly, it should be understood that the number of channels in each wall, positioning of the channels within the walls, and size of the channels relative to the walls shown in FIG. 9 are exemplary and that some embodiments may vary in these (and/or other) manners from the embodiment shown illustratively in FIG. 9.

Some containers suitable for containing a source have one or more features that make them well-suited for use with lithium metal sources and/or other sources having the features described herein. For instance, in some embodiments, a container is formed from a material having a relatively low coefficient of thermal expansion between room temperature and typical temperatures to which the container is heated, having a relatively high hardness, and/or having a relatively high toughness. Steel is one example of a suitable material having these properties.

Figure 10:
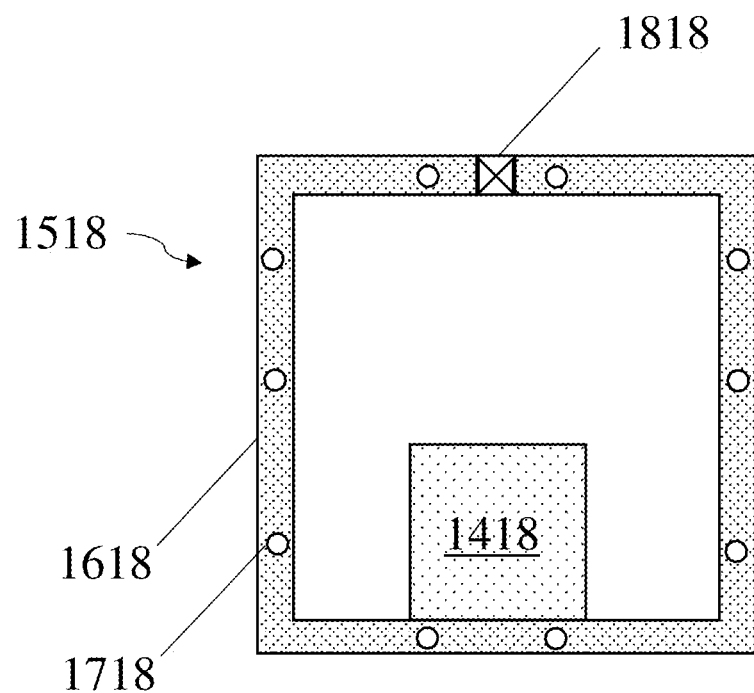
FIG. 10 is a schematic depiction of a container for a source comprising a shutter, in accordance with some embodiments.

As another example, in some embodiments, a container comprises a shutter that is capable of and/or configured to reversibly place the source in fluidic communication with another module and/or another component of the module in which it is positioned (e.g., by opening and closing). A module may comprise a vacuum chamber and a source positioned in a container positioned within the vacuum chamber, and the shutter may be capable of reversibly placing the source in fluidic communication with the vacuum chamber. FIG. 10 shows one non-limiting embodiment of a container for a source comprising a shutter having this property. In FIG. 10, the container 1518 comprises a shutter 1818 that may be reversibly opened and closed to place the interior of the container 1518 in and out of fluidic communication with an environment external thereto.

In some embodiments, like the embodiment shown illustratively in FIG. 10, opening and closing a shutter of a container may place and remove the entirety interior of the container (in which the source is positioned) in and from fluidic communication with the other module and/or module component. It is also possible for the opening and closing of the shutter to place and remove one or more sub-portions of the interior of the container (e.g., a portion in which the lithium metal source is positioned and/or in fluidic communication with) in and from fluidic communication with the other module and/or module component while not affecting the presence or lack of fluidic communication between one or more other portions of the interior of the container with the other module and/or module component. The presence of a shutter may allow the exposure of the source to the other module and/or module component to be controlled such that the source is in fluidic communication with the other module and/or module component when desirable (e.g., when the source is at a temperature suitable for the formation of gas to be introduced to the module and/or module component, when the substrate is appropriately positioned for receiving and/or reacting with the gas generated by the source) and not in fluidic communication with the other module and/or module component at other points in time (e.g., when the source is at a temperature too low for the formation of the desired gas in appropriate quantities and/or having a desired composition). This may advantageously prevent or reduce the introduction of gas from the source at inopportune times, thereby preventing or reducing the amount of substrate rendered unsuitable for introduction into an electrochemical cell and/or unsuitable for further fabrication steps.

In some embodiments, a shutter is configured to be heated. For instance, it may be heated by a heating system with which it is in thermal communication. The heating system may resistively heat the shutter and/or may provide a source of heat at a set temperature (or within 1° C. of a set temperature and/or within a range differing from the set temperature by less than or equal to the resolution of a temperature sensor employed with the heating system) in a manner that maintains the shutter at a set temperature (or within 1° C. of a set temperature and/or within a range differing from the set temperature by less than or equal to the resolution of a temperature sensor employed with the heating system).

Some modular lithium deposition systems and/or modules therein may comprise more than one source. Each source may be of the same type, each source may be of a different type, or the modular lithium deposition system and/or module may comprise two or more of at least one type of source and further comprise one or more other, different types of sources. In some embodiments, it may be advantageous for a single module to comprise multiple sources of the same type. The different sources of the same type may complement each other. By way of example, in some embodiments, a module comprises a plurality of sources located at different positions within the module and/or a plurality of ports located at different positions around the module that each place a source in fluidic communication with the module. The plurality of sources may together assist with the formation of a layer from the source and/or reaction of the layer with a gas produced by the source in a uniform manner (e.g., having a variation in the cross web direction of less than or equal to 0.5 microns between its thickest and thinnest points).

Figure 11:
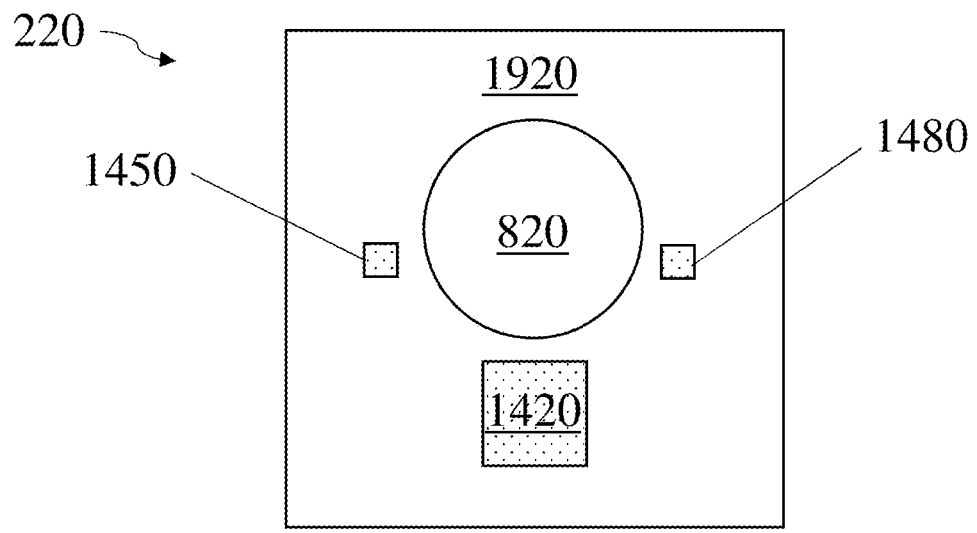
FIG. 11 is a schematic depiction of a module comprising three sources of the same type, in accordance with some embodiments.

FIG. 11 shows one example of a module comprising three sources of the same type. In FIG. 11, the module 220 comprises a vacuum chamber 1920, a drum 820, a first lithium metal source 1420, a second lithium metal source 1450, and a third lithium metal source 1480. The three lithium metal sources 1420, 1450, and 1480 are positioned inside the vacuum chamber 1920, which further contains the drum 820. Although not shown in FIG. 11, it should be understood that three ports configured to reversibly place three sources of lithium metal in fluidic communication with the interior of the vacuum chamber positioned at the same locations as the three lithium metal sources shown in FIG. 11 would be expected to behave similarly to the embodiment shown in FIG. 11.

In FIG. 11, a portion of a substrate passing over the drum (e.g., being translated through the modular lithium deposition thereby and/or with the assistance of a plurality of rollers) may be exposed sequentially to a gas from the second lithium metal source, to a gas from the first lithium metal source, and then to a gas from the third lithium metal source. If the sources are employed to deposit a layer on the substrate, the majority of the layer may be deposited by a gas from one of the three sources (e.g., the first source), and the other two sources may be employed to deposit further portions of the layer that enhance its uniformity (e.g., that reduce its variation in thickness, chemical composition, and/or porosity in the cross-web direction). For instance, gas from the last source to which the portion of the substrate is exposed may modulate the amount of material it deposits based on the amount of material that has already been deposited on the portion of the substrate to which it is exposed. It may deposit more material on portions of the substrate on which a smaller amount of material has been deposited and less (or no) material on portions of the substrate on which a larger amount of material has been deposited. Gas from the first source to which the substrate is exposed may, if not the main source, deposit more material on portions of the substrate onto which the main source typically deposits less material (e.g., portions of the substrate closer to the edge of the main source) and deposit less (or no) material on portions of the substrate onto which the main source typically deposits more material (e.g., portions of the substrate closer to the center of the main source).

Figure 12:
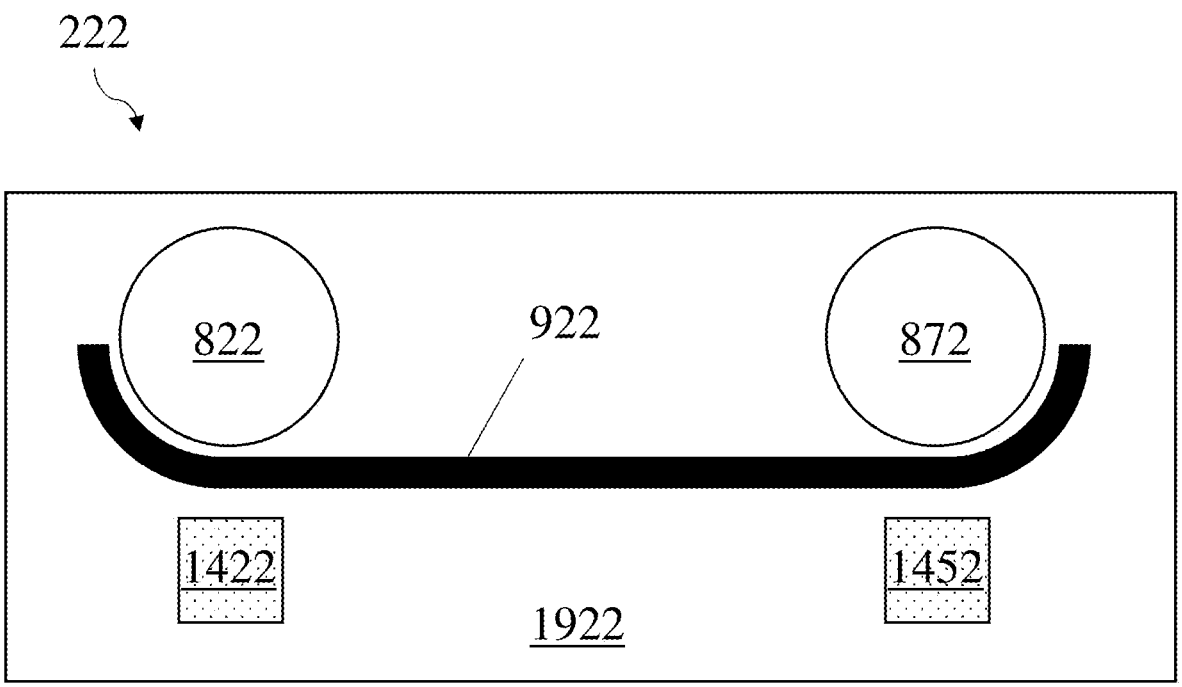
FIG. 12 is a schematic depiction of a module comprising a vacuum chamber in which a first drum and a second drum are positioned, in accordance with some embodiments.

In some embodiments, like the embodiment shown in FIG. 11, multiple sources (e.g., multiple sources of the same type) may be positioned around a common drum and/or may be configured to produce gas to be deposited to form a layer on portions of a substrate disposed on a common drum. It is also possible for multiple sources in a single module to be positioned proximate different drums in the module and/or configured to produce gas to be deposited to form layers on portions of the substrate disposed on different drums in the module. FIG. 12 shows one example of a module 222 comprising a vacuum chamber 1922 in which a first drum 822 and a second drum 872 are positioned. The module 222 further comprises a source 1422 positioned proximate the first drum 822 and a second source of the same type 1452 positioned proximate the second drum. A portion of a substrate 922 translated through the module 222 to pass first over the first drum 822 and then over the second drum 872 would first be exposed to a gas originating from the first source 1422 and then to a gas originating from the second source 1452.

Figure 13:
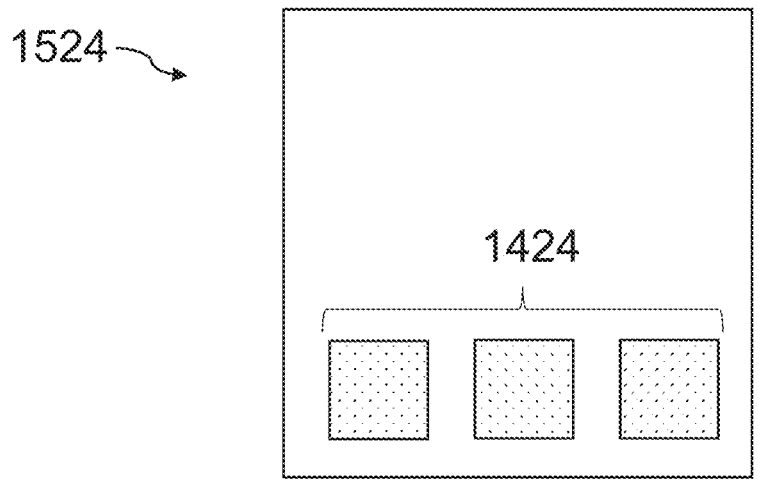
FIG. 13 is a schematic depiction of a container comprising a plurality of sources, in accordance with some embodiments.

In some embodiments, like the embodiments shown in FIGS. 11-12, each source positioned in a module is contained in its own container. The amount of gas introduced from a source into the module may be controlled by the container (e.g., by opening and closing a shutter thereon, by adjusting the temperature of the container) and/or by a port in fluidic communication with the container. It is also possible for a module to comprise two or more sources positioned in a common container and/or in fluidic communication with a common port. FIG. 13 shows one example of a plurality of sources having this property. In FIG. 13, a single container 1524 comprises a plurality of sources 1424. In some such embodiments, the amount of gas introduced into the module from different sources positioned within a common container may be independently controlled. This may be accomplished by, for example, providing different amounts of heat to different sources (thereby adjusting the temperature, evaporation rate, and/or sublimation rate of the sources differently) and/or by heating different amounts of the source (thereby limiting the amount of source material that can evaporate and/or sublimate). The amount of a source that is heated may be varied by varying the amount of the source that is exposed to a source of heat. Like the embodiment described above with respect to FIGS. 11-12, the amount of gas produced by any particular source may be selected such that all of the sources together result in the production of gas that deposits on the substrate in the form of a relatively uniform layer (e.g., having a variation in the cross web direction of less than or equal to 0.5 microns between its thickest and thinnest points).

Figure 14:
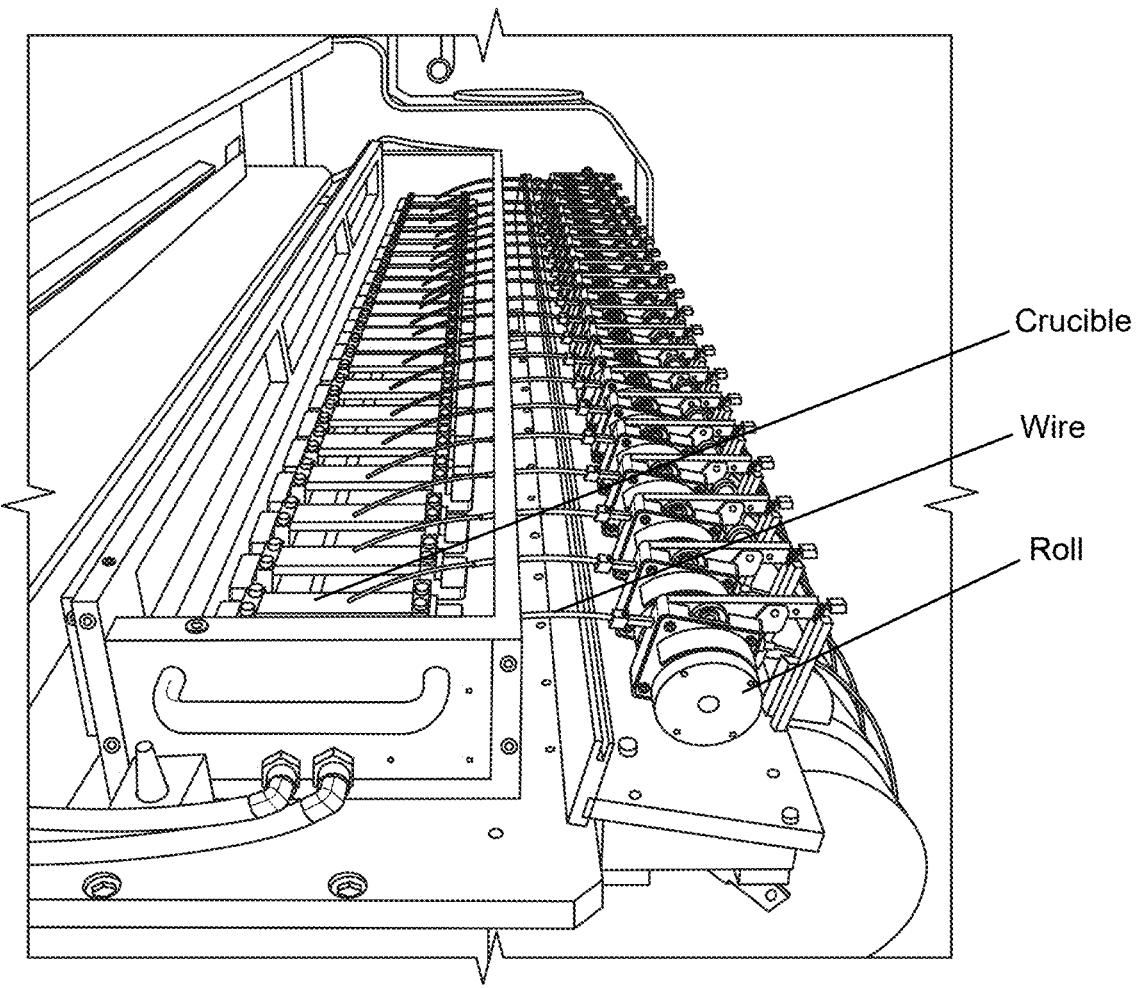
FIG. 14 is a photograph of a plurality of sources and heated crucible, in accordance with some embodiments.

In one exemplary embodiment, a source is provided in the form of a material comprising a plurality of portions that can be translated onto a heated crucible relatively easily. The rate at which various portions of the source are translated onto the heated crucible may affect the amount of source sublimed and/or evaporated by the source of heat. For instance, when portions of the source are introduced to the heated crucible more rapidly, larger quantities of gas may be produced from the source and when portions of the source are introduced to the heated crucible more slowly, smaller quantities of gas may be produced from the source. One type of source that may be particularly suited for this design is a source that takes the form of a wire. The wire may initially be wound around a roll, and then unrolled onto the heated crucible. FIG. 14 shows one example of a plurality of sources and heated crucibles having this design.

In some embodiments, a modular lithium deposition system comprises a combination of different types of sources and/or ports in fluidic communication with different types of sources positioned with respect to each other to promote the formation of a desirable combination of layers. By way of example, in some embodiments, a modular lithium deposition system comprises one or more sources of a material other than (e.g., reactive with) lithium metal positioned proximate a source of lithium metal. Similarly, a modular lithium deposition system may comprise a port in fluidic communication with one or more sources of a material other than (e.g., reactive with) lithium metal positioned proximate a source of lithium metal. Such sources and/or ports may be capable of and/or configured to introduce both types of gases to a common portion of a substrate at relatively close points in time (e.g., concurrently or close to concurrently). When both such sources are placed in fluidic communication with the interior of the module concurrently, a layer comprising a reaction product therebetween and/or both lithium and the condensed gas other than lithium may be deposited on that portion of the substrate.

As another example, in some embodiments, a modular lithium deposition system comprises one or more sources of a material other than (e.g., reactive with) lithium metal positioned an appreciable distance from a source of lithium metal. Similarly, a modular lithium deposition system may comprise a port in fluidic communication with one or more sources of a material other than (e.g., reactive with) lithium metal positioned an appreciable distance from a source of lithium metal. Such sources and/or ports may be capable of and/or configured to introduce both types of gases to a common location at different points in time. This may be suitable for embodiments in which two distinct layers are deposited from the two different sources. For instance, in some embodiments, a layer comprising lithium metal may be deposited first, and then the layer comprising lithium metal may be exposed to the gas of the material other than lithium metal. This gas may react with and/or deposit on the layer comprising lithium metal to form a layer disposed on the layer comprising lithium metal, such as a passivating layer.

In some embodiments, a modular lithium deposition system comprises one or more components in addition to those described above. By way of example, in some embodiments, a modular lithium deposition system comprises one or more sensors. The sensor(s) may be positioned in one or more of the modules. For instance, in some embodiments, a sensor is positioned in a vacuum chamber that is a module and/or that is positioned in a module. The sensor(s) may be configured to sense one or more properties of the modular lithium deposition system, a module therein, and/or of a layer being deposited therein (e.g., a layer comprising lithium metal, a layer comprising a species other than lithium metal, a passivating layer). Non-limiting examples of properties of modules in a lithium deposition system that may be sensed include temperature and the amount of various gases present. Non-limiting examples of properties of layers that may be sensed include electrical conductivity, capacitance, color, reflectivity, and thickness. Non-limiting examples of appropriate sensors for sensing these (and/or other) properties include temperature sensors, conductivity sensors (e.g., rolling four point probe sensors), capacitance sensors, optical sensors, and thickness sensors (e.g., eddy current sensors, time of flight sensors).

Advantageously, in some embodiments, the modular lithium deposition system may be configured to allow for one or more properties of a module in the modular lithium deposition to be adjusted based upon a property sensed by one or more sensors (e.g., based on a feedback system). For instance, a sensor may sense a property indicative of a layer including too much or too little of any particular species (e.g., lithium metal, a species other than lithium metal), that is being deposited too quickly or too slowly, and/or that has an undesirable morphology. The sensor may output a signal to an operator of the modular lithium deposition system indicating the relevant deficiencies and allow the operator to adjust one or more properties of the relevant module to compensate therefor and/or may cause the modular lithium deposition system to self-adjust to do so. Non-limiting examples of parameters that may be adjusted by an operator and/or by the modular lithium deposition system in response to a property sensed by a sensor include the flow rate of a gas into the module in which the relevant layer is being deposited (e.g., from a source), a temperature in one or more locations (e.g., of a container containing a source, of a location in which a source is positioned, in a vacuum chamber in which the relevant layer is being deposited, of a drum on which the substrate on which the relevant layer is being deposited is disposed), the state of a shutter (e.g., opened, closed), and the speed of a substrate through the relevant module (e.g., through a vacuum chamber therein).

Another example of a further component that a modular lithium deposition system may include is a module configured to generate an oxygen plasma (e.g., an oxygen plasma source). The module may comprise a vacuum chamber, and the vacuum chamber may be configured to generate the oxygen plasma (e.g., by allowing a controlled flow of oxygen thereinto and applying a high frequency voltage to the oxygen). In some embodiments, oxygen plasma may be particularly well-suited for cleaning a substrate prior to deposition of a layer thereon and/or of increasing the adhesiveness of the substrate to a layer deposited thereon. For this reason, it may be advantageous to position the module configured to generate an oxygen plasma such that a substrate passing through the modular lithium deposition system passes therethrough prior to entering the module(s) configured to deposit one or more layers thereon.

Figure 15:
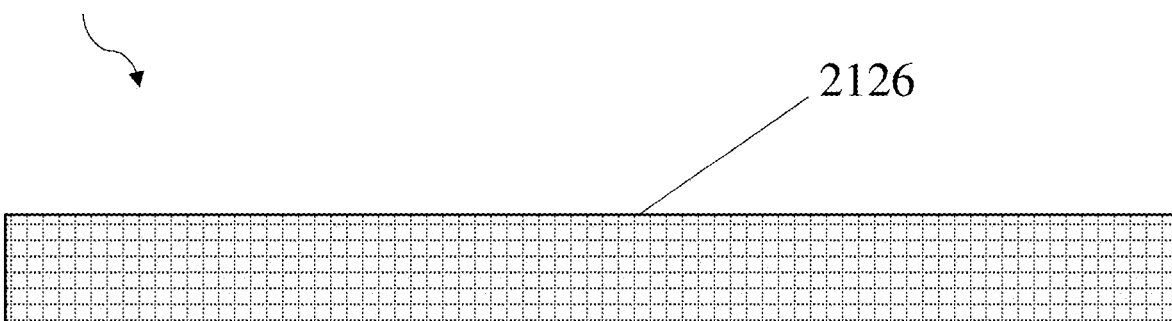
FIG. 15 is a schematic depiction of an article comprising a layer comprising lithium metal, in accordance with some embodiments.
Figure 16:
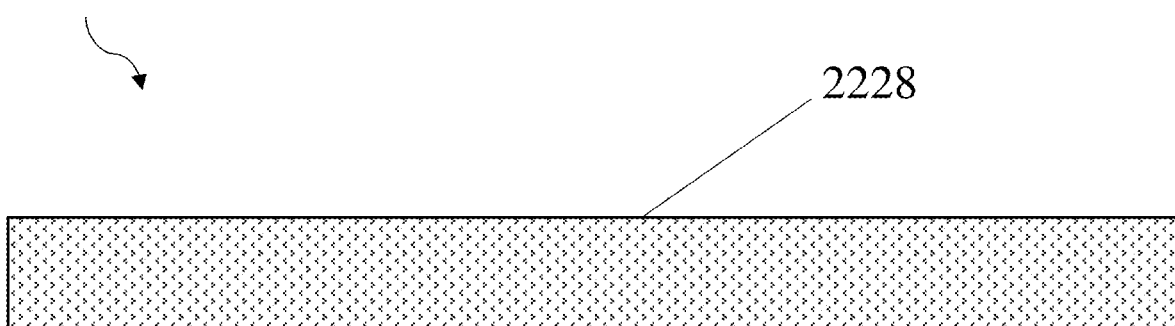
FIG. 16 is a schematic depiction of a layer comprising lithium metal, in accordance with some embodiments.

Some embodiments relate to articles for inclusion in electrochemical cells, such as articles for inclusion in electrochemical cells that may be fabricated in the modular lithium deposition systems described herein. In some embodiments, an article for inclusion in an electrochemical cell comprises a layer comprising lithium metal. FIG. 15 shows one example of an article having this property. In FIG. 15, the article 2026 comprises a layer 2126 comprising lithium metal. Articles suitable for inclusion in an electrochemical cell and comprising lithium metal may further comprise one or more additional species. The additional species may be positioned in the layer comprising lithium metal and/or may be positioned at a location other than the layer comprising lithium metal. FIG. 16 shows one example of an article having the former property and FIG. 17 shows one example of an article having the latter property.

In FIG. 16, the layer 2228 comprises both lithium metal and a further, non-lithium metal species. The non-lithium metal species may passivate the lithium metal. For this reason, layers comprising both lithium metal and a further, non-lithium metal species may be understood to be "bulk passivated", or comprise species that passivate lithium dispersed throughout the bulk of the layer.

Figure 17:
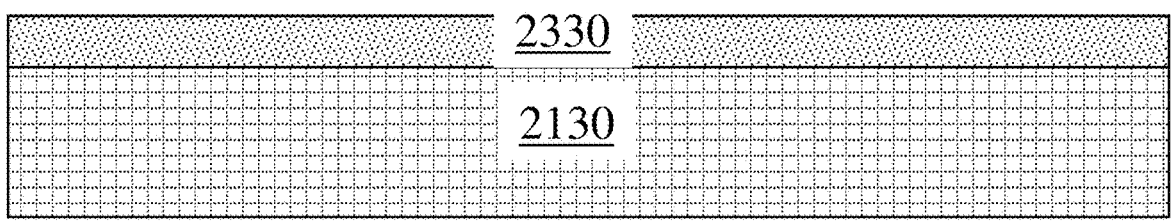
FIG. 17 is a schematic depiction of an article comprising a both layer comprising lithium metal and comprising a layer disposed on the layer comprising lithium metal, in accordance with some embodiments.

In FIG. 17, the article 2030 comprises both a layer 2130 comprising lithium metal and a layer 2330 disposed on the layer comprising lithium metal and comprising a species other than lithium metal. In some embodiments, a layer disposed on a layer comprising lithium metal is a layer that passivates the layer comprising lithium metal. In other words, it may be a passivating layer. For this reason, the layer comprising lithium positioned therebeneath may be understood to be "surface passivated", or to be passivated at its surface.

When a layer comprises both lithium metal and species other than lithium metal, the lithium metal components and the species other than lithium metal may be positioned in the layer in a variety of suitable manners. In some embodiments, the lithium metal and one or more species other than lithium metal together form a single phase (e.g., an alloy). It is also possible for one or more species other than lithium metal to phase separate from a phase comprising lithium metal (e.g., from a phase comprising pure lithium metal, from a phase comprising a lithium metal alloy). The phase other than the phase comprising lithium metal may comprise a ceramic. Two or more phases may be distributed within the layer such that they form a relatively uniform mixture (e.g., such that each phase is distributed relatively uniformly through the layer when the density of each phase is assessed on a length scale of tens of nanometers, hundreds of nanometers, and/or microns). It is also possible for two or more phases to be distributed within the layer such that they do not form a relatively uniform mixture (e.g., such that one or more portions of layer is enriched in one of the phases and/or depleted in one of the phases when the density of each phase is assessed on a length scale of tens of nanometers, hundreds of nanometers, or microns).

Layers comprising both lithium metal and a species other than lithium metal may, as a whole, be electroactive. In other words, the lithium metal in the layer may be capable of and/or configured to undergoing a redox process if the layer as a whole is subject to an appropriate stimulus. For instance, in some embodiments, a layer comprising both lithium metal and a species other than lithium metal may be configured to be placed in an electrochemical cell, and the lithium metal in the layer may be configured to serve as an anode and/or as a component of an anode that undergoes an oxidation process during discharging and/or a reduction process during charging. Such layers may comprise portions that are electroactive (e.g., portions comprising lithium metal) and portions that are non-electroactive. The portions that are non-electroactive may comprise a ceramic (e.g., as described above).

Figure 18:
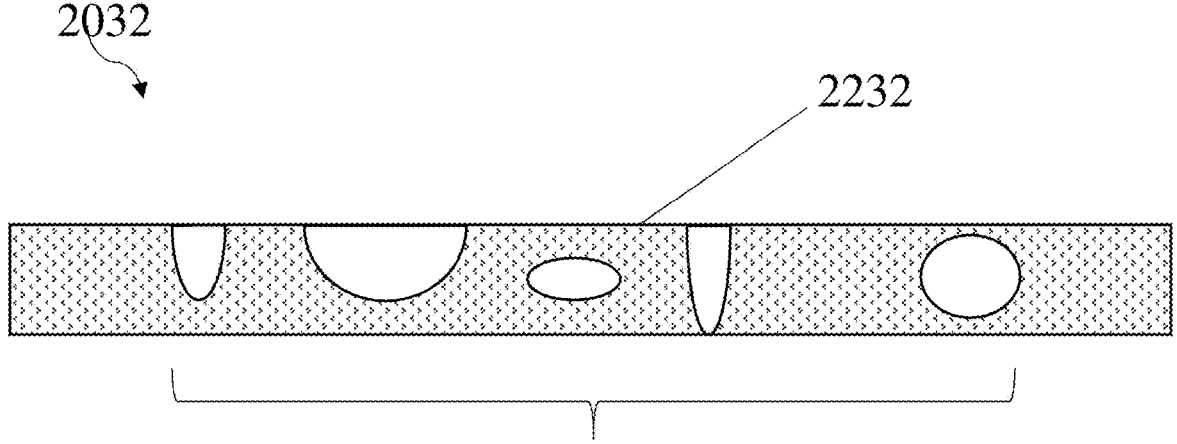
FIG. 18 is a schematic depiction of a porous layer, in accordance with some embodiments.

Layers comprising lithium metal may have a variety of suitable morphologies. Some layers comprising lithium metal (e.g., layers consisting of and/or consisting essentially of lithium metal, layers further comprising one or more non-lithium metal species) may be relatively dense and/or non-porous. Some layers comprising lithium metal (e.g., layers consisting of and/or consisting essentially of lithium metal, layers further comprising one or more non-lithium metal species) may comprise pores. FIG. 18 shows one non-limiting example of an article 2032 comprising a layer 2232 comprising lithium metal and a non-lithium metal species. As can be seen in FIG. 18, the layer 2232 comprising lithium metal and the non-lithium metal species comprises a plurality of pores 2432. Some layers comprising lithium metal and comprising a plurality of pores, like the layer of this type shown illustratively in FIG. 18, comprise pores that are open pores (i.e., pores in fluidic communication with an environment external to the layer comprising lithium metal). Similarly, some layers comprising lithium metal and comprising a plurality of pores, like the layer of this type shown in FIG. 18, comprise pores that are closed pores (i.e., pores not in fluidic communication with an environment external to the layer comprising lithium metal, such as some pores in the bulk of the layer). Some open pores may extend through the thickness of the layer comprising lithium metal, and some open pores may not. It is possible for a porous layer comprising lithium metal to comprise all of the above-described types of pores, to comprise some of the above-described types of pores but lack others, and/or to comprise pores of a type other than those described above.

Figure 19:
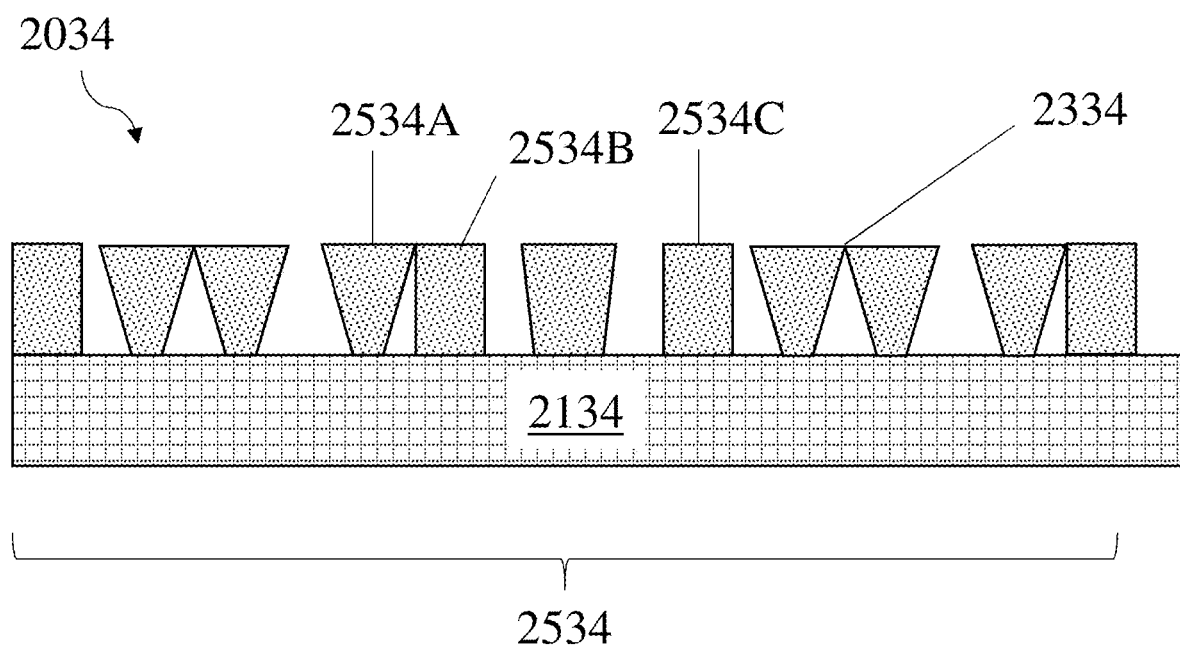
FIGS. 19 and 20 are schematic depictions of articles comprising layers comprising a plurality of columnar structures, in accordance with some embodiments.

Similarly, layers disposed on a layer comprising lithium metal (e.g., layers comprising species other than lithium metal, passivating layers) may also have a variety of suitable morphologies. In some embodiments a layer disposed on a layer comprising lithium metal comprises a plurality of columnar structures. FIG. 19 shows one example of an article 2034 comprising a layer 2134 comprising lithium metal and a layer 2334 disposed thereon that comprises a plurality of columnar structures 2534. When present, the plurality of columnar structures may make up the entirety of the layer (e.g., as shown in FIG. 19), or the layer may further comprise one or more components that are non-columnar. When present, the plurality of columnar structures may comprise columnar structures that are in topological contact with each other through the layer disposed on the layer comprising lithium metal. By way of example, with reference to FIG. 19, the columnar structures 2534A and 2534B are in topological contact with each other at the top of the layer disposed on the layer comprising lithium metal. Such embodiments may further comprise columnar structures that are not in topological contact with any other columnar structures through the layer disposed on the layer comprising lithium metal (e.g., the columnar structure 2534C in FIG. 19), or may lack such columnar structures. In some embodiments, a layer disposed on the layer comprising lithium metal lacks columnar structures in topological contact with other columnar structures therethrough.

Columnar structures present in a layer disposed on a layer containing lithium metal (e.g., a layer comprising species other than lithium metal, a passivating layer) may have a morphology that can be characterized by one or more of the zones described in the Thornton diagram. For instance, in some embodiments, a layer disposed on a layer containing lithium metal comprises porous structures that have a morphology consistent with Zone I of the Thornton diagram (e.g., comprising tapered crystallites separated by voids), Zone T of the Thornton diagram (e.g., comprising densely packed fibrous grains), Zone II of the Thornton diagram (e.g., comprising columnar grains), and/or Zone III of the Thornton diagram (e.g., comprising recrystallized grains). Such columnar structures may be in the form of a dense film and/or may comprise fine grained nanocrystals (e.g., having a preferred orientation). The Thornton diagram is described in Anders, A Structure Zone Diagram Including Plasma Based Deposition and Ion Etching, Thin Solid Films 2010; 518(15); 4087-90, which is incorporated herein by reference in its entirety for all purposes.

As can be seen from FIG. 19, a layer disposed on a layer comprising lithium metal (e.g., a layer comprising a species other than lithium metal, a passivating layer) comprising a plurality of columnar structures may be porous. For instance, the spaces between the columnar structures may take the form of pores and/or the columnar structures themselves may comprise pores. These pores may include open pores (e.g., pores that pass through the entirety of the layer, pores that do not) and/or closed pores.

Figure 20:
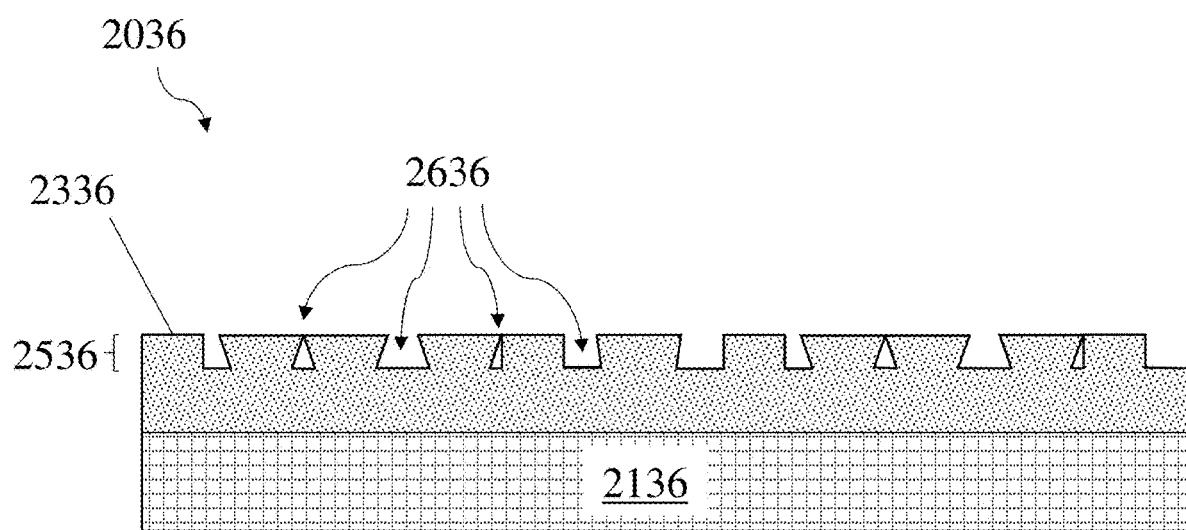

In some embodiments, a layer disposed on a layer comprising lithium metal (e.g., a layer comprising a species other than lithium metal, a passivating layer) comprises a plurality of columnar structures and/or a plurality of pores that extend partway, but not all the way, therethrough. FIG. 20 shows one example of a layer having this property. In FIG. 20, the article 2036 comprises a layer 2136 comprising lithium, and a layer 2336 disposed thereon. The layer 2336 comprises a plurality of columnar structures 2536 that extend partially through the layer from the upper surface thereof and a plurality of pores 2636 that also that extend partially through the layer from the upper surface thereof. The lower portion of the layer 2336 lacks columnar structures and pores.

It should also be noted that some layers disposed on layers comprising lithium metal (e.g., layers comprising species other than lithium metal, passivating layers) may lack columnar structures and/or pores.

In some embodiments, an article for inclusion in an electrochemical cell comprises two or more of the above-described layers. By way of example, in some embodiments, an article for inclusion in an electrochemical cell comprises a layer comprising a species other than lithium metal disposed on a layer comprising lithium metal (e.g., a passivating layer). As another example, an article for inclusion in an electrochemical cell may comprise a layer comprising lithium metal disposed on a layer comprising a species other than lithium metal (e.g., a passivating layer). As a third example, some embodiments may relate to articles comprising one layer (e.g., a layer comprising lithium metal, a layer comprising a species other than lithium metal, a passivating layer) positioned between two layers of a different type (e.g., between two layers comprising lithium metal, between two layers comprising a species other than lithium metal, between two passivating layers). Other arrangements (e.g., comprising four or more layers, comprising two adjacent layers having identical composition) are also contemplated.

It should also be understood that some articles for inclusion in electrochemical cells may comprise more components than those shown in FIGS. 15-20. By way of example, in some embodiments, an article for inclusion in an electrochemical cell further comprises a substrate, a current collector, a release layer, or any other suitable component.

Some embodiments herein relate to methods. Examples of methods contemplated include those that may be performed in modular lithium deposition systems and/or those that may be employed to form a layer comprising lithium metal and/or a layer disposed on a layer comprising lithium metal.

For instance, some embodiments relate to methods comprising depositing a layer onto a substrate positioned in a module in a modular lithium deposition chamber. The modular lithium deposition system and/or module may have one or more of the features described elsewhere herein. By way of example, the module may comprise a vacuum chamber (and, in some embodiments, the layer is deposited on a portion of the substrate positioned in a vacuum chamber). As another example, the module may have a different environment than a different portion of the modular lithium deposition system in which the layer is not deposited. For instance, in some embodiments, during deposition of a layer onto a first portion of the substrate, a second portion of the substrate is not exposed to a gas from which the layer is deposited. This may be accomplished by, for instance, positioning the first and second portions of the substrate in modules that are fluidically isolated from each other, such as vacuum chambers fluidically isolated from each other.

As another example of a suitable method, in some embodiments, a method comprises depositing a layer comprising lithium metal in a modular deposition system comprising two or more lithium metal sources positioned in two or more containers. The method may comprise depositing lithium metal from both sources (e.g., sequentially) to form a final layer comprising lithium metal having more uniformity than a layer comprising lithium metal deposited from only one of the two more sources would have (e.g., that has a reduced variation in thickness, chemical composition, and/or porosity the cross-web direction). For instance, deposition of lithium metal from the first lithium metal source may produce a first layer comprising lithium metal, and deposition of lithium metal from the second lithium metal source thereon may cause the formation of a final, more uniform lithium metal layer comprising the first lithium metal layer and lithium metal deposited thereon from the second lithium metal source.

As a third example of a suitable method, in some embodiments, a method comprises depositing an electroactive layer from a gas comprising lithium and a gas comprising a non-lithium species. These gases may react with each other to form a layer comprising both lithium metal and a species other than lithium metal.

As a fourth example of a suitable method, in some embodiments, a method comprises forming a passivating layer disposed on a layer comprising lithium metal. The passivating layer may be formed by exposing a layer comprising lithium metal to a gas reactive therewith. The gas may react with the lithium metal at the surface of the layer comprising lithium metal to form a passivating layer disposed thereon. The passivating layer may comprise a reaction product of the lithium metal in the layer comprising lithium metal with the gas.

As described elsewhere herein, in some embodiments, one or more components of a modular lithium deposition system are configured to be heated, cooled, and/or maintained at a temperature within a temperature range. Examples of suitable such temperature ranges are provided below.

One component of a modular lithium deposition system that may be configured to be cooled to and/or maintained at a temperature within a range is a drum. In some embodiments, the drum is configured to be cooled to and/or maintained at (e.g., by a cooling system) a temperature of less than or equal to 60° C., less than or equal to 55° C., less than or equal to 50° C., less than or equal to 45° C., less than or equal to 40° C., less than or equal to 35° C., less than or equal to 30° C., less than or equal to 25° C., less than or equal to 20° C., less than or equal to 15° C., less than or equal to 10° C., less than or equal to 5° C., less than or equal to 0° C., less than or equal to −5° C., less than or equal to −10° C., less than or equal to −15° C., less than or equal to −20° C., less than or equal to −25° C., or less than or equal to −30° C. In some embodiments, the drum is configured to be cooled to and/or maintained at (e.g., by a cooling system) a temperature of greater than or equal to −35° C., greater than or equal to −30° C., greater than or equal to −25° C., greater than or equal to −20° C., greater than or equal to −15° C., greater than or equal to −10° C., greater than or equal to −5° C., greater than or equal to 0° C., greater than or equal to 5° C., greater than or equal to 10° C., greater than or equal to 15° C., greater than or equal to 20° C., greater than or equal to 25° C., greater than or equal to 30° C., greater than or equal to 35° C., greater than or equal to 40° C., greater than or equal to 45° C., greater than or equal to 50° C., or greater than or equal to 55° C. Combinations of the above-referenced ranges are also possible (e.g., less than or equal to 60° C. and greater than or equal to −35° C.). Other ranges are also possible. The temperature of a drum may be determined by an IR temperature sensor.

When a modular lithium deposition system comprises two or more drums, each drum may independently be configured to be cooled to and/or maintained at a temperature in one or more of the above-referenced ranges. In some embodiments, a cooled fluid circulated across one or more surfaces of one or more drums and/or through one or more walls of one or more drums has a temperature in one or more of the above-referenced ranges.

Another component of a modular lithium deposition system that may be configured to be cooled to and/or maintained at a temperature within a range is the exterior surface of a container for a lithium metal source. In some embodiments, the exterior surface of this container is configured to be cooled to and/or maintained at (e.g., by a plurality of cooling channels) a temperature of less than or equal to 50° C., less than or equal to 45° C., less than or equal to 40° C., less than or equal to 35° C., less than or equal to 30° C., less than or equal to 25° C., or less than or equal to 20° C. In some embodiments, the exterior surface of this container is configured to be cooled to and/or maintained at (e.g., by a plurality of cooling channels) a temperature of greater than or equal to 15° C., greater than or equal to 20° C., greater than or equal to 25° C., greater than or equal to 30° C., greater than or equal to 35° C., greater than or equal to 40° C., or greater than or equal to 45° C. Combinations of the above-referenced ranges are also possible (e.g., less than or equal to 50° C. and greater than or equal to 15° C.). Other ranges are also possible. The temperature of an exterior surface of a container for a lithium source may be determined by a thermocouple positioned thereon.

When a modular lithium deposition system comprises two or more containers for lithium metal sources, each container for a lithium metal source may independently be configured to be cooled to and/or maintained at a temperature in one or more of the above-referenced ranges.

Some containers for lithium metal sources may be configured to be heated (e.g., in addition to being cooled). In some embodiments, an interior surface of this container is configured to be heated to and/or maintained at (e.g., by a heating system, such as a resistive heating system) a temperature of greater than or equal to 550° C., greater than or equal to 560° C., greater than or equal to 570° C., greater than or equal to 580° C., greater than or equal to 590° C., greater than or equal to 600° C., greater than or equal to 610° C., greater than or equal to 620° C., or greater than or equal to 630° C. In some embodiments, an interior surface of this container is configured to be heated to and/or maintained at (e.g., by a heating system, such as a resistive heating system) a temperature of less than or equal to 635° C., less than or equal to 630° C., less than or equal to 620° C., less than or equal to 610° C., less than or equal to 600° C., less than or equal to 590° C., less than or equal to 580° C., less than or equal to 570° C., or less than or equal to 560° C. Combinations of the above-referenced ranges are also possible (e.g., greater than or equal to 550° C. and less than or equal to 635° C.). Other ranges are also possible. The temperature of an interior surface of a container for a lithium source may be determined by a thermocouple positioned thereon. In some embodiments, the interior surface configured to be heated to and/or maintained at a temperature in one or more of the above-referenced ranges is one in direct contact with a lithium metal source.

When a modular lithium deposition system comprises two or more containers for lithium metal sources, each container for a lithium metal source may independently be configured to be heated to and/or maintained at a temperature in one or more of the above-referenced ranges.

Another component of a modular lithium deposition system that may be configured to be heated to and/or maintained at a temperature within a range is a shutter of a container containing a lithium metal source. In some embodiments, a shutter is configured to be heated to and/or maintained at (e.g., by a heating system, such as a resistive heating system) a temperature of greater than or equal to 550° C., greater than or equal to 560° C., greater than or equal to 570° C., greater than or equal to 580° C., greater than or equal to 590° C., greater than or equal to 600° C., greater than or equal to 610° C., greater than or equal to 620° C., greater than or equal to 630° C. or greater than or equal to 640° C. In some embodiments, a shutter is configured to be heated to and/or maintained at (e.g., by a heating system, such as a resistive heating system) a temperature of less than or equal to 645° C., less than or equal to 640° C., less than or equal to 630° C., less than or equal to 620° C., less than or equal to 610° C., less than or equal to 600° C., less than or equal to 590° C., less than or equal to 580° C., less than or equal to 570° C., or less than or equal to 560° C. Combinations of the above-referenced ranges are also possible (e.g., greater than or equal to 550° C. and less than or equal to 645° C.). Other ranges are also possible. The temperature of a shutter of a container for a lithium source may be determined by a thermocouple positioned thereon.

When a modular lithium deposition system comprises two or more containers for lithium metal sources, each container for a lithium metal source may independently comprise a shutter that is configured to be heated to and/or maintained at a temperature in one or more of the above-referenced ranges.

As described elsewhere herein, in some embodiments, a modular lithium deposition system comprises one or more vacuum chambers. The vacuum chamber(s) may be configured to be maintained at a pressure of less than atmospheric. By way of example, in some embodiments, a vacuum chamber is configured to be held at a pressure of less than or equal to $10^{-4}$ Torr, less than or equal to $5*10^{-5}$ Torr, less than or equal to $2*10^{-5}$ Torr, less than or equal to $10^{-5}$ Torr, less than or equal to $5*10^{-6}$ Torr, less than or equal to $2*10^{-6}$ Torr, less than or equal to $10^{-6}$ Torr, less than or equal to $5*10^{-7}$ Torr, or less than or equal to $2*10^{-7}$ Torr. In some embodiments, a vacuum chamber is configured to be held at a pressure of greater than or equal to $10^{-7}$ Torr, greater than or equal to $2*10^{-7}$ Torr, greater than or equal to $5*10^{-7}$ Torr, greater than or equal to $10^{-6}$ Torr, greater than or equal to $2*10^{-6}$ Torr, greater than or equal to $5*10^{-6}$ Torr, greater than or equal to $10^{-5}$ Torr, greater than or equal to $2*10^{-5}$ Torr, or greater than or equal to $5*10^{-5}$ Torr. Combinations of the above-referenced ranges are also possible (e.g., less than or equal to $10^{-6}$ Torr and greater than or equal to $10^{-7}$ Torr, or less than or equal to $10^{-4}$ Torr and greater than or equal to $10^{-5}$ Torr). Other ranges are also possible. The pressure of a vacuum chamber may be determined by a pressure gauge positioned therein.

When a modular lithium deposition system comprises two or more vacuum chambers, each vacuum chamber may independently be configured to maintained at a pressure in one or more of the ranges described above.

As described elsewhere herein, some embodiments relate to modular lithium deposition systems comprising sources, such as sources of gases reactive with lithium metal and/or configured to deposit to form a layer disposed on a layer comprising lithium metal. As also described elsewhere herein, some embodiments relate to methods of depositing a layer, such as a passivating layer, on a layer comprising lithium metal. In some embodiments, the layer is deposited by condensing the gases thereon. It is also possible for a reaction product of the gases with each other and/or with lithium metal (e.g., in the lithium metal layer) may condense to form the relevant layer. A variety of suitable gases are suitable for such purposes, including $CO_2$, $O_2$, $H_2O$, COS, $SO_2$, $CS_2$, $H_2$, $N_2$, $N_2O$, $NH_3$, $SF_6$, freons, fluorobenzene, $SiF_4$, $C_2H_2$, air (e.g., clean dry air, artificial air), species comprising boron (e.g., esters of boronic acids), species comprising phosphorus (e.g., esters of phosphoric acids), species comprising selenium, species comprising tellurium, and/or species comprising halogen (e.g., species comprising fluorine, bromine, and/or iodine, including those mentioned above). In some embodiments, one or more gases suitable for use in atomic layer deposition are employed to deposit a layer comprising lithium metal and/or a layer thereon. Some gases that may be employed for depositing a layer comprising lithium metal and/or a layer thereon may be activated (e.g., by a plasma) prior to and/or concurrently with the deposition of the layer therefrom.

In some embodiments, two or more gases are used in combination. For instance, in some embodiments, it may be desirable to deposit a layer from a combination of gases including both $H_2O$ and another, different gas. As another example, in some embodiments, a combination of $CO_2$ with $N_2$ and/or $O_2$ may be particularly advantageous. In some embodiments, as described elsewhere herein, the layer disposed on the layer comprising lithium metal may be deposited in the further presence of an inert gas, such as argon and/or helium.

When a layer is deposited from a combination of gases including both $H_2O$ and another, different gas, the relative humidity of the combination of gases may be a variety of suitable values. In other words, the ratio of the amount of $H_2O$ in the combination of gases to the amount of $H_2O$ soluble in the combination of gases may be selected as desired. In some embodiments, the relative humidity of the combination of gases is similar to that of a typical dry room (e.g., less than or equal to 10%). It is also possible for the relative humidity of the combination of gases to have another value (e.g., a value in excess of that in typical dry rooms). In some embodiments, a layer is deposited from a combination of gases having a relative humidity of greater than or equal to 0%, greater than or equal to 1%, greater than or equal to 2%, greater than or equal to 5%, greater than or equal to 7.5%, greater than or equal to 10%, greater than or equal to 12.5%, greater than or equal to 15%, greater than or equal to 20%, greater than or equal to 25%, greater than or equal to 30%, greater than or equal to 35%, greater than or equal to 40%, or greater than or equal to 45%. In some embodiments, a layer is deposited from a combination of gases having a relative humidity of less than or equal to 50%, less than or equal to 45%, less than or equal to 40%, less than or equal to 35%, less than or equal to 30%, less than or equal to 25%, less than or equal to 20%, less than or equal to 15%, less than or equal to 12.5%, less than or equal to 10%, less than or equal to 7.5%, less than or equal to 5%, less than or equal to 2%, or less than or equal to 1%.

Combinations of the above-referenced ranges are also possible (e.g., greater than or equal to 0% and less than or equal to 50%, greater than or equal to 0% and less than or equal to 30%, or greater than or equal to 0% and less than or equal to 10%). Other ranges are also possible.

As described elsewhere herein, some embodiments relate to layers comprising lithium metal (e.g., electroactive layers comprising lithium metal). For instance, some embodiments relate to the deposition of such layers, some embodiments relate to articles for inclusion in electrochemical cells comprising such layers, and some embodiments relate to modular lithium deposition systems configured to deposit such layers. Further properties of layers comprising lithium metal are described in further detail below.

Layers comprising lithium metal may have a variety of suitable thicknesses. In some embodiments, a layer comprising lithium metal has a thickness of greater than or equal to 1 micron, greater than or equal to 2 microns, greater than or equal to 5 microns, greater than or equal to 7.5 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, a layer comprising lithium metal has a thickness of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 7.5 microns, less than or equal to 5 microns, or less than or equal to 2 microns. Combinations of the above-referenced ranges are also possible (e.g., greater than or equal to 1 micron and less than or equal to 50 microns, or greater than or equal to 2 microns and less than or equal to 30 microns). Other ranges are also possible. The thickness of a layer comprising lithium metal may be determined by eddy current sensing.

When an article for inclusion in an electrochemical cell comprises two or more layers comprising lithium metal, each layer comprising lithium metal may independently have a thickness in one or more of the above-referenced ranges.

Layers comprising lithium metal may have a variety of suitable porosities. As described elsewhere herein, some layers comprising lithium metal may be relatively dense (e.g., they may have a porosity of greater than or equal to 0% and less than or equal to 5%), or may comprise a plurality of pores that occupy an appreciable volume fraction thereof (e.g., they may have a porosity of greater than or equal to 5% and less than or equal to 25%, or greater than or equal to 5% and less than or equal to 15%). In some embodiments, a layer comprising lithium metal has a porosity of greater than or equal to 0%, greater than or equal to 0.5%, greater than or equal to 1%, greater than or equal to 1.5%, greater than or equal to 2%, greater than or equal to 3%, greater than or equal to 4%, greater than or equal to 5%, greater than or equal to 7.5%, greater than or equal to 10%, greater than or equal to 12.5%, greater than or equal to 15%, greater than or equal to 17.5%, greater than or equal to 20%, or greater than or equal to 22.5%. In some embodiments, a layer comprising lithium metal has a porosity of less than or equal to 25%, less than or equal to 22.5%, less than or equal to 20%, less than or equal to 17.5%, less than or equal to 15%, less than or equal to 12.5%, less than or equal to 10%, less than or equal to 7.5%, less than or equal to 5%, less than or equal to 4%, less than or equal to 3%, less than or equal to 2%, less than or equal to 1.5%, less than or equal to 1%, or less than or equal to 0.5%. Combinations of the above-referenced ranges are also possible (e.g., greater than or equal to 0% and less than or equal to 25%, greater than or equal to 0% and less than or equal to 5%, greater than or equal to 5% and less than or equal to 25%, or greater than or equal to 5% and less than or equal to 25%). Other ranges are also possible.

A layer comprising lithium metal may have a porosity in one or more of the above-referenced ranges as determined by dividing the measured density of the layer comprising lithium metal by the theoretical density of the layer comprising lithium metal. The measured density of the layer comprising lithium metal may be determined by the following formula: Measured density of layer comprising lithium metal=[weight of layer comprising lithium metal]/[(area of layer comprising lithium metal)*(thickness of layer comprising lithium metal as measured by drop gauge)].

It is also possible for a layer comprising lithium to have a porosity in one or more of the above-referenced ranges as measured by scanning electron microscopy. Briefly, the layer comprising lithium may be imaged using a scanning electron microscope operated in immersion mode at an accelerating voltage of 5 kV, a working distance of 5 mm, a spot size of 3.5, and a magnification of 25,000. The image may be analyzed with ImageJ configured to have 8-bit type, 255 gray levels, a width of 27.43 inches, a height of 19.69 inches, an image size of 1.6 MB, and a resolution of 56 pixels per inch. In ImageJ, the brightness/contrast minimum may be set to 0, the brightness/contrast maximum may be set to 255, the threshold lower value may be set to 0, and the threshold upper value may be set at a value which makes the pores appear to be black. Then, ImageJ may be employed to analyze the resultant image to determine the percentage of the area that is black. This percentage may be taken to be equivalent to the porosity of the layer comprising lithium.

When an article for inclusion in an electrochemical cell comprises two or more layers comprising lithium metal, each layer comprising lithium metal may independently have a porosity in one or more of the above-referenced ranges as measured by either or both of the two-above described measurement techniques.

Figure 21A:
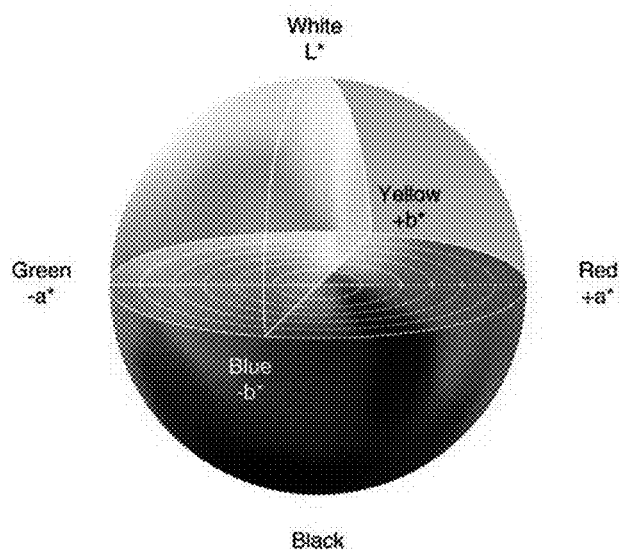
FIGS. 21A and 21B are schematic depictions of color spaces, in accordance with some embodiments.
Figure 21B:
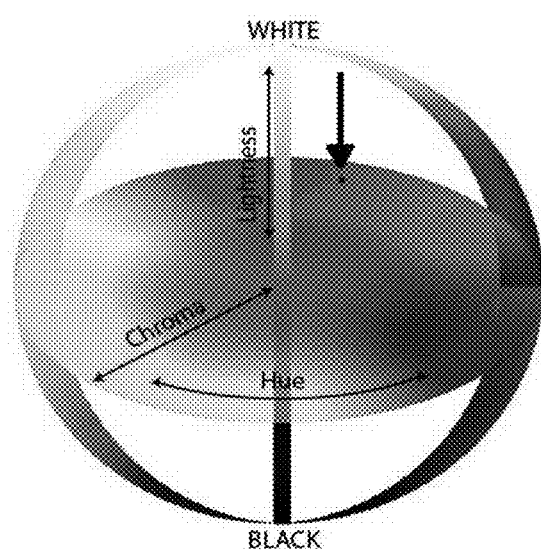

In some embodiments, information regarding the morphology of a layer comprising lithium metal may be obtained from the color space thereof. The color space is a combination of lightness, saturation, chroma, and hue that characterizes the visual appearance of an object. FIGS. 21A and 21B show how these parameters together describe the visual appearance of objects. It should also be understood that the layer comprising lithium may appear visually to have a variety of colors, such as red, yellow, green, and/or blue.

In some embodiments, a layer comprising lithium has a lightness of greater than or equal to 10, greater than or equal to 12.5, greater than or equal to 15, greater than or equal to 17.5, greater than or equal to 20, greater than or equal to 22.5, greater than or equal to 25, greater than or equal to 27.5, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, greater than or equal to 75, or greater than or equal to 80. In some embodiments, a layer comprising lithium has a lightness of less than or equal to 85, less than or equal to 80, less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 27.5, less than or equal to 25, less than or equal to 22.5, less than or equal to 20, less than or equal to 17.5, less than or equal to 15, or less than or equal to 12.5. Combinations of the above-referenced ranges are also possible (e.g., greater than or equal to 10 and less than or equal to 85, or greater than or equal to 20 and less than or equal to 60). Other ranges are also possible.

When an article for inclusion in an electrochemical cell comprises two or more layers comprising lithium metal, each layer comprising lithium metal may independently have a lightness in one or more of the above-referenced ranges.

In some embodiments, a layer comprising lithium has a red/green saturation (an "a" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a layer comprising lithium has a red/green saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are also possible.

When an article for inclusion in an electrochemical cell comprises two or more layers comprising lithium metal, each layer comprising lithium metal may independently have a red/green saturation in one or more of the above-referenced ranges.

In some embodiments, a layer comprising lithium has a yellow/blue saturation (a "b" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a layer comprising lithium has a yellow/blue saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are also possible.

When an article for inclusion in an electrochemical cell comprises two or more layers comprising lithium metal, each layer comprising lithium metal may independently have a yellow/blue saturation in one or more of the above-referenced ranges.

In some embodiments, a layer comprising lithium has a chroma of greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a layer comprising lithium has a chroma of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, or less than or equal to −1.5. Combinations of the above-referenced ranges are also possible (e.g., greater than or equal to −2 and less than or equal to 20, or greater than or equal to −1 and less than or equal to 5). Other ranges are also possible.

When an article for inclusion in an electrochemical cell comprises two or more layers comprising lithium metal, each layer comprising lithium metal may independently have a chroma in one or more of the above-referenced ranges.

In some embodiments, a layer comprising lithium has a hue of greater than or equal to −2°, greater than or equal to 0°, greater than or equal to 2°, greater than or equal to 5°, greater than or equal to 7.5°, greater than or equal to 10°, greater than or equal to 20°, greater than or equal to 50°, greater than or equal to 75°, greater than or equal to 100°, greater than or equal to 125°, greater than or equal to 150°, greater than or equal to 175°, greater than or equal to 200°, greater than or equal to 225°, greater than or equal to 250°, greater than or equal to 275°, greater than or equal to 300°, or greater than or equal to 325°. In some embodiments, a layer comprising lithium has a hue of less than or equal to 360°, less than or equal to 325°, less than or equal to 300°, less than or equal to 275°, less than or equal to 250°, less than or equal to 225°, less than or equal to 200°, less than or equal to 175°, less than or equal to 150°, less than or equal to 125°, less than or equal to 100°, less than or equal to 75°, less than or equal to 50°, less than or equal to 20°, less than or equal to 10°, less than or equal to 7.5°, less than or equal to 5°, less than or equal to 2°, or less than or equal to 0°. Combinations of the above-referenced ranges are also possible (e.g., greater than or equal to −2° and less than or equal to 360°, or greater than or equal to 10° and less than or equal to 350°). Other ranges are also possible.

When an article for inclusion in an electrochemical cell comprises two or more layers comprising lithium metal, each layer comprising lithium metal may independently have a hue in one or more of the above-referenced ranges.

In some embodiments, a layer comprising lithium metal is relatively smooth. The smoothness or roughness of a layer comprising lithium metal may be characterized in a variety of manners. Suitable parameters that may be employed to characterize the roughness of a layer comprising lithium metal and suitable values of such parameters are described in further detail below. Some of the techniques below may be employed with reference to cross-section of the layer comprising lithium metal, and it should be understood that some layers comprising lithium metal may comprise at least one cross-section having one or more of the properties described below, that some layers comprising lithium metal may be made up exclusively of cross-sections having one or more of the properties described below, and that some layers comprising lithium metal may have a morphology such that a majority of the cross-sections have one or more of the properties below (e.g., at least 50% of the cross-sections, at least 75% of the cross-sections, at least 90% of the cross-sections, at least 95% of the cross-sections, or at least 99% of the cross-sections).

One example of a parameter that may be employed to characterize the roughness of a layer comprising lithium metal is $R_a$, which is the arithmetic average deviation across the cross-section of the height of the layer from the mean line of the cross section (i.e., the line which is parallel to the surface and divides the cross-section such that the area between the surface topography and the line therebeneath is equivalent to the area between the surface topography and the line thereabove). In some embodiments, a layer comprising lithium metal has a value of $R_a$ of less than or equal to 1.5 microns, less than or equal to 1.25 microns, less than or equal to 1 micron, less than or equal to 0.75 microns, less than or equal to 0.5 microns, less than or equal to 0.25 microns, less than or equal to 0.2 microns, less than or equal to 0.18 microns, less than or equal to 0.15 microns, less than or equal to 0.125 microns, less than or equal to 0.1 micron, or less than or equal to 0.075 microns. In some embodiments, a layer comprising lithium metal has a value of $R_a$ of greater than or equal to 0.05 microns, greater than or equal to 0.075 microns, greater than or equal to 0.1 micron, greater than or equal to 0.125 microns, greater than or equal to 0.15 microns, greater than or equal to 0.18 microns, greater than or equal to 0.2 microns, greater than or equal to 0.25 microns, greater than or equal to 0.5 microns, greater than or equal to 0.75 microns, greater than or equal to 1 micron, or greater than or equal to 1.25 microns. Combinations of the above-referenced ranges are also possible (e.g., less than or equal to 1.5 microns and greater than or equal to 0.05 microns, or less than or equal to 1.5 microns and greater than or equal to 0.18 microns). Other ranges are also possible.

When an article for inclusion in an electrochemical cell comprises two or more layers comprising lithium metal, each layer comprising lithium metal may independently have a value of $R_a$ in one or more of the above-referenced ranges.

A second example of a parameter that may be employed to characterize the roughness of a layer comprising lithium metal is $R_q$, which is the root mean square deviation across the cross-section of the height of the layer from the mean line of the cross section. In some embodiments, a layer comprising lithium metal has a value of $R_q$ of less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, less than or equal to 0.75 microns, less than or equal to 0.5 microns, less than or equal to 0.4 microns, less than or equal to 0.3 microns, or less than or equal to 0.2 microns. In some embodiments, a layer comprising lithium metal has a value of $R_q$ of greater than or equal to 0.1 micron, greater than or equal to 0.2 microns, greater than or equal to 0.3 microns, greater than or equal to 0.4 microns, greater than or equal to 0.5 microns, greater than or equal to 0.75 microns, greater than or equal to 1 micron, greater than or equal to 1.25 microns, greater than or equal to 1.5 microns, greater than or equal to 1.75 microns, greater than or equal to 2 microns, or greater than or equal to 2.25 microns. Combinations of the above-referenced ranges are also possible (e.g., less than or equal to 2.5 microns and greater than or equal to 0.1 micron, or less than or equal to 2 microns and greater than or equal to 0.2 microns). Other ranges are also possible.

When an article for inclusion in an electrochemical cell comprises two or more layers comprising lithium metal, each layer comprising lithium metal may independently have a value of $R_q$ in one or more of the above-referenced ranges.

A third example of a parameter that may be employed to characterize the roughness of a layer comprising lithium metal is $R_p$, which is the difference between the maximum height in the cross-section and the height of the mean line. In some embodiments, a layer comprising lithium metal has a value of $R_p$ of less than or equal to 15 microns, less than or equal to 12.5 microns, less than or equal to 10 microns, less than or equal to 7.5 microns, less than or equal to 5 microns, less than or equal to 2.5 microns, less than or equal to 2 microns, less than or equal to 1.5 microns, or less than or equal to 1 micron. In some embodiments, a layer comprising lithium metal has a value of $R_p$ of greater than or equal to 0.5 microns, greater than or equal to 1 micron, greater than or equal to 1.5 microns, greater than or equal to 2 microns, greater than or equal to 2.5 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns, or less than or equal to 15 microns and greater than or equal to 1 micron). Other ranges are also possible.

When an article for inclusion in an electrochemical cell comprises two or more layers comprising lithium metal, each layer comprising lithium metal may independently have a value of $R_p$ in one or more of the above-referenced ranges.

Another example of a parameter that may be employed to characterize the roughness of a layer comprising lithium metal is $R_v$, which is the difference between the minimum height in the cross-section and the height of the mean line. In some embodiments, a layer comprising lithium metal has a value of $R_v$ of greater than or equal to less than or equal to −15 microns, greater than or equal to −12.5 microns, greater than or equal to −10 microns, greater than or equal to −7.5 microns, greater than or equal to −5 microns, greater than or equal to −2.5 microns, greater than or equal to −2 microns, greater than or equal to −1.5 microns, or greater than or equal to −1 micron. In some embodiments, a layer comprising lithium metal has a value of $R_v$ of less than or equal to −0.5 microns, less than or equal to −1 micron, less than or equal to −1.5 microns, less than or equal to −2 microns, less than or equal to −2.5 microns, less than or equal to −5 microns, less than or equal to −7.5 microns, less than or equal to −10 microns, or less than or equal to −12.5 microns. Combinations of the above-referenced ranges are also possible (e.g., greater than or equal to −15 microns and less than or equal to −0.5 microns, or greater than or equal to −15 microns and less than or equal to −1 micron). Other ranges are also possible.

When an article for inclusion in an electrochemical cell comprises two or more layers comprising lithium metal, each layer comprising lithium metal may independently have a value of $R_v$ in one or more of the above-referenced ranges.

Another example of a parameter that may be employed to characterize the roughness of a layer comprising lithium metal is $R_t$, which is the sum of the absolute values of $R_p$ and $R_v$. In some embodiments, a layer comprising lithium metal has a value of $R_t$ of less than or equal to 30 microns, less than or equal to 25 microns, less than or equal to 20 microns, less than or equal to 15 microns, less than or equal to 10 microns, less than or equal to 7.5 microns, less than or equal to 5 microns, less than or equal to 4 microns, less than or equal to 3 microns, less than or equal to 2.5 microns, less than or equal to 2 microns, or less than or equal to 1.5 microns. In some embodiments, a layer comprising lithium metal has a value of $R_t$ of greater than or equal to 1 micron, greater than or equal to 1.5 microns, greater than or equal to 2 microns, greater than or equal to 2.5 microns, greater than or equal to 3 microns, greater than or equal to 4 microns, greater than or equal to 5 microns, greater than or equal to 7.5 microns, greater than or equal to 10 microns, greater than or equal to 15 microns, greater than or equal to 20 microns, or greater than or equal to 25 microns. Combinations of the above-referenced ranges are also possible (e.g., less than or equal to 25 microns and greater than or equal to 1 micron, or less than or equal to 30 microns and greater than or equal to 2 microns). Other ranges are also possible.

When an article for inclusion in an electrochemical cell comprises two or more layers comprising lithium metal, each layer comprising lithium metal may independently have a value of $R_t$ in one or more of the above-referenced ranges.

Another example of a parameter that may be employed to characterize the roughness of a layer comprising lithium metal is $R_{pm}$, which is the mean height of the peaks in the cross-section with respect to the mean line. In some embodiments, a layer comprising lithium metal has a value of $R_{pm}$ of less than or equal to 15 microns, less than or equal to 12.5 microns, less than or equal to 10 microns, less than or equal to 7.5 microns, less than or equal to 5 microns, less than or equal to 3 microns, less than or equal to 2 microns, less than or equal to 1.5 microns, less than or equal to 1 micron, or less than or equal to 0.75 microns. In some embodiments, a layer comprising lithium metal has a value of $R_{pm}$ of greater than or equal to 0.5 microns, greater than or equal to 0.75 microns, greater than or equal to 1 micron, greater than or equal to 1.5 microns, greater than or equal to 2 microns, greater than or equal to 3 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns, or less than or equal to 10 microns and greater than or equal to 1 micron). Other ranges are also possible.

When an article for inclusion in an electrochemical cell comprises two or more layers comprising lithium metal, each layer comprising lithium metal may independently have a value of $R_{pm}$ in one or more of the above-referenced ranges.

Another example of a parameter that may be employed to characterize the roughness of a layer comprising lithium metal is $R_{vm}$, which is the mean height of the valleys in the cross-section with respect to the mean line. In some embodiments, a layer comprising lithium metal has a value of $R_{vm}$ of greater than or equal to −15 microns, greater than or equal to −12.5 microns, greater than or equal to −10 microns, greater than or equal to −7.5 microns, greater than or equal to −5 microns, greater than or equal to −3 microns, greater than or equal to −2 microns, greater than or equal to −1.5 microns, greater than or equal to −1 micron, or greater than or equal to −0.75 microns. In some embodiments, a layer comprising lithium metal has a value of $R_{vm}$ of less than or equal to −0.5 microns, less than or equal to −0.75 microns, less than or equal to −1 micron, less than or equal to −1.5 microns, less than or equal to −2 microns, less than or equal to −3 microns, less than or equal to −5 microns, less than or equal to −7.5 microns, less than or equal to −10 microns, or less than or equal to −12.5 microns. Combinations of the above-referenced ranges are also possible (e.g., greater than or equal to −15 microns and less than or equal to −1 micron, or greater than or equal to −10 microns and less than or equal to −0.5 microns). Other ranges are also possible.

When an article for inclusion in an electrochemical cell comprises two or more layers comprising lithium metal, each layer comprising lithium metal may independently have a value of $R_{vm}$ in one or more of the above-referenced ranges.

Another example of a parameter that may be employed to characterize the roughness of a layer comprising lithium metal is $R_z$, which is the difference in height between the average height of the five highest peaks in the cross-section and the five deepest valleys in the cross-section. In some embodiments, a layer comprising lithium metal has a value of $R_z$ of less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, or less than or equal to 2.5 microns. In some embodiments, a layer comprising lithium metal has a value of $R_z$ of greater than or equal to 1 micron, greater than or equal to 2.5 microns, greater than or equal to 5 microns, greater than or equal to 7.5 microns, greater than or equal to 10 microns, greater than or equal to 12.5 microns, greater than or equal to 15 microns, or greater than or equal to 17.5 microns. Combinations of the above-referenced ranges are also possible (e.g., less than or equal to 20 microns and greater than or equal to 1 micron). Other ranges are also possible.

When an article for inclusion in an electrochemical cell comprises two or more layers comprising lithium metal, each layer comprising lithium metal may independently have a value of $R_z$ in one or more of the above-referenced ranges.

Another example of a parameter that may be employed to characterize the roughness of a layer comprising lithium metal is $S_m$, which is the area of material in the cross-section that is present between the top of the cross-section and the height of the cross-section in the $90^{th}$ percentile (i.e., the value of height that is greater than 90% of the heights in the cross-section). In some embodiments, a layer comprising lithium metal has a value of $S_m$ of less than or equal to 1 square micron, less than or equal to 0.75 square microns, less than or equal to 0.5 square microns, less than or equal to 0.3 square microns, less than or equal to 0.2 square microns, less than or equal to 0.15 square microns, less than or equal to 0.1 square micron, less than or equal to 0.075 square microns, less than or equal to 0.05 square microns, less than or equal to 0.03 square microns, less than or equal to 0.02 square microns, less than or equal to 0.015 square microns, less than or equal to 0.01 square micron, less than or equal to 0.0075 square microns, less than or equal to 0.005 square microns, less than or equal to 0.003 square microns, or less than or equal to 0.002 square microns. In some embodiments, a layer comprising lithium metal has a value of $S_m$ of greater than or equal to 0.001 square micron, greater than or equal to 0.002 square microns, greater than or equal to 0.003 square microns, greater than or equal to 0.005 square microns, greater than or equal to 0.0075 square microns, greater than or equal to 0.01 square micron, greater than or equal to 0.02 square microns, greater than or equal to 0.05 square microns, greater than or equal to 0.075 square microns, greater than or equal to 0.1 square micron, greater than or equal to 0.15 square microns, greater than or equal to 0.2 square microns, greater than or equal to 0.3 square microns, greater than or equal to 0.5 square microns, or greater than or equal to 0.75 square microns. Combinations of the above-referenced ranges are also possible (e.g., less than or equal to 1 square micron and greater than or equal to 0.001 square micron, or less than or equal to 0.2 square microns and greater than or equal to 0.01 square micron). Other ranges are also possible.

When an article for inclusion in an electrochemical cell comprises two or more layers comprising lithium metal, each layer comprising lithium metal may independently have a value of $S_m$ in one or more of the above-referenced ranges.

Another example of a parameter that may be employed to characterize the roughness of a layer comprising lithium metal is $S_{bi}$, which is the difference in height between the height of the cross-section in the $95^{th}$ percentile (i.e., the value of height that is greater than 95% of the heights in the cross-section) and the height of the mean line. In some embodiments, a layer comprising lithium metal has a value of $S_{bi}$ of less than or equal to 2 microns, less than or equal to 1.75 microns, less than or equal to 1.5 microns, less than or equal to 1.25 microns, less than or equal to 1.1 microns, less than or equal to 1 micron, less than or equal to 0.95 microns, less than or equal to 0.9 microns, less than or equal to 0.85 microns, less than or equal to 0.8 microns, less than or equal to 0.6 microns, less than or equal to 0.4 microns, less than or equal to 0.35 microns, less than or equal to 0.3 microns, less than or equal to 0.25 microns, less than or equal to 0.2 microns, less than or equal to 0.15 microns, or less than or equal to 0.125 microns. In some embodiments, a layer comprising lithium metal has a value of $S_{bi}$ of greater than or equal to 0.1 micron, greater than or equal to 0.125 microns, greater than or equal to 0.15 microns, greater than or equal to 0.2 microns, greater than or equal to 0.25 microns, greater than or equal to 0.3 microns, greater than or equal to 0.35 microns, greater than or equal to 0.4 microns, greater than or equal to 0.6 microns, greater than or equal to 0.8 microns, greater than or equal to 0.85 microns, greater than or equal to 0.9 microns, greater than or equal to 0.95 microns, greater than or equal to 1 micron, greater than or equal to 1.1 microns, greater than or equal to 1.25 microns, greater than or equal to 1.5 microns, or greater than or equal to 1.75 microns. Combinations of the above-referenced ranges are also possible (e.g., less than or equal to 2 microns and greater than or equal to 0.1 micron, or less than or equal to 0.9 microns and greater than or equal to 0.3 microns). Other ranges are also possible.

When an article for inclusion in an electrochemical cell comprises two or more layers comprising lithium metal, each layer comprising lithium metal may independently have a value of $S_{bi}$ in one or more of the above-referenced ranges.

Another example of a parameter that may be employed to characterize the roughness of a layer comprising lithium metal is $S_{dq}$, which is the root mean square of the slope of the surface of the layer. In some embodiments, a layer comprising lithium metal has a value of $S_{dq}$ of less than or equal to 100, less than or equal to 90, less than or equal to 80, less than or equal to 70, less than or equal to 60, less than or equal to 50, less than or equal to 40, less than or equal to 30, or less than or equal to 20. In some embodiments, a layer comprising lithium metal has a value of $S_{dq}$ of greater than or equal to 10, greater than or equal to 20, greater than or equal to 30, greater than or equal to 40, greater than or equal to 50, greater than or equal to 60, greater than or equal to 70, greater than or equal to 80, or greater than or equal to 90. Combinations of the above-referenced ranges are also possible (e.g., less than or equal to 100 and greater than or equal to 10, or less than or equal to 80 and greater than or equal to 20). Other ranges are also possible.

When an article for inclusion in an electrochemical cell comprises two or more layers comprising lithium metal, each layer comprising lithium metal may independently have a value of $S_{dq}$ in one or more of the above-referenced ranges.

Another example of a parameter that may be employed to characterize the roughness of a layer comprising lithium metal is $S_{ku}$, which is the kurtosis of the height distribution of the cross-section. In some embodiments, a layer comprising lithium metal has a value of $S_{ku}$ of less than or equal to 70, less than or equal to 60, less than or equal to 50, less than or equal to 40, less than or equal to 30, less than or equal to 25, less than or equal to 20, less than or equal to 15, less than or equal to 12.5, less than or equal to 10, less than or equal to 8, less than or equal to 6, less than or equal to 5, less than or equal to 4, less than or equal to 3.5, less than or equal to 3, or less than or equal to 2.5. In some embodiments, a layer comprising lithium metal has a value of $S_{ku}$ of greater than or equal to 2, greater than or equal to 2.5, greater than or equal to 3, greater than or equal to 3.5, greater than or equal to 4, greater than or equal to 5, greater than or equal to 6, greater than or equal to 8, greater than or equal to 10, greater than or equal to 12.5, greater than or equal to 15, greater than or equal to 20, greater than or equal to 25, greater than or equal to 30, greater than or equal to 40, greater than or equal to 50, or greater than or equal to 60. Combinations of the above-referenced ranges are also possible (e.g., less than or equal to 70 and greater than or equal to 2, or less than or equal to 15 and greater than or equal to 2). Other ranges are also possible.

When an article for inclusion in an electrochemical cell comprises two or more layers comprising lithium metal, each layer comprising lithium metal may independently have a value of $S_{ku}$ in one or more of the above-referenced ranges.

Another example of a parameter that may be employed to characterize the roughness of a layer comprising lithium metal is $S_{sk}$, which is the skewness of the height distribution of the cross-section. In some embodiments, a layer comprising lithium metal has a value of $S_{sk}$ of less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.75, less than or equal to 0.5, less than or equal to 0.3, less than or equal to 0.2, less than or equal to 0.1, less than or equal to 0, less than or equal to −0.1, less than or equal to −0.2, less than or equal to −0.3, less than or equal to −0.5, less than or equal to −0.75, less than or equal to −1, or less than or equal to −1.5. In some embodiments, a layer comprising lithium metal has a value of $S_{sk}$ of greater than or equal to −2, greater than or equal to −1.5, greater than or equal to −1, greater than or equal to −0.75, greater than or equal to −0.5, greater than or equal to −0.3, greater than or equal to −0.2, greater than or equal to −0.1, greater than or equal to 0, greater than or equal to 0.1, greater than or equal to 0.2, greater than or equal to 0.3, greater than or equal to 0.5, greater than or equal to 0.75, greater than or equal to 1, greater than or equal to 1.5, greater than or equal to 2, greater than or equal to 2.5, greater than or equal to 3, greater than or equal to 3.5, greater than or equal to 4, or greater than or equal to 4.5. Combinations of the above-referenced ranges are also possible (e.g., less than or equal to 5 and greater than or equal to −2, or less than or equal to 3 and greater than or equal to −0.2). Other ranges are also possible.

When an article for inclusion in an electrochemical cell comprises two or more layers comprising lithium metal, each layer comprising lithium metal may independently have a value of $S_{ku}$ in one or more of the above-referenced ranges.

As described above, in some embodiments, a layer comprising lithium metal further comprises one or more species other than lithium metal. For instance, a layer comprising lithium may also comprise a metal, a non-metal and/or a metalloid. Suitable metals include aluminum, magnesium, indium, and/or tin (e.g., one or more such metals may be alloyed with the lithium metal). Suitable non-metals include carbon, oxygen, hydrogen (e.g., in hydride form, bonded covalently to carbon), sulfur, nitrogen, selenium, and various halogens (e.g., fluorine, bromine, iodine). Suitable metalloids include boron, silicon, antimony, and tellurium. In some embodiments, a layer comprising lithium comprises lithium and further comprises two or more further species (e.g., two or more non-metals). As also described above, such species may form a single phase with the lithium metal (e.g., in the form of an alloy) or a phase that is present in the layer in addition to a phase comprising lithium metal (e.g., a phase that is non-electroactive, a phase that comprises a ceramic). Phases separated from a phase comprising lithium metal may have one or more features described with respect to passivating layers elsewhere herein (e.g., chemical composition).

When an article for inclusion in an electrochemical cell comprises two or more layers comprising lithium metal, each layer comprising lithium metal may independently comprise one or more of the above-referenced species.

In some embodiments, a first electrode comprises an electroactive material that contains at least 50 wt % lithium. In some cases, the electroactive material contains at least 75 wt %, at least 90 wt %, at least 95 wt %, or at least 99 wt % lithium.

When an article for inclusion in an electrochemical cell comprises two or more layers comprising lithium metal, each layer comprising lithium metal may independently comprise an amount of lithium in one or more of the above-referenced ranges.

In some embodiments, a layer comprising lithium metal further comprises both carbon and oxygen. In such layers, the ratio of carbon to oxygen may generally be selected as desired. For instance, the ratio of carbon to oxygen may be greater than or equal to 0, greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, greater than or equal to 0.4, or greater than or equal to 0.45. In some embodiments, the ratio of carbon to oxygen in a layer comprising lithium metal is less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, less than or equal to 0.02, or less than or equal to 0.01. Combinations of the above-referenced ranges are also possible (e.g., greater than or equal to 0 and less than or equal to 0.1, or greater than or equal to 0.01 and less than or equal to 0.5). Other ranges are also possible. The ratio of carbon to oxygen in a layer comprising lithium metal may be determined by energy dispersive spectroscopy.

When an article for inclusion in an electrochemical cell comprises two or more layers comprising lithium metal, each layer comprising lithium metal may independently have a ratio of carbon to oxygen in one or more of the above-referenced ranges.

In some embodiments, a layer comprising lithium metal further comprises both carbon and sulfur. In such layers, the ratio of carbon to sulfur may generally be selected as desired. For instance, the ratio of carbon to sulfur may be greater than or equal to 0, greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, or greater than or equal to 0.4. In some embodiments, the ratio of carbon to sulfur in a layer comprising lithium metal is less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, less than or equal to 0.02, or less than or equal to 0.01. Combinations of the above-referenced ranges are also possible (e.g., greater than or equal to 0 and less than or equal to 0.1, or greater than or equal to 0.01 and less than or equal to 0.45). Other ranges are also possible. The ratio of carbon to sulfur in a layer comprising lithium metal may be determined by energy dispersive spectroscopy.

When an article for inclusion in an electrochemical cell comprises two or more layers comprising lithium metal, each layer comprising lithium metal may independently have a ratio of carbon to sulfur in one or more of the above-referenced ranges.

In some embodiments, a layer comprising lithium metal further comprises both carbon and fluorine. In such layers, the ratio of carbon to fluorine may generally be selected as desired. For instance, the ratio of carbon to fluorine may be greater than or equal to 0, greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, or greater than or equal to 0.35. In some embodiments, the ratio of carbon to fluorine in a layer comprising lithium metal is less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, less than or equal to 0.02, or less than or equal to 0.01. Combinations of the above-referenced ranges are also possible (e.g., greater than or equal to 0 and less than or equal to 0.1, or greater than or equal to 0.01 and less than or equal to 0.4). Other ranges are also possible. The ratio of carbon to fluorine in a layer comprising lithium metal may be determined by energy dispersive spectroscopy.

When an article for inclusion in an electrochemical cell comprises two or more layers comprising lithium metal, each layer comprising lithium metal may independently have a ratio of carbon to fluorine in one or more of the above-referenced ranges.

Advantageously, some layers comprising lithium may have a relatively low modulus of elasticity. The low modulus of elasticity may be indicative of a layer comprising lithium that is relatively deformable (e.g., that deforms upon the application of a relatively low amount of force). This may advantageously allow the layer comprising lithium to be compacted in a relatively facile manner to yield a layer comprising lithium having a relatively low surface area. As lithium present at the surface of a layer comprising lithium may undesirably undergo a depletion reaction with the electrolyte, layers comprising lithium having relatively low surface areas are believed to advantageously reduce the rate at which such reactions occur and/or to reduce to the total amount of such reactions that occur over the lifetime of the electrochemical cell.

In some embodiments, a layer comprising lithium metal has a modulus of elasticity of less than 4.9 GPa, less than or equal to 4.5 GPa, less than or equal to 4.25 GPa, less than or equal to 4 GPa, less than or equal to 3.75 GPa, less than or equal to 3.5 GPa, less than or equal to 3.25 GPa, less than or equal to 3 GPa, less than or equal to 2.75 GPa, less than or equal to 2.5 GPa, less than or equal to 2.25 GPa, less than or equal to 2 GPa, less than or equal to 1.75 GPa, less than or equal to 1.5 GPa, less than or equal to 1.25 GPa, or less than or equal to 1 GPa. In some embodiments, a layer comprising lithium metal has a modulus of elasticity of greater than or equal to 0.75 GPa, greater than or equal to 1 GPa, greater than or equal to 1.25 GPa, greater than or equal to 1.5 GPa, greater than or equal to 1.75 GPa, greater than or equal to 2 GPa, greater than or equal to 2.25 GPa, greater than or equal to 2.5 GPa, greater than or equal to 2.75 GPa, greater than or equal to 3 GPa, greater than or equal to 3.25 GPa, greater than or equal to 3.5 GPa, greater than or equal to 3.75 GPa, greater than or equal to 4 GPa, greater than or equal to 4.25 GPa, or greater than or equal to 4.5 GPa. Combinations of the above-referenced ranges are also possible (e.g., less than 4.9 GPa and greater than or equal to 0.75 GPa, or less than or equal to 4 GPa and greater than or equal to 0.75 GPa). Other ranges are also possible.

The modulus of elasticity of a layer comprising lithium metal may be determined by performing the procedure described in ASTM E2546 with the following parameters: (1) an approach speed of 1 micron/minute; (2) a contact load of 0.03 mN; (3) a load of between 1-2.5 mN; (4) a loading rate of double the load; and (5) an indentation depth of 1 micron.

When an article for inclusion in an electrochemical cell comprises two or more layers comprising lithium metal, each layer comprising lithium metal may independently have a modulus of elasticity in one or more of the above-referenced ranges.

In some embodiments, a layer comprising lithium metal exhibits desirable behavior during the tape test described in ASTM 3359. For instance, in some embodiments, a layer comprising lithium metal does not drack, delaminate, and/or flake off a substrate on which it is disposed during tape testing.

When an article for inclusion in an electrochemical cell comprises two or more layers comprising lithium metal, each layer comprising lithium metal may independently exhibit one or more of the properties described above during a tape test.

As described elsewhere herein, some embodiments relate to articles for inclusion in electrochemical cells comprising a layer comprising lithium metal and a second layer disposed thereon. Such second layers may be passivating layers. Further detail regarding passivating layers is provided below.

Passivating layers may passivate the layers comprising lithium metal on which they are disposed by reducing their reactivity with species to which the article for inclusion in the electrochemical cell is exposed. For instance, a passivating layer may serve as a physical barrier positioned between the ambient environment and the layer comprising lithium metal. Species reactive with lithium metal may be transported therethrough in relatively small (or zero) amounts and/or at relatively slow (or zero) speeds, reducing the rate at which lithium reacts with such species. It should be understood that, although passivating layers may be relatively impermeable to some species reactive with lithium, such layers may be relatively permeable to other species. For instance, passivating layers are typically permeable to lithium ions.

Passivating layers may have a variety of suitable thicknesses. In some embodiments, a passivating layer has a thickness of 0.01 micron, greater than or equal to 0.02 microns, greater than or equal to 0.05 microns, greater than or equal to 0.075 microns, greater than or equal to 0.1 micron, greater than or equal to 0.2 microns, greater than or equal to 0.5 microns, greater than or equal to 0.75 microns, greater than or equal to 1 micron, greater than or equal to 1.5 microns, greater than or equal to 2 microns, greater than or equal to 2.5 microns, greater than or equal to 3 microns, or greater than or equal to 4 microns. In some embodiments, a passivating layer has a thickness of less than or equal to 5 microns, less than or equal to 4 microns, less than or equal to 3 microns, less than or equal to 2.5 microns, less than or equal to 2 microns, less than or equal to 1.5 microns, less than or equal to 1 micron, less than or equal to 0.75 microns, less than or equal to 0.5 microns, less than or equal to 0.2 microns, less than or equal to 0.1 micron, less than or equal to 0.075 microns, less than or equal to 0.05 microns, or less than or equal to 0.02 microns. Combinations of the above-referenced ranges are also possible (e.g., greater than or equal to 0.01 micron and less than or equal to 5 microns). Other ranges are also possible. The thickness of a passivation layer may be determined by cross-sectional scanning electron microscopy.

When an article for inclusion in an electrochemical cell comprises two or more passivating layers, each passivating layer may independently have a thickness in one or more of the above-referenced ranges.

As described above, in some embodiments, a passivating layer comprises a plurality of columnar structures. When present, such structures may have a variety of suitable aspect ratios. As used herein, the aspect ratio refers to the ratio of a "first" line segment to that of a "second" line segment, both of which are oriented parallel to principal axes of the columnar structure and have lengths equivalent to the lengths of the columnar structure projected thereon. The "first" line segment is the line segment having the longest such projected length and oriented in a direction other than parallel to the substrate or layer on which the columnar structure is directly disposed. The "second" line segment is the line segment having the second longest such projected length. In some embodiments, the first line may correspond to the length of the columnar structure and the second line may correspond to a width of the columnar structure.

In some embodiments, a columnar structure has an aspect ratio of greater than or equal to 0.5, greater than or equal to 0.75, greater than or equal to 1, greater than or equal to 1.25, greater than or equal to 1.5, greater than or equal to 1.75, greater than or equal to 2, greater than or equal to 2.25, greater than or equal to 2.5, greater than or equal to 2.75, greater than or equal to 3, greater than or equal to 3.5, greater than or equal to 4, or greater than or equal to 4.5. In some embodiments, a columnar structure has an aspect ratio of less than or equal to 5, less than or equal to 4.5, less than or equal to 4, less than or equal to 3.5, less than or equal to 3, less than or equal to 2.75, less than or equal to 2.5, less than or equal to 2.25, less than or equal to 2, less than or equal to 1.75, less than or equal to 1.5, less than or equal to 1.25, less than or equal to 1, or less than or equal to 0.75. Combinations of the above-referenced ranges are also possible (e.g., greater than or equal to 0.5 and less than or equal to 5, or greater than or equal to 1 and less than or equal to 3). Other ranges are also possible. The aspect ratio of a columnar structure may be determined by cross-sectional scanning electron microscopy.

In some embodiments, a passivating layer may comprise one or more columnar structures having an aspect ratio in one or more of the above-referenced ranges. It is also possible for a passivating layer to comprise a plurality of columnar structures, each of which (or at last 50% of which, at least 75% of which, at least 90% of which, or at least 95% of which) has an aspect ratio in one or more of the above-referenced ranges. In some embodiments, a plurality of columnar structures has an average aspect ratio in one or more of the above-referenced ranges. When an article for inclusion in an electrochemical cell comprises two or more passivating layers, one or more of the above features may be true for each layer independently.

In some embodiments, a passivating layer is porous. For instance, a passivating layer may have a porosity of greater than or equal to 5%, greater than or equal to 7.5%, greater than or equal to 10%, greater than or equal to 12.5%, greater than or equal to 15%, or greater than or equal to 17.5%. In some embodiments, a passivating layer has a porosity of less than or equal to 20%, less than or equal to 17.5%, less than or equal to 15%, less than or equal to 12.5%, less than or equal to 10%, or less than or equal to 7.5%. Combinations of the above-referenced ranges are also possible (e.g., greater than or equal to 5% and less than or equal to 20%). Other ranges are also possible.

The porosity of a passivating layer may be determined by measuring the volume enclosed by the outer boundary of the composite passivating layer (e.g., by use of an electron microscope), measuring the pore volume of the passivating layer by employing ASTM standard D4284-07 as described below, dividing the measured pore volume by the volume enclosed by the passivating layer, and multiplying by 100%. ASTM standard D4284-07, incorporated herein by reference in its entirety, can be used to produce a distribution of pore sizes plotted as the cumulative intruded pore volume as a function of pore diameter. To calculate the porosity, one would calculate the area under the curve that spans the given range over the x-axis. Optionally, in cases where the article includes pore sizes that lie outside the range of pore sizes that can be accurately measured using ASTM standard D4284-07, porosimetry measurements may be supplemented using BET surface analysis, as described, for example, in S. Brunauer, P. H. Emmett, and E. Teller, J. Am. Chem. Soc., 1938, 60, 309, which is incorporated herein by reference in its entirety.

When an article for inclusion in an electrochemical cell comprises two or more passivating layers, each passivating layer may independently have a porosity in one or more of the above-referenced ranges.

The passivating layers described herein may have a wide variety of color spaces, and a wide variety of one or more parameters that make up a color space. The passivating layers described herein may also appear visually to have a variety of colors, such as red, yellow, green, and/or blue.

In some embodiments, a passivating layer has a lightness of greater than or equal to 10, greater than or equal to 12.5, greater than or equal to 15, greater than or equal to 17.5, greater than or equal to 20, greater than or equal to 22.5, greater than or equal to 25, greater than or equal to 27.5, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, greater than or equal to 75, or greater than or equal to 80. In some embodiments, a passivating layer has a lightness of less than or equal to 85, less than or equal to 80, less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 27.5, less than or equal to 25, less than or equal to 22.5, less than or equal to 20, less than or equal to 17.5, less than or equal to 15, or less than or equal to 12.5. Combinations of the above-referenced ranges are also possible (e.g., greater than or equal to 10 and less than or equal to 85, or greater than or equal to 20 and less than or equal to 60). Other ranges are also possible.

When an article for inclusion in an electrochemical cell comprises two or more passivating layers, each passivating layer may independently have a lightness in one or more of the above-referenced ranges.

In some embodiments, a passivating layer has a red/green saturation (an "a" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a red/green saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are also possible.

When an article for inclusion in an electrochemical cell comprises two or more passivating layers, each passivating layer may independently have a red/green saturation in one or more of the above-referenced ranges.

In some embodiments, a passivating layer has a yellow/blue saturation (a "b" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a yellow/blue saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are also possible.

When an article for inclusion in an electrochemical cell comprises two or more passivating layers, each passivating layer may independently have a yellow/blue saturation in one or more of the above-referenced ranges.

In some embodiments, a passivating layer has a chroma of greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a chroma of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, or less than or equal to −1.5. Combinations of the above-referenced ranges are also possible (e.g., greater than or equal to −2 and less than or equal to 20, or greater than or equal to −1 and less than or equal to 5). Other ranges are also possible.

When an article for inclusion in an electrochemical cell comprises two or more passivating layers, each passivating layer may independently have a chroma in one or more of the above-referenced ranges.

In some embodiments, a passivating layer has a hue of greater than or equal to −2°, greater than or equal to 0°, greater than or equal to 2°, greater than or equal to 5°, greater than or equal to 7.5°, greater than or equal to 10°, greater than or equal to 20°, greater than or equal to 50°, greater than or equal to 75°, greater than or equal to 100°, greater than or equal to 125°, greater than or equal to 150°, greater than or equal to 175°, greater than or equal to 200°, greater than or equal to 225°, greater than or equal to 250°, greater than or equal to 275°, greater than or equal to 300°, or greater than or equal to 325°. In some embodiments, a passivating layer has a hue of less than or equal to 360°, less than or equal to 325°, less than or equal to 300°, less than or equal to 275°, less than or equal to 250°, less than or equal to 225°, less than or equal to 200°, less than or equal to 175°, less than or equal to 150°, less than or equal to 125°, less than or equal to 100°, less than or equal to 75°, less than or equal to 50°, less than or equal to 20°, less than or equal to 10°, less than or equal to 7.5°, less than or equal to 5°, less than or equal to 2°, or less than or equal to 0°. Combinations of the above-referenced ranges are also possible (e.g., greater than or equal to −2° and less than or equal to 360°, or greater than or equal to 10° and less than or equal to 350°). Other ranges are also possible.

When an article for inclusion in an electrochemical cell comprises two or more passivating layers, each passivating layer may independently have a hue in one or more of the above-referenced ranges.

In some embodiments, a passivating layer is relatively smooth. The smoothness or roughness of a passivating layer may be characterized in a variety of manners similar to those described elsewhere herein with respect to layers comprising lithium metal. The techniques below may be employed with reference to cross-section of the passivating layer, and it should be understood that some passivating layers may comprise at least one cross-section having one or more of the properties described below, that some passivating layers may be made up exclusively of cross-sections having one or more of the properties described below, and that some passivating layers may have a morphology such that a majority of the cross-sections have one or more of the properties below (e.g., at least 50% of the cross-sections, at least 75% of the cross-sections, at least 90% of the cross-sections, at least 95% of the cross-sections, or at least 99% of the cross-sections).

In some embodiments, a passivating layer has a value of $R_a$ of less than or equal to 1.5 microns, less than or equal to 1.25 microns, less than or equal to 1 micron, less than or equal to 0.75 microns, less than or equal to 0.5 microns, less than or equal to 0.25 microns, less than or equal to 0.2 microns, less than or equal to 0.18 microns, less than or equal to 0.15 microns, less than or equal to 0.125 microns, less than or equal to 0.1 micron, or less than or equal to 0.075 microns. In some embodiments, a passivating layer has a value of $R_a$ of greater than or equal to 0.05 microns, greater than or equal to 0.075 microns, greater than or equal to 0.1 micron, greater than or equal to 0.125 microns, greater than or equal to 0.15 microns, greater than or equal to 0.18 microns, greater than or equal to 0.2 microns, greater than or equal to 0.25 microns, greater than or equal to 0.5 microns, greater than or equal to 0.75 microns, greater than or equal to 1 micron, or greater than or equal to 1.25 microns. Combinations of the above-referenced ranges are also possible (e.g., less than or equal to 1.5 microns and greater than or equal to 0.05 microns, or less than or equal to 1.5 microns and greater than or equal to 0.18 microns). Other ranges are also possible.

When an article for inclusion in an electrochemical cell comprises two or more passivating layers, each passivating layer may independently have a value of $R_a$ in one or more of the above-referenced ranges.

In some embodiments, a passivating layer has a value of $R_q$ of less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, less than or equal to 0.75 microns, less than or equal to 0.5 microns, less than or equal to 0.4 microns, less than or equal to 0.3 microns, or less than or equal to 0.2 microns. In some embodiments, a passivating layer has a value of $R_q$ of greater than or equal to 0.1 micron, greater than or equal to 0.2 microns, greater than or equal to 0.3 microns, greater than or equal to 0.4 microns, greater than or equal to 0.5 microns, greater than or equal to 0.75 microns, greater than or equal to 1 micron, greater than or equal to 1.25 microns, greater than or equal to 1.5 microns, greater than or equal to 1.75 microns, greater than or equal to 2 microns, or greater than or equal to 2.25 microns. Combinations of the above-referenced ranges are also possible (e.g., less than or equal to 2.5 microns and greater than or equal to 0.1 micron, or less than or equal to 2 microns and greater than or equal to 0.2 microns). Other ranges are also possible.

When an article for inclusion in an electrochemical cell comprises two or more passivating layers, each passivating layer may independently have a value of $R_q$ in one or more of the above-referenced ranges.

In some embodiments, a passivating layer has a value of $R_p$ of less than or equal to 15 microns, less than or equal to 12.5 microns, less than or equal to 10 microns, less than or equal to 7.5 microns, less than or equal to 5 microns, less than or equal to 2.5 microns, less than or equal to 2 microns, less than or equal to 1.5 microns, or less than or equal to 1 micron. In some embodiments, a passivating layer has a value of $R_p$ of greater than or equal to 0.5 microns, greater than or equal to 1 micron, greater than or equal to 1.5 microns, greater than or equal to 2 microns, greater than or equal to 2.5 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns, or less than or equal to 15 microns and greater than or equal to 1 micron). Other ranges are also possible.

When an article for inclusion in an electrochemical cell comprises two or more passivating layers, each passivating layer may independently have a value of $R_p$ in one or more of the above-referenced ranges.

In some embodiments, a passivating layer has a value of $R_v$ of greater than or equal to less than or equal to −15 microns, greater than or equal to −12.5 microns, greater than or equal to −10 microns, greater than or equal to −7.5 microns, greater than or equal to −5 microns, greater than or equal to −2.5 microns, greater than or equal to −2 microns, greater than or equal to −1.5 microns, or greater than or equal to −1 micron. In some embodiments, a passivating layer has a value of $R_v$ of less than or equal to −0.5 microns, less than or equal to −1 micron, less than or equal to −1.5 microns, less than or equal to −2 microns, less than or equal to −2.5 microns, less than or equal to −5 microns, less than or equal to −7.5 microns, less than or equal to −10 microns, or less than or equal to −12.5 microns. Combinations of the above-referenced ranges are also possible (e.g., greater than or equal to −15 microns and less than or equal to −0.5 microns, or greater than or equal to −15 microns and less than or equal to −1 micron). Other ranges are also possible.

When an article for inclusion in an electrochemical cell comprises two or more passivating layers, each passivating layer may independently have a value of $R_v$ in one or more of the above-referenced ranges.

In some embodiments, a passivating layer has a value of $R_t$ of less than or equal to 30 microns, less than or equal to 25 microns, less than or equal to 20 microns, less than or equal to 15 microns, less than or equal to 10 microns, less than or equal to 7.5 microns, less than or equal to 5 microns, less than or equal to 4 microns, less than or equal to 3 microns, less than or equal to 2.5 microns, less than or equal to 2 microns, or less than or equal to 1.5 microns. In some embodiments, a passivating layer has a value of $R_t$ of greater than or equal to 1 micron, greater than or equal to 1.5 microns, greater than or equal to 2 microns, greater than or equal to 2.5 microns, greater than or equal to 3 microns, greater than or equal to 4 microns, greater than or equal to 5 microns, greater than or equal to 7.5 microns, greater than or equal to 10 microns, greater than or equal to 15 microns, greater than or equal to 20 microns, or greater than or equal to 25 microns. Combinations of the above-referenced ranges are also possible (e.g., less than or equal to 25 microns and greater than or equal to 1 micron, or less than or equal to 30 microns and greater than or equal to 2 microns). Other ranges are also possible.

When an article for inclusion in an electrochemical cell comprises two or more passivating layers, each passivating layer may independently have a value of $R_t$ in one or more of the above-referenced ranges.

In some embodiments, a passivating layer has a value of $R_{pm}$ of less than or equal to 15 microns, less than or equal to 12.5 microns, less than or equal to 10 microns, less than or equal to 7.5 microns, less than or equal to 5 microns, less than or equal to 3 microns, less than or equal to 2 microns, less than or equal to 1.5 microns, less than or equal to 1 micron, or less than or equal to 0.75 microns. In some embodiments, a passivating layer has a value of $R_{pm}$ of greater than or equal to 0.5 microns, greater than or equal to 0.75 microns, greater than or equal to 1 micron, greater than or equal to 1.5 microns, greater than or equal to 2 microns, greater than or equal to 3 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns, or less than or equal to 10 microns and greater than or equal to 1 micron). Other ranges are also possible.

When an article for inclusion in an electrochemical cell comprises two or more passivating layers, each passivating layer may independently have a value of $R_{pm}$ in one or more of the above-referenced ranges.

In some embodiments, a passivating layer has a value of $R_{vm}$ of greater than or equal to $-15$ microns, greater than or equal to $-12.5$ microns, greater than or equal to $-10$ microns, greater than or equal to $-7.5$ microns, greater than or equal to $-5$ microns, greater than or equal to $-3$ microns, greater than or equal to $-2$ microns, greater than or equal to $-1.5$ microns, greater than or equal to 1 micron, or greater than or equal to $-0.75$ microns. In some embodiments, a passivating layer has a value of $R_{vm}$ of less than or equal to $-0.5$ microns, less than or equal to $-0.75$ microns, less than or equal to $-1$ micron, less than or equal to $-1.5$ microns, less than or equal to $-2$ microns, less than or equal to $-3$ microns, less than or equal to $-5$ microns, less than or equal to $-7.5$ microns, less than or equal to $-10$ microns, or less than or equal to $-12.5$ microns. Combinations of the above-referenced ranges are also possible (e.g., greater than or equal to $-15$ microns and less than or equal to $-1$ micron, or greater than or equal to $-10$ microns and less than or equal to $-0.5$ microns). Other ranges are also possible.

When an article for inclusion in an electrochemical cell comprises two or more passivating layers, each passivating layer may independently have a value of $R_{vm}$ in one or more of the above-referenced ranges.

In some embodiments, a passivating layer has a value of $R_z$ of less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, or less than or equal to 2.5 microns. In some embodiments, a passivating layer has a value of $R_z$ of greater than or equal to 1 micron, greater than or equal to 2.5 microns, greater than or equal to 5 microns, greater than or equal to 7.5 microns, greater than or equal to 10 microns, greater than or equal to 12.5 microns, greater than or equal to 15 microns, or greater than or equal to 17.5 microns. Combinations of the above-referenced ranges are also possible (e.g., less than or equal to 20 microns and greater than or equal to 1 micron). Other ranges are also possible.

When an article for inclusion in an electrochemical cell comprises two or more passivating layers, each passivating layer may independently have a value of $R_z$ in one or more of the above-referenced ranges.

In some embodiments, a passivating layer has a value of $S_m$ of less than or equal to 1 square micron, less than or equal to 0.75 square microns, less than or equal to 0.5 square microns, less than or equal to 0.3 square microns, less than or equal to 0.2 square microns, less than or equal to 0.15 square microns, less than or equal to 0.1 square micron, less than or equal to 0.075 square microns, less than or equal to 0.05 square microns, less than or equal to 0.03 square microns, less than or equal to 0.02 square microns, less than or equal to 0.015 square microns, less than or equal to 0.01 square micron, less than or equal to 0.0075 square microns, less than or equal to 0.005 square microns, less than or equal to 0.003 square microns, or less than or equal to 0.002 square microns. In some embodiments, a passivating layer has a value of $S_m$ of greater than or equal to 0.001 square micron, greater than or equal to 0.002 square microns, greater than or equal to 0.003 square microns, greater than or equal to 0.005 square microns, greater than or equal to 0.0075 square microns, greater than or equal to 0.01 square micron, greater than or equal to 0.02 square microns, greater than or equal to 0.05 square microns, greater than or equal to 0.075 square microns, greater than or equal to 0.1 square micron, greater than or equal to 0.15 square microns, greater than or equal to 0.2 square microns, greater than or equal to 0.3 square microns, greater than or equal to 0.5 square microns, or greater than or equal to 0.75 square microns. Combinations of the above-referenced ranges are also possible (e.g., less than or equal to 1 square micron and greater than or equal to 0.001 square micron, or less than or equal to 0.2 square microns and greater than or equal to 0.01 square micron). Other ranges are also possible.

When an article for inclusion in an electrochemical cell comprises two or more passivating layers, each passivating layer may independently have a value of $S_m$ in one or more of the above-referenced ranges.

In some embodiments, a passivating layer has a value of $S_{bi}$ of less than or equal to 2 microns, less than or equal to 1.75 microns, less than or equal to 1.5 microns, less than or equal to 1.25 microns, less than or equal to 1.1 microns, less than or equal to 1 micron, less than or equal to 0.95 microns, less than or equal to 0.9 microns, less than or equal to 0.85 microns, less than or equal to 0.8 microns, less than or equal to 0.6 microns, less than or equal to 0.4 microns, less than or equal to 0.35 microns, less than or equal to 0.3 microns, less than or equal to 0.25 microns, less than or equal to 0.2 microns, less than or equal to 0.15 microns, or less than or equal to 0.125 microns. In some embodiments, a passivating layer has a value of $S_{bi}$ of greater than or equal to 0.1 micron, greater than or equal to 0.125 microns, greater than or equal to 0.15 microns, greater than or equal to 0.2 microns, greater than or equal to 0.25 microns, greater than or equal to 0.3 microns, greater than or equal to 0.35 microns, greater than or equal to 0.4 microns, greater than or equal to 0.6 microns, greater than or equal to 0.8 microns, greater than or equal to 0.85 microns, greater than or equal to 0.9 microns, greater than or equal to 0.95 microns, greater than or equal to 1 micron, greater than or equal to 1.1 microns, greater than or equal to 1.25 microns, greater than or equal to 1.5 microns, or greater than or equal to 1.75 microns. Combinations of the above-referenced ranges are also possible (e.g., less than or equal to 2 microns and greater than or equal to 0.1 micron, or less than or equal to 0.9 microns and greater than or equal to 0.3 microns). Other ranges are also possible.

When an article for inclusion in an electrochemical cell comprises two or more passivating layers, each passivating layer may independently have a value of $S_{bi}$ in one or more of the above-referenced ranges.

In some embodiments, a passivating layer has a value of $S_{dq}$ of less than or equal to 100, less than or equal to 90, less than or equal to 80, less than or equal to 70, less than or equal to 60, less than or equal to 50, less than or equal to 40, less than or equal to 30, or less than or equal to 20. In some embodiments, a passivating layer has a value of $S_{dq}$ of greater than or equal to 10, greater than or equal to 20, greater than or equal to 30, greater than or equal to 40, greater than or equal to 50, greater than or equal to 60, greater than or equal to 70, greater than or equal to 80, or greater than or equal to 90. Combinations of the above-referenced ranges are also possible (e.g., less than or equal to 100 and greater than or equal to 10, or less than or equal to 80 and greater than or equal to 20). Other ranges are also possible.

When an article for inclusion in an electrochemical cell comprises two or more passivating layers, each passivating layer may independently have a value of $S_{dq}$ in one or more of the above-referenced ranges.

In some embodiments, a passivating layer has a value of $S_{ku}$ of less than or equal to 70, less than or equal to 60, less than or equal to 50, less than or equal to 40, less than or equal to 30, less than or equal to 25, less than or equal to 20, less than or equal to 15, less than or equal to 12.5, less than or equal to 10, less than or equal to 8, less than or equal to 6, less than or equal to 5, less than or equal to 4, less than or equal to 3.5, less than or equal to 3, or less than or equal to 2.5. In some embodiments, a passivating layer has a value of $S_{ku}$ of greater than or equal to 2, greater than or equal to 2.5, greater than or equal to 3, greater than or equal to 3.5, greater than or equal to 4, greater than or equal to 5, greater than or equal to 6, greater than or equal to 8, greater than or equal to 10, greater than or equal to 12.5, greater than or equal to 15, greater than or equal to 20, greater than or equal to 25, greater than or equal to 30, greater than or equal to 40, greater than or equal to 50, or greater than or equal to 60. Combinations of the above-referenced ranges are also possible (e.g., less than or equal to 70 and greater than or equal to 2, or less than or equal to 15 and greater than or equal to 2). Other ranges are also possible.

When an article for inclusion in an electrochemical cell comprises two or more passivating layers, each passivating layer may independently have a value of $S_{ku}$ in one or more of the above-referenced ranges.

In some embodiments, a passivating layer has a value of $S_{sk}$ of less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.75, less than or equal to 0.5, less than or equal to 0.3, less than or equal to 0.2, less than or equal to 0.1, less than or equal to 0, less than or equal to −0.1, less than or equal to −0.2, less than or equal to −0.3, less than or equal to −0.5, less than or equal to −0.75, less than or equal to −1, or less than or equal to −1.5. In some embodiments, a passivating layer has a value of $S_{sk}$ of greater than or equal to −2, greater than or equal to −1.5, greater than or equal to −1, greater than or equal to −0.75, greater than or equal to −0.5, greater than or equal to −0.3, greater than or equal to −0.2, greater than or equal to −0.1, greater than or equal to 0, greater than or equal to 0.1, greater than or equal to 0.2, greater than or equal to 0.3, greater than or equal to 0.5, greater than or equal to 0.75, greater than or equal to 1, greater than or equal to 1.5, greater than or equal to 2, greater than or equal to 2.5, greater than or equal to 3, greater than or equal to 3.5, greater than or equal to 4, or greater than or equal to 4.5. Combinations of the above-referenced ranges are also possible (e.g., less than or equal to 5 and greater than or equal to −2, or less than or equal to 3 and greater than or equal to −0.2). Other ranges are also possible.

When an article for inclusion in an electrochemical cell comprises two or more passivating layers, each passivating layer may independently have a value of $S_{ku}$ in one or more of the above-referenced ranges.

When present, a passivating layer may have a variety of suitable compositions. In some embodiments, a passivating layer comprises a reaction product of lithium metal with a gas reactive therewith. Accordingly, in some embodiments, a passivating layer comprises lithium in one or more forms (e.g., lithium ions, ceramics comprising lithium). It is also possible for a passivating layer to be deposited from a gas that has not undergone a reaction with lithium metal and/or has undergone such a reaction to a relatively low extent. Such passivating layers may lack lithium and/or may comprise lithium in relatively low amounts. For instance, they may comprise ceramics lacking lithium and/or including lithium in relatively low amounts. Some passivating layers may comprise, for instance, a non-metal and/or a metalloid. Suitable non-metals include carbon, oxygen, hydrogen, sulfur, nitrogen, selenium, and various halogens (e.g., fluorine, bromine, iodine). Suitable metalloids include boron, silicon, antimony, and tellurium. In some embodiments, a passivating layer comprises two or more species (e.g., two or more non-metals). Non-limiting examples of combinations of such species include: oxygen and carbon; oxygen and hydrogen; sulfur and oxygen; sulfur and carbon; sulfur, oxygen, and carbon; nitrogen and oxygen; nitrogen and hydrogen; fluorine and sulfur; fluorine, carbon, and hydrogen; fluorine and silicon; and carbon and hydrogen.

When an article for inclusion in an electrochemical cell comprises two or more passivating layers, each passivating layer may independently comprise one or more of the above-referenced species.

When a passivating layer comprises both carbon and oxygen, the ratio of carbon to oxygen may generally be selected as desired. For instance, the ratio of carbon to oxygen may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, greater than or equal to 0.4, or greater than or equal to 0.45. In some embodiments, the ratio of carbon to oxygen in a passivating layer is less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.5). Other ranges are also possible. The ratio of carbon to oxygen in a passivating layer may be determined by energy dispersive spectroscopy.

When an article for inclusion in an electrochemical cell comprises two or more passivating layers, each passivating layer may independently have a ratio of carbon to oxygen in one or more of the above-referenced ranges.

In some embodiments, a passivating layer comprises both carbon and sulfur. In such layers, the ratio of carbon to sulfur may generally be selected as desired. For instance, the ratio of carbon to sulfur may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, or greater than or equal to 0.4. In some embodiments, the ratio of carbon to sulfur in a passivating layer is less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.45). Other ranges are also possible. The ratio of carbon to sulfur in a passivating layer may be determined by energy dispersive spectroscopy.

When an article for inclusion in an electrochemical cell comprises two or more passivating layers, each passivating layer may independently have a ratio of carbon to sulfur in one or more of the above-referenced ranges.

In some embodiments, a passivating layer comprises both carbon and fluorine. In such layers, the ratio of carbon to fluorine may generally be selected as desired. For instance, the ratio of carbon to fluorine may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, or greater than or equal to 0.35. In some embodiments, the ratio of carbon to fluorine in a passivating layer is less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.4). Other ranges are also possible. The ratio of carbon to fluorine in a passivating layer may be determined by energy dispersive spectroscopy.

When an article for inclusion in an electrochemical cell comprises two or more passivating layers, each passivating layer may independently have a ratio of carbon to fluorine in one or more of the above-referenced ranges.

As described elsewhere herein, in some embodiments, a layer comprising lithium metal and/or a layer disposed thereon (e.g., a passivating layer) is deposited and/or disposed on a substrate. Further details of such substrates are provided below.

Substrates suitable for use in combination with the modular lithium deposition systems, articles for inclusion in electrochemical cells, and methods described herein may have a variety of suitable thicknesses. In some embodiments, a substrate has a thickness of greater than or equal to 3 mils, greater than or equal to 3.5 mils, greater than or equal to 4 mils, or greater than or equal to 4.5 mils. In some embodiments, a substrate has a thickness of less than or equal to 5 mils, less than or equal to 4.5 mils, less than or equal to 4 mils, or less than or equal to 3.5 mils. Combinations of the above-referenced ranges are also possible (e.g., greater than or equal to 3 mils and less than or equal to 5 mils). Other ranges are also possible. The thickness of a substrate may be determined by drop gauge.

Substrates may have a variety of suitable compositions. In some embodiments, a substrate comprises a polymer, such as a poly(ester) (e.g., poly(ethylene terephthalate), such as optical-grade poly(ethylene terephthalate)). Further examples of suitable polymers include polyolefins, polypropylene, nylon, polyvinyl chloride, and polyethylene (which may optionally be metalized). In some cases, a substrate comprises a metal (e.g., a foil such as nickel foil and/or aluminum foil), a glass, or a ceramic material. In some embodiments, a substrate includes a film that may be optionally disposed on a thicker substrate material. For instance, in certain embodiments, a substrate includes one or more films, such as a polymer film (e.g., a poly(ethylene terephthalate) film) and/or a metalized polymer film (using various metals such as aluminum and copper). A substrate may also include additional components such as fillers, binders, and/or surfactants.

Typically, the substrates described herein are configured to be removed from articles for incorporation into electrochemical cells prior to the incorporation thereof. In certain embodiments, the substrate may be left intact with such an article after fabrication thereof, but may be delaminated before the article is incorporated into an electrochemical cell. For instance, the article for incorporation into an electrochemical cell may be packaged and shipped to a manufacturer who may then incorporate it into the electrochemical cell. In such embodiments, the article for incorporation into the electrochemical cell may be inserted into an air and/or moisture-tight package to prevent or inhibit deterioration and/or contamination of one or more components thereof. Allowing the substrate to remain attached can facilitate handling and transportation of the article for incorporation into an electrochemical cell. For instance, the substrate may be relatively thick and/or may have a relatively rigidity and/or stiffness sufficient to can prevent or inhibit the article for incorporation into an electrochemical cell from distorting during handling. In such embodiments, the substrate can be removed by the manufacturer before, during, or after assembly of an electrochemical cell.

In some embodiments, an article for inclusion in an electrochemical cell may be disposed on or deposited onto a release layer. For instance, a release layer may be disposed on a substrate onto which a layer comprising lithium metal is deposited (e.g., in a modular lithium deposition system). Suitable release layers, and their properties, are described in further detail below.

Release layers contemplated for use with the systems, articles, and methods described herein may have a variety of suitable thicknesses. In some embodiments, a release layer has a thickness of greater than or equal to 2 microns, greater than or equal to 2.25 microns, greater than or equal to 2.5 microns, greater than or equal to 2.75 microns, greater than or equal to 3 microns, greater than or equal to 3.25 microns, greater than or equal to 3.5 microns, or greater than or equal to 3.75 microns. In some embodiments, a release layer has a thickness of less than or equal to 4 microns, less than or equal to 3.75 microns, less than or equal to 3.5 microns, less than or equal to 3.25 microns, less than or equal to 3 microns, less than or equal to 2.75 microns, less than or equal to 2.5 microns, or less than or equal to 2.25 microns. Combinations of the above-referenced ranges are also possible (e.g., greater than or equal to 2 microns and less than or equal to 4 microns). Other ranges are also possible. The thickness of a release layer may be determined by drop gauge.

As described above, in some embodiments, it may be beneficial to deposit a layer comprising lithium metal onto a substrate, but not desirable for the substrate to be incorporated into the electrochemical cell comprising the resultant layer. In such embodiments, it may be advantageous for a release layer to be positioned between the substrate (and any layers disposed thereon not configured to be included in the resultant electrochemical cell) and any layers configured to be included in the resultant electrochemical cell. When the release layer is adjacent a substrate, the release layer may be partially or entirely delaminated from the layer comprising lithium metal during subsequent steps in electrochemical cell formation (e.g., if not configured to be retained in the final electrochemical cell) and/or it may be partially or entirely delaminated from the carrier substrate during subsequent steps in electrochemical cell formation (e.g., if configured to be retained in the final electrochemical cell).

In some embodiments, the release layer may have one or more features of the release layers described in U.S. Pat. Pub. No. 2014/272,565, U.S. Pat. Pub. No. 2014/272,597, and U.S. Pat. Pub. No. 2011/068,001, each of which are herein incorporated by reference in their entirety. In some embodiments, it may be preferred for the release layer to be a release layer comprising hydroxyl functional groups (e.g., comprising poly(vinyl alcohol) (PVOH) and/or EVAL) and having any of the structures described above.

In one set of embodiments, a release layer is formed of a polymeric material. Specific examples of appropriate polymers include, but are not limited to, polyoxides, poly(alkyl oxides)/polyalkylene oxides (e.g., polyethylene oxide, polypropylene oxide, polybutylene oxide), polyvinyl alcohols, polyvinyl butyral, polyvinyl formal, vinyl acetate-vinyl alcohol copolymers, ethylene-vinyl alcohol copolymers, vinyl alcohol-methyl methacrylate copolymers, polysiloxanes, and fluorinated polymers. Additional examples of polymeric materials include polysulfones, polyethersulfone, polyphenylsulfones (e.g., Ultrason® S 6010, S 3010 and S 2010, available from BASF), polyethersulfone-polyalkyleneoxide copolymers, polyphenylsulfone-polyalkyleneoxide copolymers, polysulfone-polyalkylene oxide copolymers, polyisobutylene (e.g., Oppanol® B10, B15, B30, B80, B150 and B200, available from BASF), polyisobutylene succinic anhydride (PIBSA), polyisobutylene-polyalkyleneoxide copolymers, polyamide 6 (e.g., Ultramid® B33, available from BASF) (e.g., extrusion of 2 µm polyamide layer on polyolefin carrier or solution casting of PA layer on polyolefin carrier substrate), polyvinylpyrrolidone, polyvinylpyrrolidone-polyvinylimidazole copolymers (e.g., Sokalan® HP56, available from BASF), polyvinylpyrrolidone-polyvinylactetate copolymers (e.g., Luviskol®, available from BASF), maleinimide-vinylether copolymers, polyacrylamides, fluorinated polyacrylates (optionally including surface reactive comonomers), polyethylene-polyvinylalcohol copolymers (e.g., Kuraray®, available from BASF), polyethylene-polyvinylacetate copolymers, polyvinylalcohol and polyvinylacetate copolymers, polyoxymethylene (e.g., extruded), polyvinylbutyral (e.g., Kuraray®, available from BASF), polyureas (e.g., branched), polymers based on photopolymerization of acrolein derivatives (CH2=CR—C(O)R), polysulfone-polyalkyleneoxide copolymers, polyvinylidene difluoride (e.g., Kynar® D155, available from BASF), and combinations thereof.

In one embodiment, a release layer comprises a polyethersulfone-polyalkylene oxide copolymer. In one particular embodiment, the polyethersulfone-polyalkylene oxide copolymer is a polyarylethersulfone-polyalkylene oxide copolymer (PPC) obtained by polycondensation of reaction mixture (RG) comprising the components: (A1) at least one aromatic dihalogen compound, (B1) at least one aromatic dihydroxyl compound, and (B2) at least one polyalkylene oxide having at least two hydroxyl groups. The reaction mixture may also include (C) at least one aprotic polar solvent and (D) at least one metal carbonate, where the reaction mixture (RG) does not comprise any substance which forms an azeotrope with water. The resulting copolymer may be a random copolymer or a block copolymer. For instance, the resulting copolymer may include blocks of $A_1$-$B_1$, and blocks of $A_1$-$B_2$. The resulting copolymer may, in some instances, include blocks of $A_1$-$B_1$-$A_1$-$B_2$.

Further examples of polymeric materials include polyimide (e.g., Kapton®) with a hexafluoropropylene (HFP) coating (e.g., available from Dupont); siliconized polyester films (e.g., a Mitsubishi polyester), metallized polyester films (e.g., available from Mitsubishi or Sion Power), polybenzimidazoles (PBI; e.g., low molecular weight PBI—available from Celanese), polybenzoxazoles (e.g., available from Foster-Miller, Toyobo), ethylene-acrylic acid copolymers (e.g., Poligen®, available from BASF), acrylate based polymers (e.g., Acronal®, available from BASF), (charged) polyvinylpyrrolidone-polyvinylimidazole copolymers (e.g., Sokalane® HP56, Luviquat®, available from BASF), polyacrylonitriles (PAN), styrene-acrylonitriles (SAN), thermoplastic polyurethanes (e.g., Elastollan® 1195 A 10, available from BASF), polysulfone-poly(akylene oxide) copolymers, benzophenone-modified polysulfone (PSU) polymers, polyvinylpyrrolidone-polyvinylactetate copolymers (e.g., Luviskol®, available from BASF), and combinations thereof.

In some embodiments, a release layer includes a polymer that is substantially electrically conductive. Examples of such materials include electrically conductive polymers (also known as electronic polymers or conductive polymers) that are doped with lithium salts (e.g., LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$). Examples of conductive polymers include, but are not limited to, poly (acetylene)s, poly(pyrrole)s, poly(thiophene)s, poly(aniline) s, poly(fluorene)s, polynaphthalenes, poly(p-phenylene sulfide), and poly(para-phenylene vinylene)s. Electrically-conductive additives may also be added to polymers to form electrically-conductive polymers.

In some embodiments, a release layer includes a crosslinkable polymer. Non-limiting examples of crosslinkable polymers include: polyvinyl alcohol, polyvinylbutyral, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethylenebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, fluorinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, copolymers thereof, and those described in U.S. Pat. No. 6,183,901 to Ying et al. of the common assignee for protective coating layers for separator layers.

Additional examples of crosslinkable or crosslinked polymers include UV/E-beam crosslinked Ultrason® or similar polymers (i.e., polymers comprising an amorphous blend of one or more of poly(sulfone), poly(ethersulfone), and poly(phenylsulfone)), UV crosslinked Ultrason®-polyalkyleneoxide copolymers, UV/E-beam crosslinked Ultrason®-acrylamide blends, crosslinked polyisobutylene-polyalkyleneoxide copolymers, crosslinked branched polyimides (BPI), crosslinked maleinimide-Jeffamine polymers (MSI gels), crosslinked acrylamides, and combinations thereof.

Those of ordinary skill in the art can choose appropriate polymers that can be crosslinked, as well as suitable methods of crosslinking, based upon general knowledge of the art in combination with the description herein. Crosslinked polymer materials may further comprise salts, for example, lithium salts, to enhance lithium ion conductivity.

If a crosslinkable polymer is used, the polymer (or polymer precursor) may include one or more crosslinking agents. A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for support layers described herein include, but are not limited to: polyamide-epichlorohydrin (polycup 172); aldehydes (e.g., formaldehyde and urea-formaldehyde); dialdehydes (e.g., glyoxal glutaraldehyde, and hydroxyadipaldehyde); acrylates (e.g., ethylene glycol diacrylate, di(ethylene glycol) diacrylate, tetra(ethylene glycol) diacrylate, methacrylates, ethylene glycol dimethacrylate, di(ethylene glycol) dimethacrylate, tri(ethylene glycol) dimethacrylate); amides (e.g., N,N'-methylenebisacrylamide, N,N'-ethylenebisacrylamide, N,N'-(1,2-dihydroxyethylene)bisacrylamide, N-(1-hydroxy-2,2-dimethoxyethyl)acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(mtheylethylketoxime)silane, methylvinyldi(cyclohexaneoneoxxime)silane, vinyltris(mtehylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl triflourovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; and dialdehydes.

Other classes of polymers that may be suitable for use in a release layer may include, but are not limited to, polyamines (e.g., poly(ethylene imine) and polypropylene imine (PPI)); polyamides (e.g., poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), poly(vinylidene fluoride), poly(vinylidene difluoride, poly(vinylidene difluoride) block copolymers); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

In some embodiments, the molecular weight of a polymer may be chosen to achieve a particular adhesive affinity and can vary in a release layer. In some embodiments, the molecular weight of a polymer used in a release layer may be greater than or equal to 1,000 g/mol, greater than or equal to 5,000 g/mol, greater than or equal to 10,000 g/mol, greater than or equal to 15,000 g/mol, greater than or equal to 20,000 g/mol, greater than or equal to 25,000 g/mol, greater than or equal to 30,000 g/mol, greater than or equal to 50,000 g/mol, greater than or equal to 100,000 g/mol or greater than or equal to 150,000 g/mol. In certain embodiments, the molecular weight of a polymer used in a release layer may be less than or equal to 150,000 g/mol, less than or equal to 100,000 g/mol, less than or equal to 50,000 g/mol, less than or equal to 30,000 g/mol, less than or equal to 25,000 g/mol, less than or equal to 20,000 g/mol, less than less than or equal to 10,000 g/mol, less than or equal to 5,000 g/mol, or less than or equal to 1,000 g/mol. Other ranges are also possible. Combinations of the above-referenced ranges are also possible (e.g., greater than or equal to 5,000 g/mol and less than or equal to 50,000 g/mol).

When polymers are used, the polymer may be substantially crosslinked, substantially uncrosslinked, or partially crosslinked as the current disclosure is not limited in this fashion. Further, the polymer may be substantially crystalline, partially crystalline, or substantially amorphous. Without wishing to be bound by theory, embodiments in which the polymer is amorphous may exhibit smoother surfaces since crystallization of the polymer may lead to increased surface roughness. In certain embodiments, the release layer is formed of or includes a wax.

As described elsewhere herein, in some embodiments, a layer comprising lithium metal and/or a layer disposed thereon (e.g., a passivating layer) is deposited and/or disposed on a current collector. Further details of such current collectors are provided below.

When present, a current collector may take the form of a layer disposed on a substrate (e.g., on a release layer disposed thereon). The thicknesses of such layers may generally be selected as desired. In some embodiments, a current collector has a thickness of greater than or equal to 0.1 micron, greater than or equal to 0.15 microns, greater than or equal to 0.2 microns, greater than or equal to 0.25 microns, greater than or equal to 0.3 microns, greater than or equal to 0.35 microns, greater than or equal to 0.4 microns, or greater than or equal to 0.45 microns. In some embodiments, a current collector has a thickness of less than or equal to 0.5 microns, less than or equal to 0.45 microns, less than or equal to 0.4 microns, less than or equal to 0.35 microns, less than or equal to 0.3 microns, less than or equal to 0.25 microns, less than or equal to 0.2 microns, or less than or equal to 0.15 microns. Combinations of the above-referenced ranges are also possible (e.g., greater than or equal to 0.1 micron and less than or equal to 0.5 microns). Other ranges are also possible. The thickness of a current collector may be determined by optical profilometry.

Current collectors typically comprise conductive materials. For instance, a current collector may comprise a metal (e.g., copper, nickel, aluminum, a passivated metal), a metallized polymer (e.g., metallized poly(ethylene terephthalate)), an electrically conductive polymer, and/or a polymer comprising electrically conductive particles dispersed therein.

Current collectors may be formed in a variety of manners. For instance, a current collector may be deposited onto an electrode by physical vapor deposition, chemical vapor deposition, electrochemical deposition, sputtering, doctor blading, flash evaporation, or any other appropriate deposition technique for the selected material. Some such processes (e.g., physical vapor deposition, chemical vapor deposition, sputtering) may be performed in a modular lithium deposition system described herein and/or may be performed on a substrate prior to the introduction thereof into a modular lithium deposition system. In some embodiments, a current collector is formed separately from an article into which it is to be incorporated (e.g., an article for incorporation into an electrochemical cell) and then bonded to it (and/or to a component, such as a layer, thereof). It should be appreciated, however, that in some embodiments an article for incorporation into an electrochemical cell may lack a current collector. This may be true when the article itself (and/or electroactive material therein) is electrically conductive.

As described elsewhere herein, some embodiments relate to articles for incorporation into electrochemical cells. In some embodiments, an article for incorporation into an electrochemical cell comprises an anode and/or a portion of an anode (e.g., for a lithium metal electrochemical cell). Further details of the electrochemical cells into which such articles may be incorporated are described below.

Some electrochemical cells may further comprise an electrolyte. In some embodiments, the electrolyte is a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity). Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, suflonimidies (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. In some embodiments, the mixture of solvents comprises dimethyl carbonate and ethylene carbonate. In some embodiments, the mixture of solvents comprises ethylene carbonate and ethyl methyl carbonate. The weight ratio of the two solvents in the mixtures may range, in some cases, from about 5 wt %:95 wt % to 95 wt %:5 wt %. For example, in some embodiments the electrolyte comprises a 50 wt %:50 wt % mixture of dimethyl carbonate:ethylene carbonate. In some other embodiments, the electrolyte comprises a 30 wt %:70 wt % mixture of ethylene carbonate:ethyl methyl carbonate. An electrolyte may comprise a mixture of dimethyl carbonate:ethylene carbonate with a ratio of dimethyl carbonate:ethylene carbonate that is less than or equal to 50 wt %:50 wt % and greater than or equal to 30 wt %:70 wt %.

In some embodiments, an electrolyte may comprise a mixture of fluoroethylene carbonate and dimethyl carbonate. A weight ratio of fluoroethylene carbonate to dimethyl carbonate may be 20 wt %:80 wt % or 25 wt %:75 wt %. A weight ratio of fluoroethylene carbonate to dimethyl carbonate may be greater than or equal to 20 wt %:80 wt % and less than or equal to 25 wt %:75 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 5 microns. Other values are also possible. Combinations of the above-noted ranges are also possible. The thickness of an electrolyte layer may be determined by drop gauge.

In some embodiments, the electrolyte comprises at least one lithium salt. For example, in some cases, the at least one lithium salt is selected from the group consisting of LiSCN, LiBr, LiI, LiSO$_3$CH$_3$, LiNO$_3$, LiPF$_6$, LiBF$_4$, LiB(Ph)$_4$, LiClO$_4$, LiAsF$_6$, Li$_2$SiF$_6$, LiSbF$_6$, LiAlCl$_4$, lithium bis(oxalato)borate, lithium difluoro(oxalato)borate, a salt comprising a tris(oxalato)phosphate anion (e.g., lithium tris(oxalato) phosphate), LiCF$_3$SO$_3$, LiN(SO$_2$F)$_2$, LiN(SO$_2$CF$_3$)$_2$, LiC(CnF$_{2n+1}$SO$_2$)$_3$ wherein n is an integer in the range of from 1 to 20, and (CnF$_{2n+1}$SO$_2$)$_m$XLi with n being an integer in the range of from 1 to 20, m being 1 when X is selected from oxygen or sulfur, m being 2 when X is selected from nitrogen or phosphorus, and m being 3 when X is selected from carbon or silicon.

When present, a lithium salt may be present in the electrolyte at a variety of suitable concentrations. In some embodiments, the lithium salt is present in the electrolyte at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, greater than or equal to 2 M, or greater than or equal to 5 M. The lithium salt may be present in the electrolyte at a concentration of less than or equal to 10 M, less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 10 M, or greater than or equal to 0.01 M and less than or equal to 5 M). Other ranges are also possible.

In some embodiments, an electrolyte may comprise LiPF$_6$ in an advantageous amount. In some embodiments, the electrolyte comprises LiPF$_6$ at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, or greater than or equal to 2 M. The electrolyte may comprise LiPF$_6$ at a concentration of less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 5 M). Other ranges are also possible.

In some embodiments, an electrolyte comprises a species with an oxalato(borate) group (e.g., LiBOB, lithium difluoro (oxalato)borate), and the total weight of the species with an (oxalato)borate group in the electrochemical cell may be less than or equal to 30 wt %, less than or equal to 28 wt %, less than or equal to 25 wt %, less than or equal to 22 wt %, less than or equal to 20 wt %, less than or equal to 18 wt %, less than or equal to 15 wt %, less than or equal to 12 wt %, less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the electrolyte. In some embodiments, the total weight of the species with an (oxalato)borate group in the electrochemical cell is greater than 0.2 wt %, greater than 0.5 wt %, greater than 1 wt %, greater than 2 wt %, greater than 3 wt %, greater than 4 wt %, greater than 6 wt %, greater than 8 wt %, greater than 10 wt %, greater than 15 wt %, greater than 18 wt %, greater than 20 wt %, greater than 22 wt %, greater than 25 wt %, or greater than 28 wt % versus the total weight of the electrolyte. Combinations of the above-referenced ranges are also possible (e.g., greater than 0.2 wt % and less than or equal to 30 wt %, greater than 0.2 wt % and less than or equal to 20 wt %, greater than 0.5 wt % and less than or equal to 20 wt %, greater than 1 wt % and less than or equal to 8 wt %, greater than 1 wt % and less than or equal to 6 wt %, greater than 4 wt % and less than or equal to 10 wt %, greater than 6 wt % and less than or equal to 15 wt %, or greater than 8 wt % and less than or equal to 20 wt %). Other ranges are also possible.

In some embodiments, an electrolyte comprises fluoroethylene carbonate, and the total weight of the fluoroethylene carbonate in the electrochemical cell may be less than or equal to 30 wt %, less than or equal to 28 wt %, less than or equal to 25 wt %, less than or equal to 22 wt %, less than or equal to 20 wt %, less than or equal to 18 wt %, less than or equal to 15 wt %, less than or equal to 12 wt %, less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the electrolyte. In some embodiments, the total weight of the fluoroethylene carbonate in the electrolyte is greater than 0.2 wt %, greater than 0.5 wt %, greater than 1 wt %, greater than 2 wt %, greater than 3 wt %, greater than 4 wt %, greater than 6 wt %, greater than 8 wt %, greater than 10 wt %, greater than 15 wt %, greater than 18 wt %, greater than 20 wt %, greater than 22 wt %, greater than 25 wt %, or greater than 28 wt % versus the total weight of the electrolyte. Combinations of the above-referenced ranges are also possible (e.g., less than or equal to 0.2 wt % and greater than 30 wt %, less than or equal to 15 wt % and greater than 20 wt %, or less than or equal to 20 wt % and greater than 25 wt %). Other ranges are also possible.

In some embodiments, the wt % of one or more electrolyte components is measured prior to first use or first discharge of the electrochemical cell using known amounts of the various components. In other embodiments, the wt % is measured at a point in time during the cycle life of the cell.

In some such embodiments, the cycling of an electrochemical cell may be stopped and the wt % of the relevant component in the electrolyte may be determined using, for example, gas chromatography-mass spectrometry. Other methods such as NMR, inductively coupled plasma mass spectrometry (ICP-MS), and elemental analysis can also be used.

In some embodiments, an electrolyte may comprise several species together that are particularly beneficial in combination. For instance, in some embodiments, the electrolyte comprises fluoroethylene carbonate, dimethyl carbonate, and $LiPF_6$. The weight ratio of fluoroethylene carbonate to dimethyl carbonate may be between 20 wt %:80 wt % and 25 wt %:75 wt % and the concentration of $LiPF_6$ in the electrolyte may be approximately 1 M (e.g., between 0.05 M and 2 M). The electrolyte may further comprise lithium bis(oxalato)borate (e.g., at a concentration between 0.1 wt % and 6 wt %, between 0.5 wt % and 6 wt %, or between 1 wt % and 6 wt % in the electrolyte), and/or lithium tris(oxalato) phosphate (e.g., at a concentration between 1 wt % and 6 wt % in the electrolyte).

In some embodiments, an electrochemical described herein comprises an electrode other than one comprising lithium. This electrode may be a cathode and/or a positive electrode (e.g., an electrode at which reduction occurs during discharging and oxidation occurs during charging).

A cathode and/or positive electrode may comprise an electroactive material comprising a lithium intercalation compound (e.g., a compound that is capable of reversibly inserting lithium ions at lattice sites and/or interstitial sites). In some cases, the electroactive material comprises a lithium transition metal oxo compound (i.e., a lithium transition metal oxide or a lithium transition metal salt of an oxoacid). The electroactive material may be a layered oxide (e.g., a layered oxide that is also a lithium transition metal oxo compound). A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$).

In some embodiments, a cathode and/or positive electrode comprises a layered oxide that is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. Other non-limiting examples of suitable NMC compounds include $LiNi_{3/5}Mn_{1/5}Co_{1/5}O_2$ and $LiNi_{7/10}Mn_{1/10}Co_{1/5}O_2$. In some embodiments, a cathode and/or positive electrode comprises a layered oxide that is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$.

In some embodiments, the electroactive material comprises a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$.

In some embodiments, the electroactive material comprises a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In some cases, the electroactive material comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the electroactive material in a cathode and/or positive electrode comprises a conversion compound. For instance, the electroactive material may be a lithium conversion material. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Jr, Pt, Au, Hg, Rf, Db, Sg, Bh, Hs). In some cases, the electroactive material may comprise a material that is doped with one or more dopants to alter the electrical properties (e.g., electrical conductivity) of the electroactive material. Non-limiting examples of suitable dopants include aluminum, niobium, silver, and zirconium.

In some embodiments, the electroactive material in a cathode and/or positive electrode can comprise sulfur. In some embodiments, an electrode that is a cathode can comprise electroactive sulfur-containing materials. "Electroactive sulfur-containing materials," as used herein, refers to electroactive materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within a second electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

As described herein, in some embodiments, an electrochemical cell includes a separator. The separator generally comprises a polymeric material (e.g., polymeric material that does or does not swell upon exposure to electrolyte). In some embodiments, the separator is located between an electrolyte and an electrode (e.g., between the electrolyte and an electrode comprising a layer comprising lithium and/or a passivation layer, between the electrolyte and an anode and/or negative electrode, between the electrolyte and a cathode and/or positive electrode) and/or between two electrodes (e.g., between an anode and a cathode, between a positive electrode and a negative electrode).

The separator can be configured to inhibit (e.g., prevent) physical contact between two electrodes (e.g., between an anode and a cathode, between a positive electrode and a negative electrode), which could result in short circuiting of the electrochemical cell. The separator can be configured to be substantially electronically non-conductive, which can reduce the tendency of electric current to flow therethrough and thus reduce the possibility that a short circuit passes therethrough. In some embodiments, all or one or more portions of the separator can be formed of a material with a bulk electronic resistivity of at least $10^4$, at least $10^5$, at least $10^{10}$, at least $10^{15}$, or at least $10^{20}$ Ohm-meters. The bulk electronic resistivity may be measured at room temperature (e.g., 25° C.).

In some embodiments, the separator can be ionically conductive, while in other embodiments, the separator is substantially ionically non-conductive. In some embodiments, the average ionic conductivity of the separator is at least $10^{-7}$ S/cm, at least $10^{-6}$ S/cm, at least $10^{-5}$ S/cm, at least $10^{-4}$ S/cm, at least $10^{-2}$ S/cm, or at least $10^{-1}$ S/cm. In some embodiments, the average ionic conductivity of the separator may be less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, less than or equal to $10^{-6}$ S/cm, less than or equal to $10^{-7}$ S/cm, or less than or equal to $10^{-8}$ S/cm. Combinations of the above-referenced ranges are also possible (e.g., an average ionic conductivity of at least $10^{-8}$ S/cm and less than or equal to $10^{-1}$ S/cm). Other values of ionic conductivity are also possible.

The average ionic conductivity of the separator can be determined by employing a conductivity bridge (i.e., an impedance measuring circuit) to measure the average resistivity of the separator at a series of increasing pressures until the average resistivity of the separator does not change as the pressure is increased. This value is considered to be the average resistivity of the separator, and its inverse is considered to be the average conductivity of the separator. The conductivity bridge may be operated at 1 kHz. The pressure may be applied to the separator in 500 kg/cm² increments by two copper cylinders positioned on opposite sides of the separator that are capable of applying a pressure to the separator of at least 3 tons/cm². The average ionic conductivity may be measured at room temperature (e.g., 25° C.).

In some embodiments, the separator can be a solid. The separator may be sufficiently porous such that it allows an electrolyte solvent to pass through it. In some embodiments, the separator does not substantially include a solvent (e.g., it may be unlike a gel that comprises solvent throughout its bulk), except for solvent that may pass through or reside in the pores of the separator. In other embodiments, a separator may be in the form of a gel.

A separator can comprise a variety of materials. The separator may comprise one or more polymers (e.g., the separator may be polymeric, the separator may be formed of one or more polymers), and/or may comprise an inorganic material (e.g., the separator may be inorganic, the separator may be formed of one or more inorganic materials).

Examples of suitable polymers that may be employed in separators include, but are not limited to, polyolefins (e.g., polyethylenes, poly(butene-1), poly(n-pentene-2), polypropylene, polytetrafluoroethylene); polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)); polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcyanoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

Non-limiting examples of suitable inorganic separator materials include glass fibers. For instance, in some embodiments, an electrochemical cell comprises a separator that is a glass fiber filter paper.

When present, the separator may be porous. In some embodiments, the pore size of the separator is less than or equal to 5 microns, less than or equal to 3 microns, less than or equal to 1 micron, less than or equal to 500 nm, less than or equal to 300 nm, less than or equal to 100 nm, or less than or equal to 50 nm. In some embodiments, the pore size of the separator is greater than or equal to 50 nm, greater than or equal to 100 nm, greater than or equal to 300 nm, greater than or equal to 500 nm, greater than or equal to 1 micron, or greater than or equal to 3 microns. Other values are also possible. Combinations of the above-noted ranges are also possible (e.g., less than or equal to 5 microns and greater than or equal to 50 nm, less than or equal to 300 nm and greater than or equal to 100 nm, less than or equal to 1 micron and greater than or equal to 300 nm, or less than or equal to 5 microns and greater than or equal to 500 nm). In some embodiments, the separator is substantially non-porous. In other words, the separator may lack pores, include a minimal number of pores, and/or not include pores in large portions thereof.

The electrochemical cells described herein and the articles for inclusion in electrochemical cells described herein may be subject to an applied anisotropic force (e.g., for the latter, after being included in the electrochemical cell). As understood in the art, an "anisotropic force" is a force that is not equal in all directions. In some embodiments, the electrochemical cells and/or the articles for inclusion electrochemical cells can be configured to withstand an applied anisotropic force while maintaining their structural integrity (e.g., for the latter, after being included in the electrochemical cell). The applied anisotropic force may also enhance the morphology of an article for inclusion in the electrochemical cell (e.g., for the latter, after being included in the electrochemical cell) and/or the morphology of an electrode in the electrochemical cell (e.g., an electrode comprising and/or formed from an article for inclusion in an electrochemical cell described elsewhere herein). The electrochemical cells described herein may be adapted and arranged such that, during at least one period of time during charge and/or discharge thereof, an anisotropic force with a component normal to the active surface of an electrode within the electrochemical cell (e.g., an electrode comprising and/or formed from an article for inclusion in an electrochemical cell described elsewhere herein) is applied to the cell.

In some such cases, the anisotropic force comprises a component normal to an active surface of an electrode (e.g., an electrode comprising and/or formed from an article for inclusion in an electrochemical cell described elsewhere herein) within an electrochemical cell. As used herein, the term "active surface" is used to describe a surface of an electrode at which electrochemical reactions may take place. A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill will understand other examples of these terms, especially as applied within the description of this disclosure. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, in some cases distributed over the active surface of an electrode. In some embodiments, the anisotropic force is applied uniformly over the active surface of an electrode comprising and/or formed from an article for inclusion in an electrochemical cell described elsewhere herein.

Any of the electrochemical cell properties and/or performance metrics described herein may be achieved, alone or in combination with each other, while an anisotropic force is applied to the electrochemical cell (e.g., during charge and/or discharge of the cell). In some embodiments, an anisotropic force applied to an electrode (e.g., an electrode comprising and/or formed from an article for inclusion in an electrochemical cell described elsewhere herein) and/or to an electrochemical cell (e.g., during at least one period of time during charge and/or discharge of the cell) can include a component normal to an active surface of an electrode.

In some embodiments, the component of the anisotropic force that is normal to an active surface of an electrode (e.g., an electrode comprising and/or formed from an article for inclusion in an electrochemical cell described elsewhere herein) defines a pressure of greater than or equal to 1 $kgf/cm^2$, greater than or equal to 2 $kgf/cm^2$, greater than or equal to 4 $kgf/cm^2$, greater than or equal to 6 $kgf/cm^2$, greater than or equal to 7.5 $kgf/cm^2$, greater than or equal to 8 $kgf/cm^2$, greater than or equal to 10 $kgf/cm^2$, greater than or equal to 12 $kgf/cm^2$, greater than or equal to 14 $kgf/cm^2$, greater than or equal to 16 $kgf/cm^2$, greater than or equal to 18 $kgf/cm^2$, greater than or equal to 20 $kgf/cm^2$, greater than or equal to 22 $kgf/cm^2$, greater than or equal to 24 $kgf/cm^2$, greater than or equal to 26 $kgf/cm^2$, greater than or equal to 28 $kgf/cm^2$, greater than or equal to 30 $kgf/cm^2$, greater than or equal to 32 $kgf/cm^2$, greater than or equal to 34 $kgf/cm^2$, greater than or equal to 36 $kgf/cm^2$, greater than or equal to 38 $kgf/cm^2$, greater than or equal to 40 $kgf/cm^2$, greater than or equal to 42 $kgf/cm^2$, greater than or equal to 44 $kgf/cm^2$, greater than or equal to 46 $kgf/cm^2$, greater than or equal to 48 $kgf/cm^2$, or more. In some embodiments, the component of the anisotropic force normal to an active surface may, for example, define a pressure of less than or equal to 50 $kgf/cm^2$, less than or equal to 48 $kgf/cm^2$, less than or equal to 46 $kgf/cm^2$, less than or equal to 44 $kgf/cm^2$, less than or equal to 42 $kgf/cm^2$, less than or equal to 40 $kgf/cm^2$, less than or equal to 38 $kgf/cm^2$, less than or equal to 36 $kgf/cm^2$, less than or equal to 34 $kgf/cm^2$, less than or equal to 32 $kgf/cm^2$, less than or equal to 30 $kgf/cm^2$, less than or equal to 28 $kgf/cm^2$, less than or equal to 26 $kgf/cm^2$, less than or equal to 24 $kgf/cm^2$, less than or equal to 22 $kgf/cm^2$, less than or equal to 20 $kgf/cm^2$, less than or equal to 18 $kgf/cm^2$, less than or equal to 16 $kgf/cm^2$, less than or equal to 14 $kgf/cm^2$, less than or equal to 12 $kgf/cm^2$, less than or equal to 10 $kgf/cm^2$, less than or equal to 8 $kgf/cm^2$, less than or equal to 6 $kgf/cm^2$, less than or equal to 4 $kgf/cm^2$, less than or equal to 2 $kgf/cm^2$, or less. Combinations of the above-referenced ranges are also possible (e.g., greater than or equal to 1 $kgf/cm^2$ and less than or equal to 50 $kgf/cm^2$). Other ranges are possible.

Anisotropic forces applied during at least a portion of charge and/or discharge may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

EXAMPLE 1

This Example describes the formation of a variety of passivating layers by reacting a layer comprising lithium metal with $CO_2$ in a modular lithium deposition system, their chemical compositions, and their performance in electrochemical cells.

A modular lithium deposition system was employed to deposit a layer comprising lithium metal having a thickness of 25 microns onto a substrate. Then, the layer comprising lithium metal was exposed to a gas reactive with lithium to form a passivation layer disposed thereon.

Figure 22:
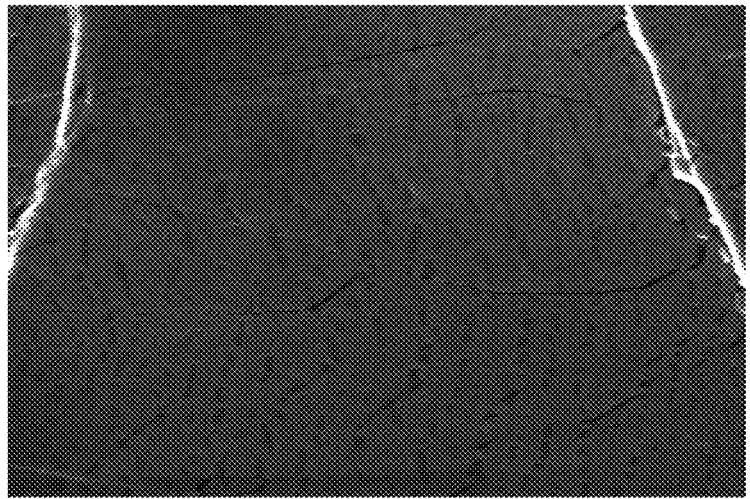
FIG. 22 is a micrograph of a layer comprising lithium, in accordance with some embodiments.
Figure 23:
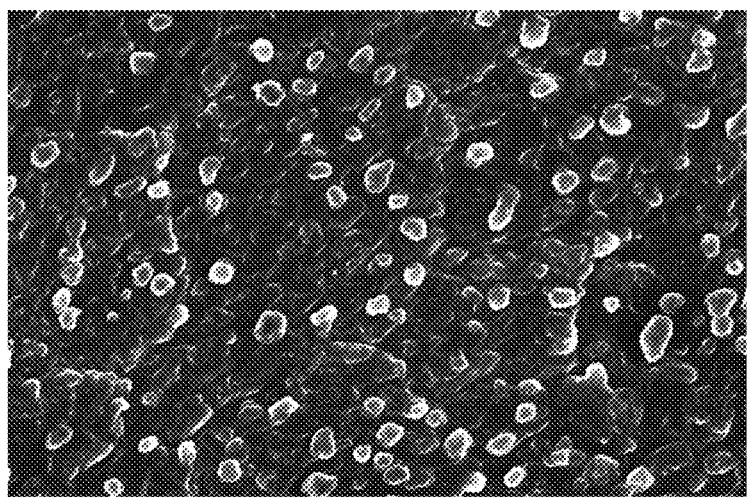
FIGS. 23-28 are micrographs of layers comprising lithium metal after exposure to $CO_2$, in accordance with some embodiments.
Figure 24:
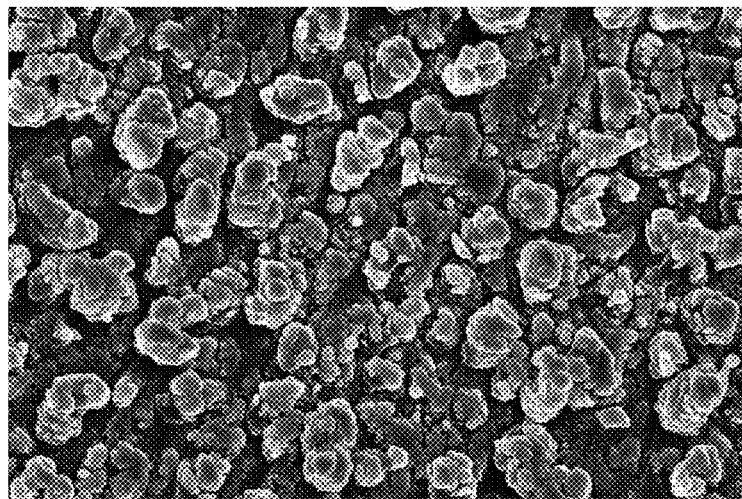
Figure 25:
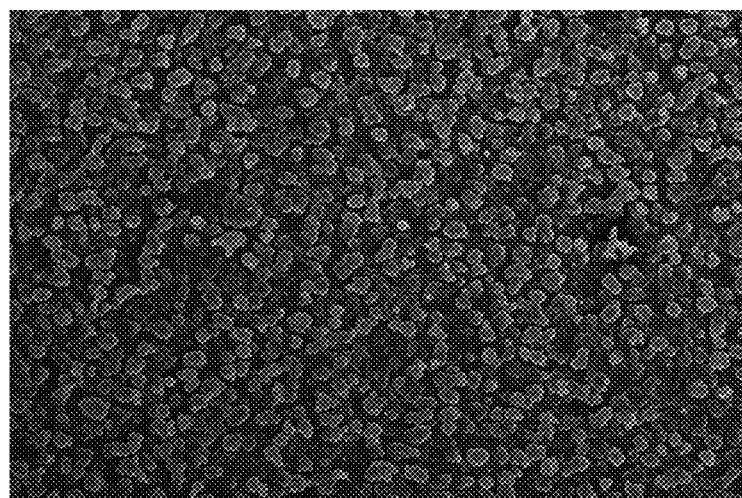
Figure 26:
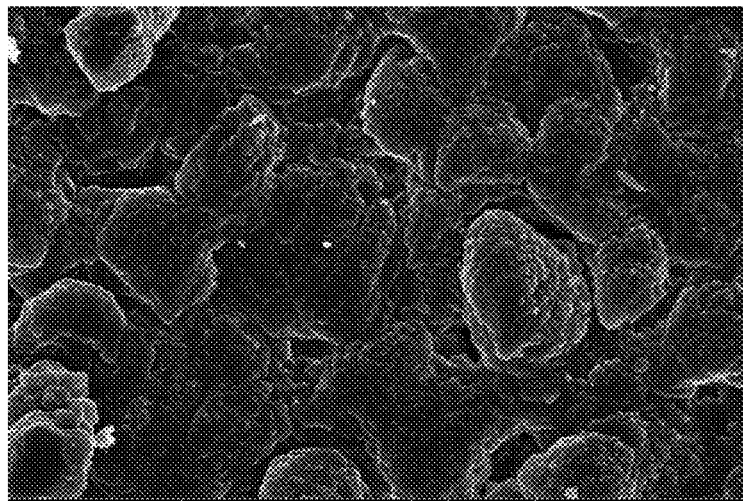
Figure 27:
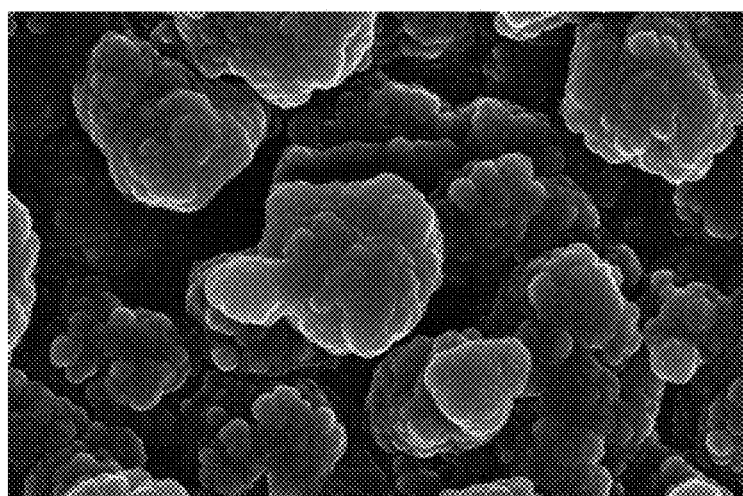

These layers are shown in FIGS. 22-28. FIG. 22 is a scanning electron micrograph of the layer comprising lithium metal prior to the formation of a passivating layer disposed thereon. FIGS. 23-24 are scanning electron micrographs of the layer comprising lithium metal after exposure to $CO_2$, which resulted in the formation of a passivating layer disposed thereon. The layer comprising lithium metal shown in FIG. 24 was exposed to a larger amount of $CO_2$ than the layer comprising lithium metal shown in FIG. 23. FIGS. 25-28 are scanning electron micrographs of additional layers comprising lithium metal that have been exposed to $CO_2$ to form passivating layers disposed thereon.

The chemical composition of both the surface and the bulk of the articles depicted in FIGS. 22-24 was determined by energy dispersive spectroscopy. The resultant plots are shown in FIGS. 29-34. Table 1, below, summarizes the data shown in these plots.

TABLE 1

Figure 28:
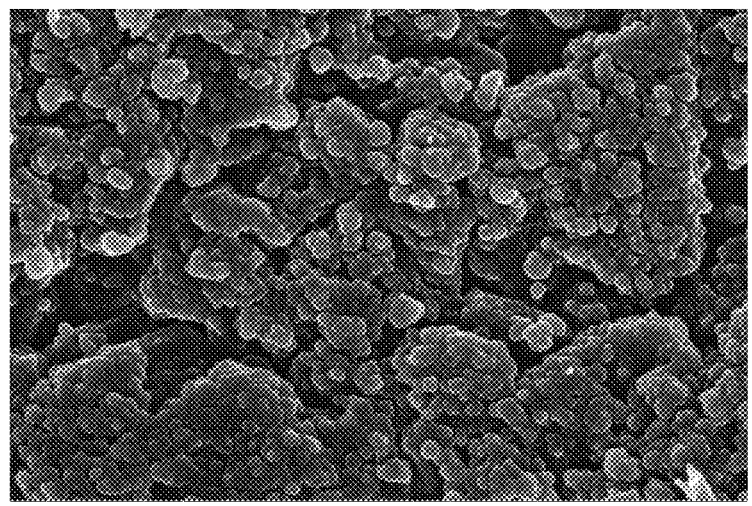
Figure 29:
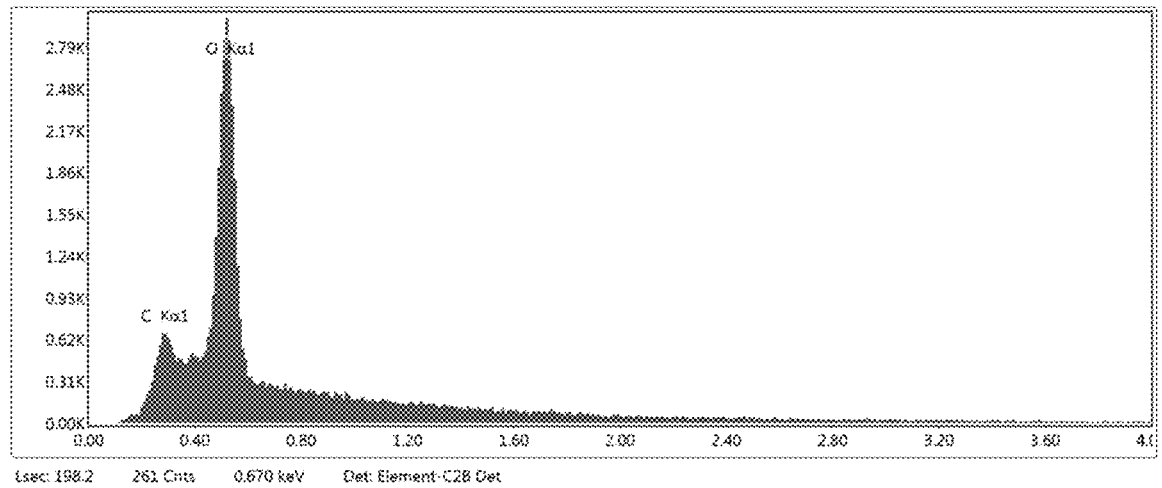
FIGS. 29-34 are plots showing the chemical composition of passivating layers, in accordance with some embodiments.
Figure 30:
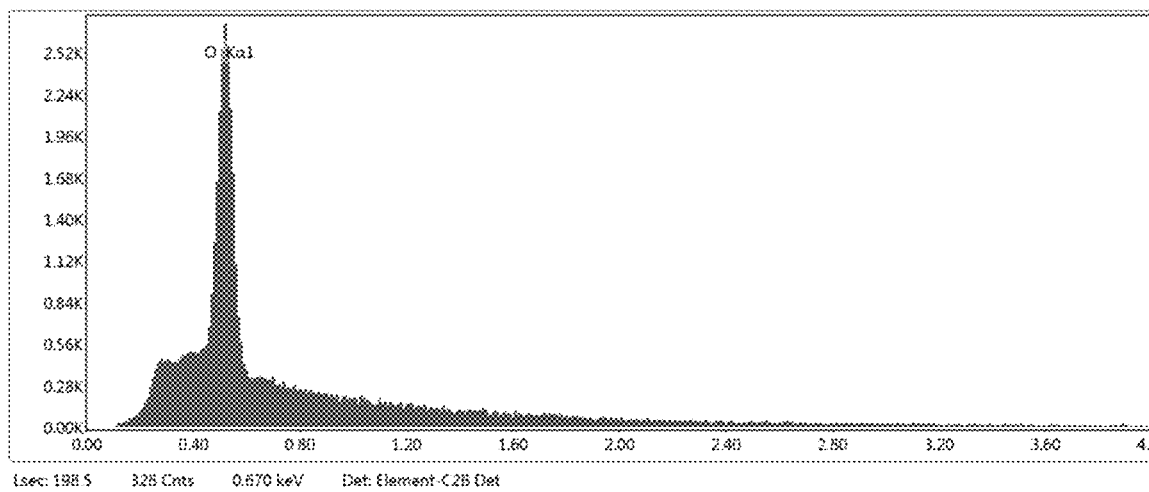
Figure 31:
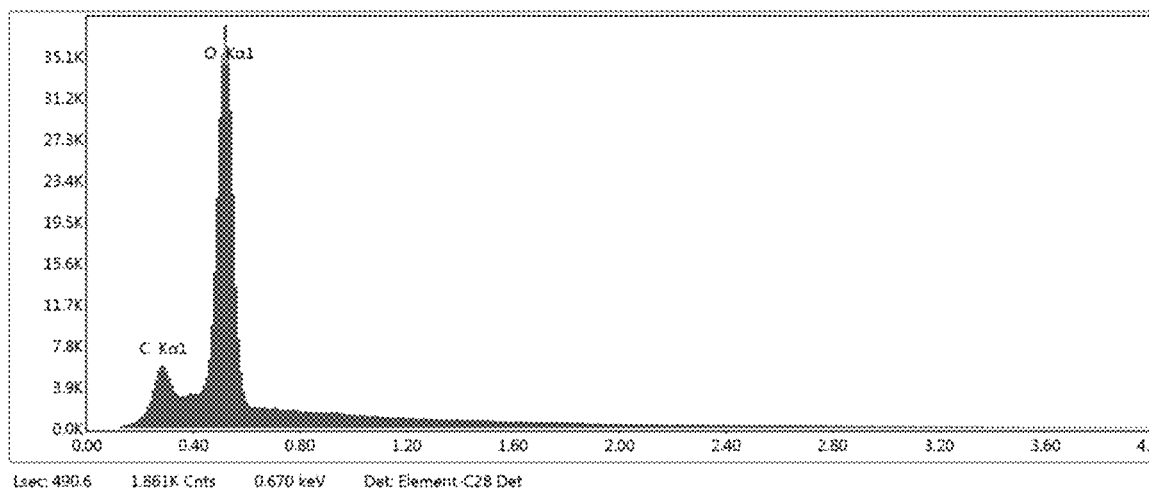
Figure 32:
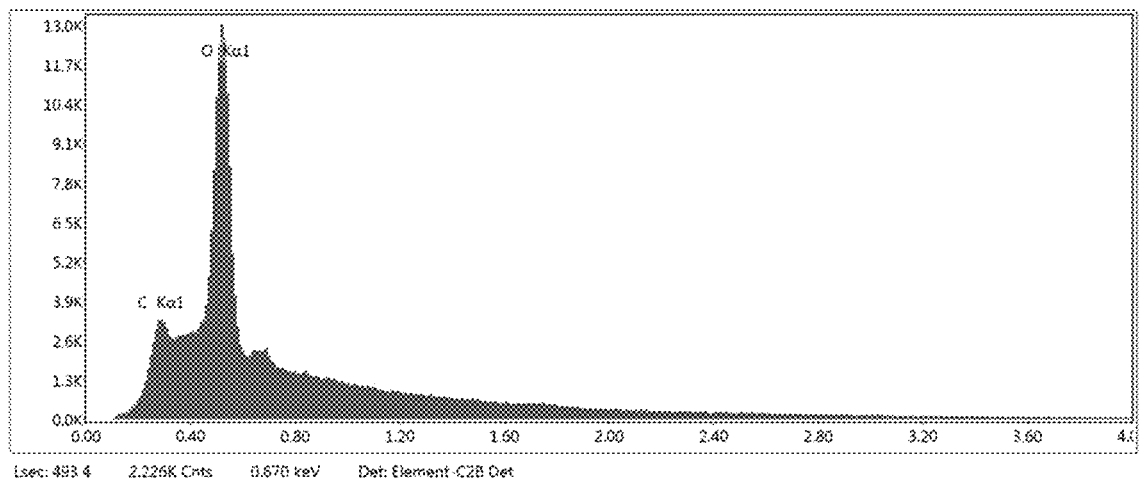
Figure 33:
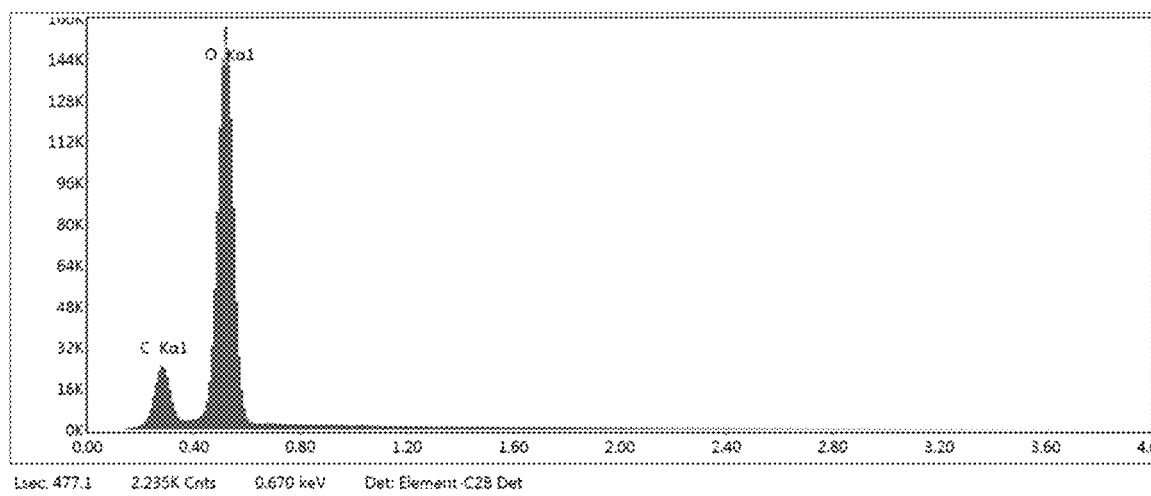
Figure 34:
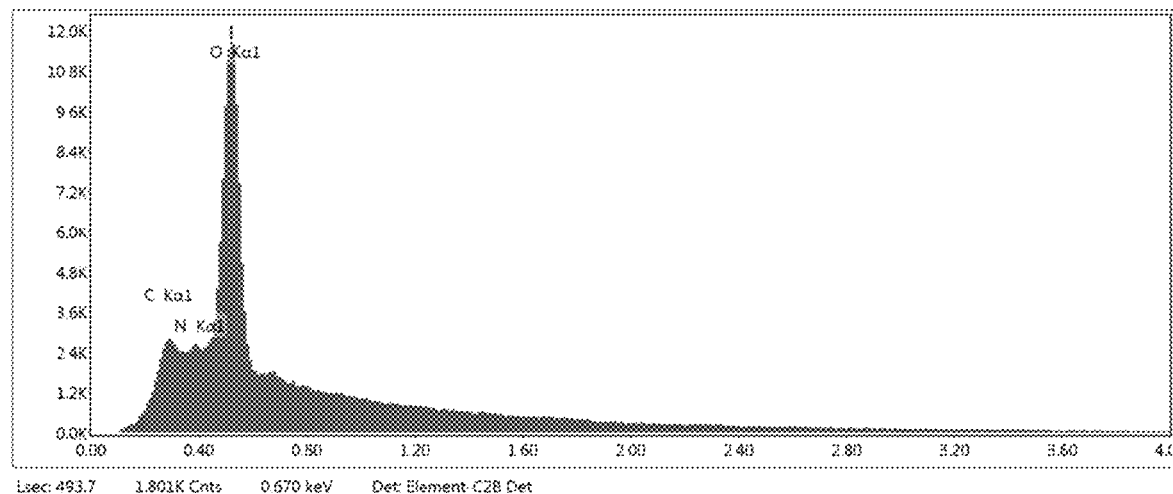

| FIG. Showing Measurement | Sample | Measurement Type | Element (Peak Type) | Wt % | At % | Error % |
|---|---|---|---|---|---|---|
| FIG. 28 | FIG. 21 | Surface | C (K) | 7.13 | 9.28 | 27.86 |
| FIG. 28 | FIG. 21 | Surface | O (K) | 92.87 | 99.6 | 2.14 |
| FIG. 29 | FIG. 21 | Bulk | O (K) | 199 | 100 | |
| FIG. 30 | FIG. 22 | Surface | C (K) | 7.39 | 9.61 | 27.78 |
| FIG. 30 | FIG. 22 | Surface | O (K) | 92.61 | 90.39 | 2.22 |
| FIG. 31 | FIG. 22 | Bulk | C (K) | 0.37 | 0.49 | 29.89 |
| FIG. 31 | FIG. 22 | Bulk | O (K) | 99.63 | 99.51 | 0.11 |
| FIG. 32 | FIG. 23 | Surface | C (K) | 15.16 | 19.22 | |
| FIG. 32 | FIG. 23 | Surface | O (K) | 84.84 | 80.78 | |
| FIG. 33 | FIG. 23 | Bulk | C (K) | 2.36 | 3.08 | 29.29 |
| FIG. 33 | FIG. 23 | Bulk | O (K) | 88.32 | 88.5 | 3.5 |
| FIG. 33 | FIG. 23 | Bulk | N (K) | 9.31 | 01.42 | 27.21 |

Figure 35:
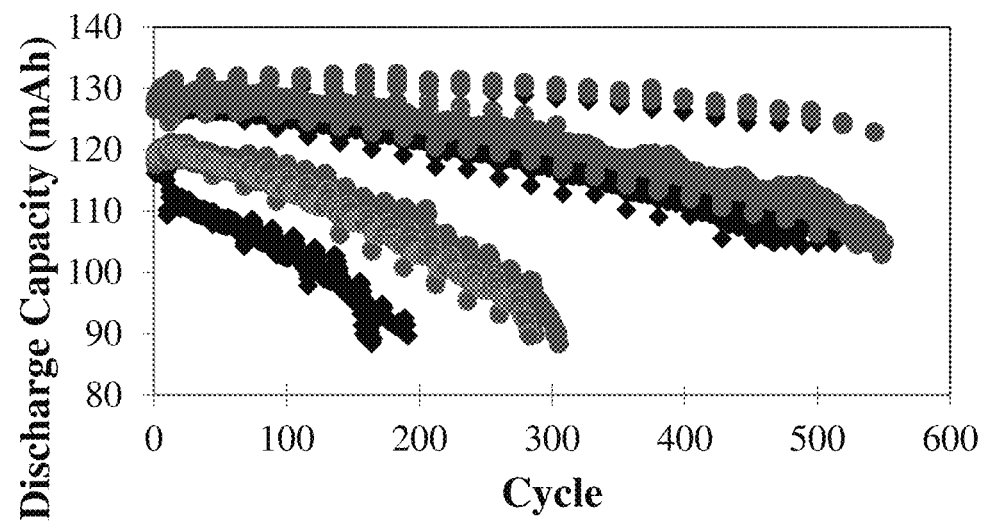
FIGS. 35-37 are plots showing discharge capacity as a function of cycle for electrochemical cells, in accordance with some embodiments.

The articles comprising a layer comprising lithium metal and a passivating layer disposed thereon were incorporated into electrochemical cells as the anodes therein. One set of electrochemical cells further comprised a lithium iron phosphate cathode and an electrolyte comprising ethylene carbonate. These electrochemical cells were cycled. FIG. 35 shows the discharge capacity as a function of cycle for these cells. In FIG. 35, data from the electrochemical cells including the layers comprising a lithium metal that had been exposed to a lower amount of $CO_2$ (e.g., having a morphology similar to that shown in FIG. 23) is shown by the black diamonds; data from the electrochemical cells including the layers comprising a lithium metal that had been exposed to a higher amount of $CO_2$ (e.g., having a morphology similar to that shown in FIG. 24) is shown by the gray circles. The upper set of data in FIG. 35 was obtained by cycling the electrochemical cells at a rate of 120 mA discharge and 30 mA recharge, and the lower set of data was obtained by cycling the electrochemical cells at a rate of 300 mA discharge and 75 mA recharge.

Figure 36:
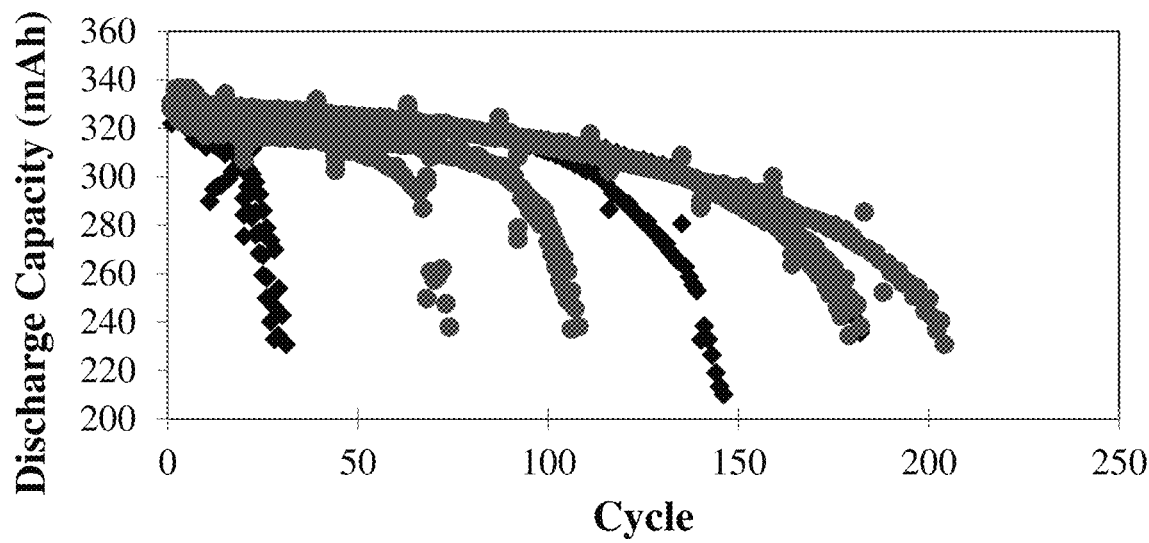

Another set of electrochemical cells further comprised a lithium cobalt oxide cathode and an ethylene carbonate electrolyte. These electrochemical cells were cycled, and FIG. 36 shows the discharge capacity as a function of cycle for these cells. Like in FIG. 35, data from the electrochemical cells including the layers comprising a lithium metal that had been exposed to a lower amount of $CO_2$ (e.g., having a morphology similar to that shown in FIG. 23) is shown by the black diamonds; data from the electrochemical cells including the layers comprising a lithium metal that had been exposed to a higher amount of $CO_2$ (e.g., having a morphology similar to that shown in FIG. 24) is shown by the gray circles. Also like in FIG. 35, the upper set of data for each type of electrochemical cell was obtained by cycling the electrochemical cells at a rate of 120 mA discharge and 30 mA recharge, and the lower set of data was obtained by cycling the electrochemical cells at a rate of 300 mA discharge and 75 mA recharge.

Figure 37:
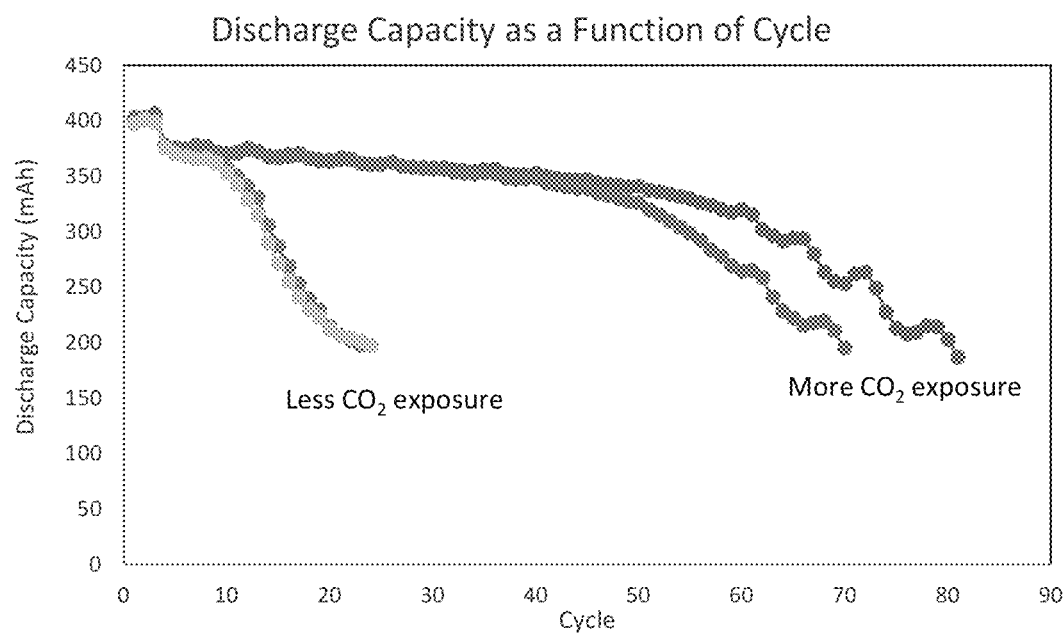
Figure 38:
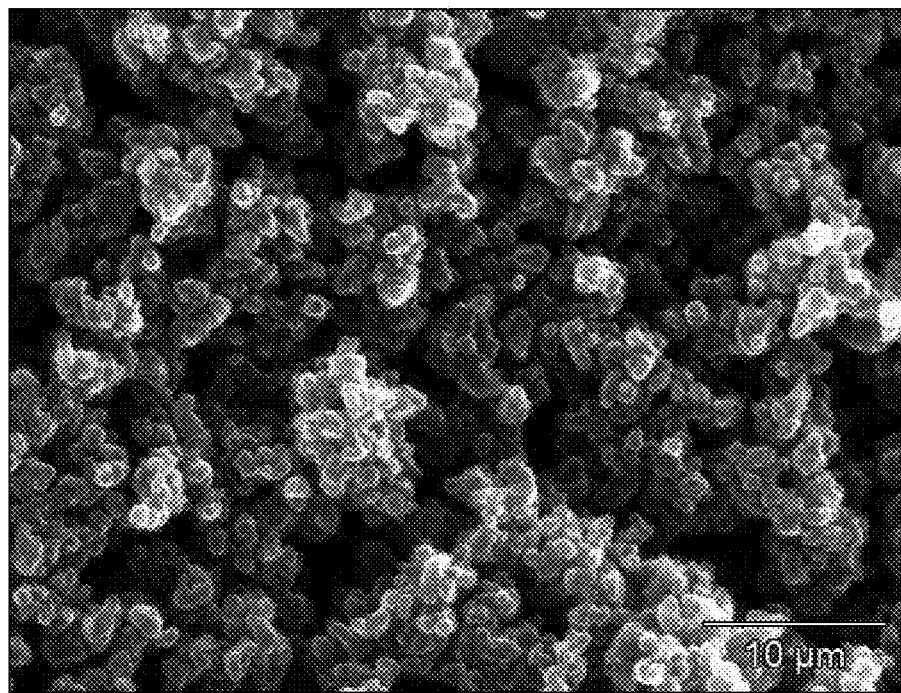
FIGS. 38-43 are micrographs of layers comprising lithium metal after exposure to $CO_2$, in accordance with some embodiments.
Figure 39:
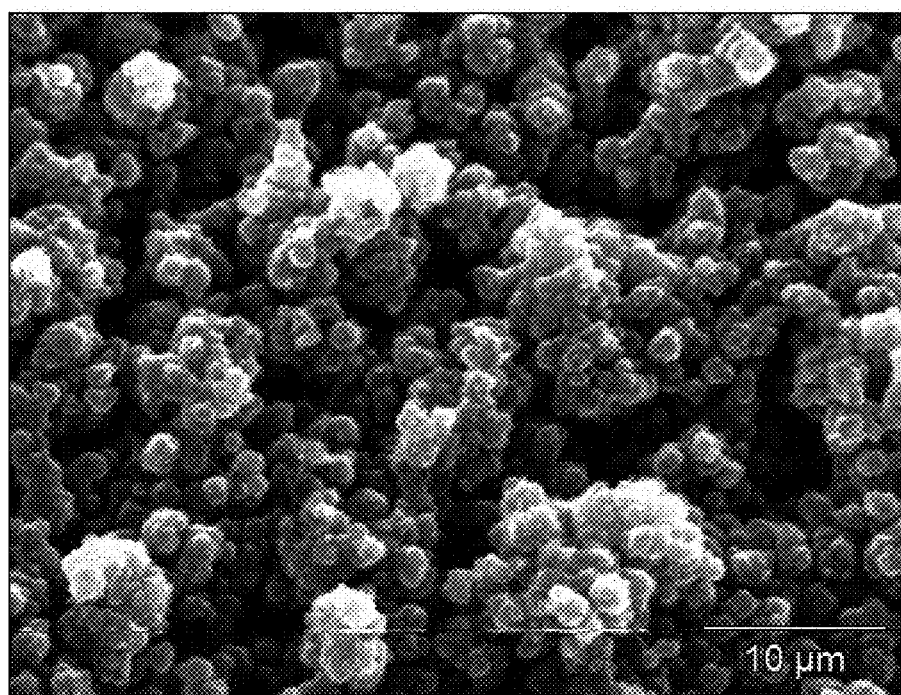
Figure 40:
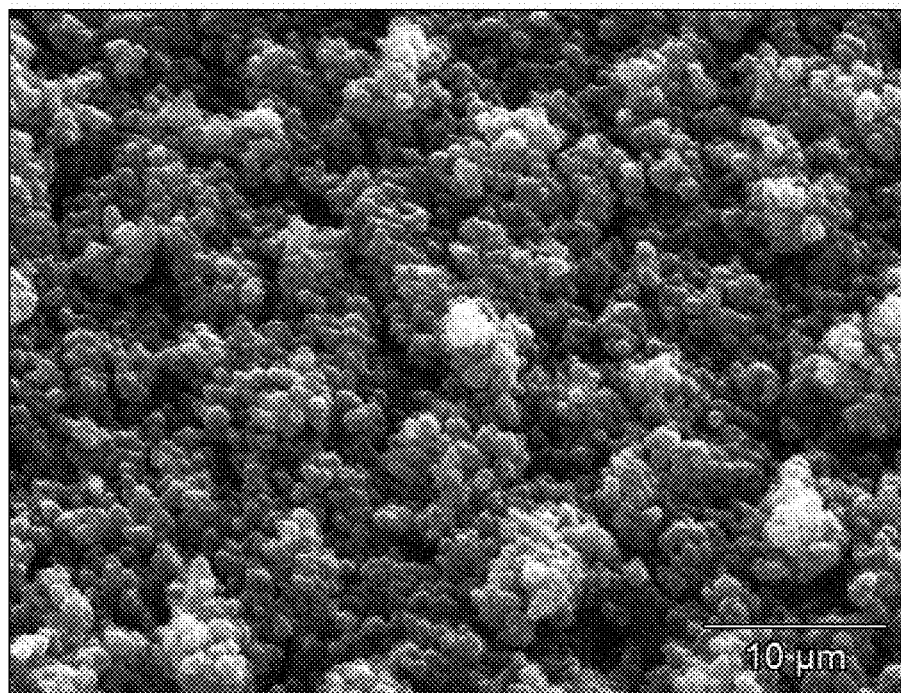
Figure 41:
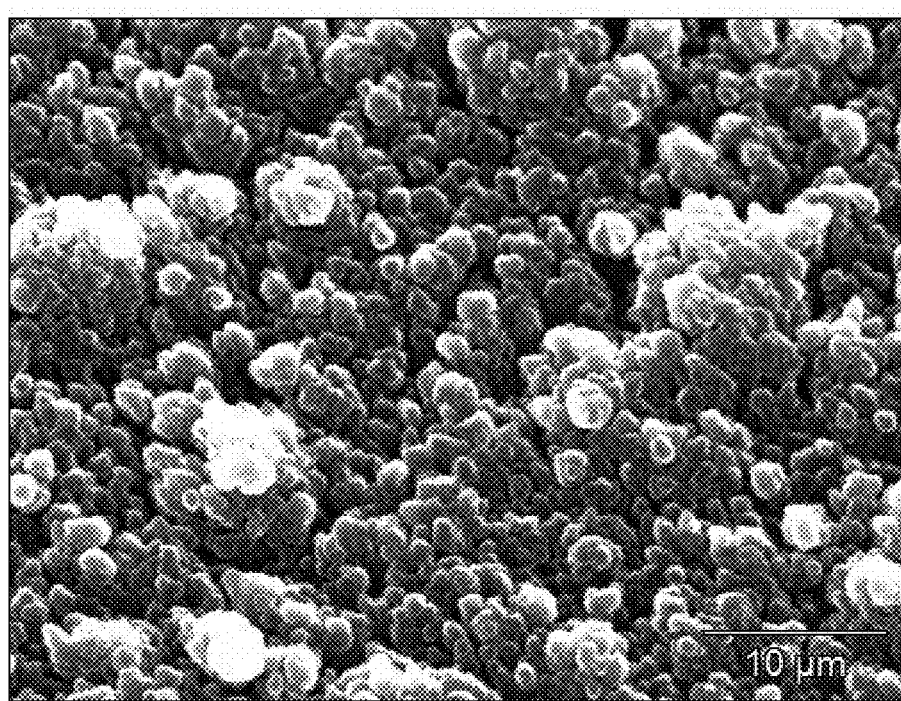

A third set of electrochemical cells further comprised a nickel cobalt manganese (NCM 622) cathode and an ethylene carbonate electrolyte. These electrochemical cells were cycled at a rate of 300 mA discharge and 100 mA recharge. FIG. 37 shows the discharge capacity as a function of cycle for these cells.

EXAMPLE 2

This Example describes the morphology of a variety of passivating layers formed by reacting a layer comprising lithium metal with $CO_2$ in a modular lithium deposition system.

Figure 42:
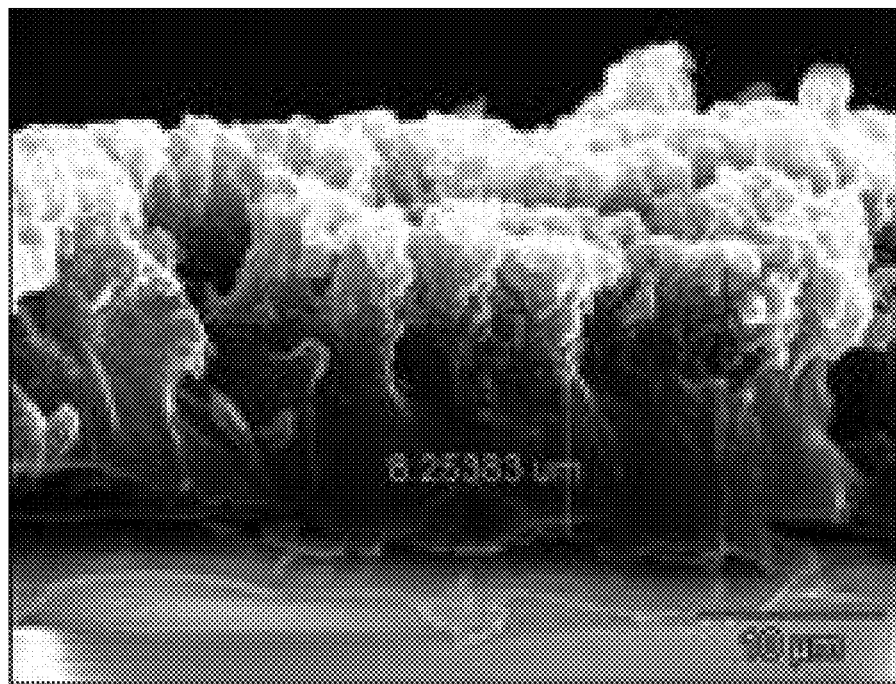
Figure 43:
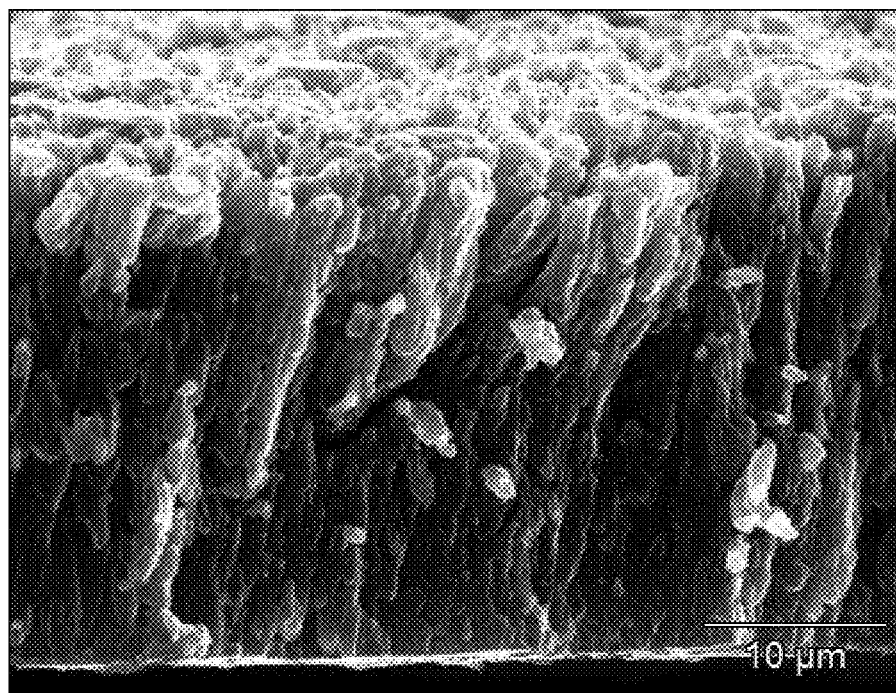

A series of passivating layers were formed by reacting a layer comprising lithium metal with varying amounts of $CO_2$. FIGS. 38-41 are scanning electron micrographs of a series of such passivating layers in order of increasing $CO_2$ exposure. FIGS. 42 and 43 show further examples of passivating layers formed by reacting a layer comprising lithium metal with $CO_2$.

EXAMPLE 3

This Example describes the morphology of a variety of passivating layers formed by reacting a layer comprising lithium metal with a variety of gases in a modular lithium deposition system.

Figure 44:
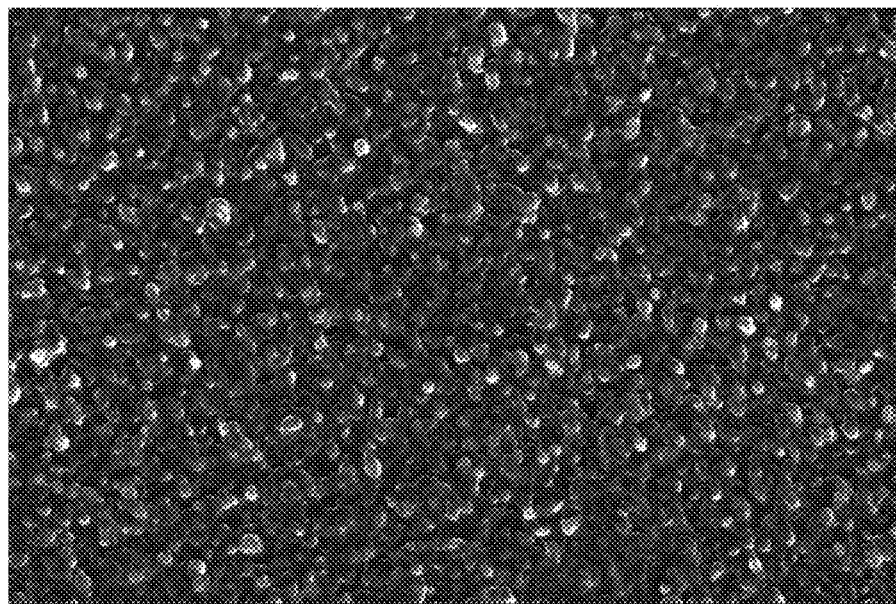
FIGS. 44-45 are micrographs of layers comprising lithium metal exposed to $SO_2$, in accordance with some embodiments.
Figure 45:
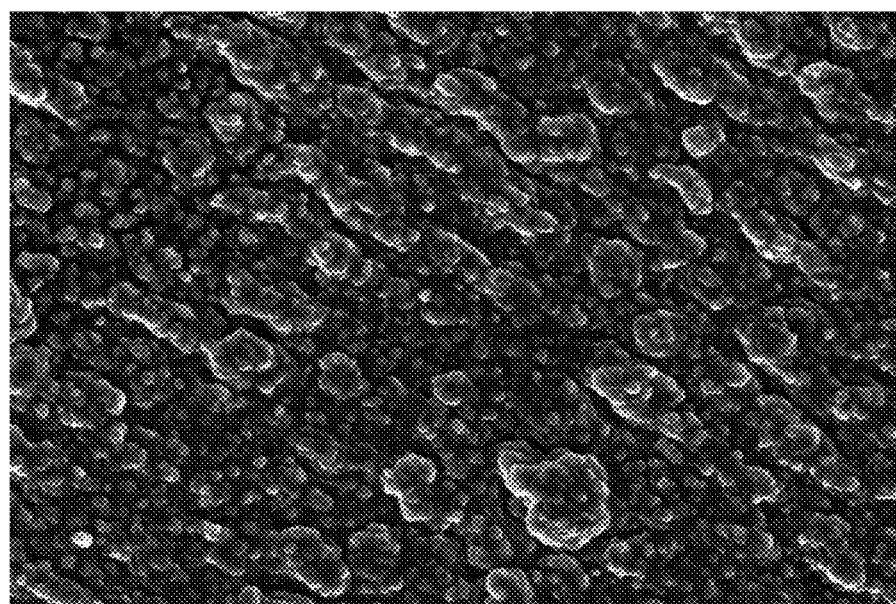
Figure 46:
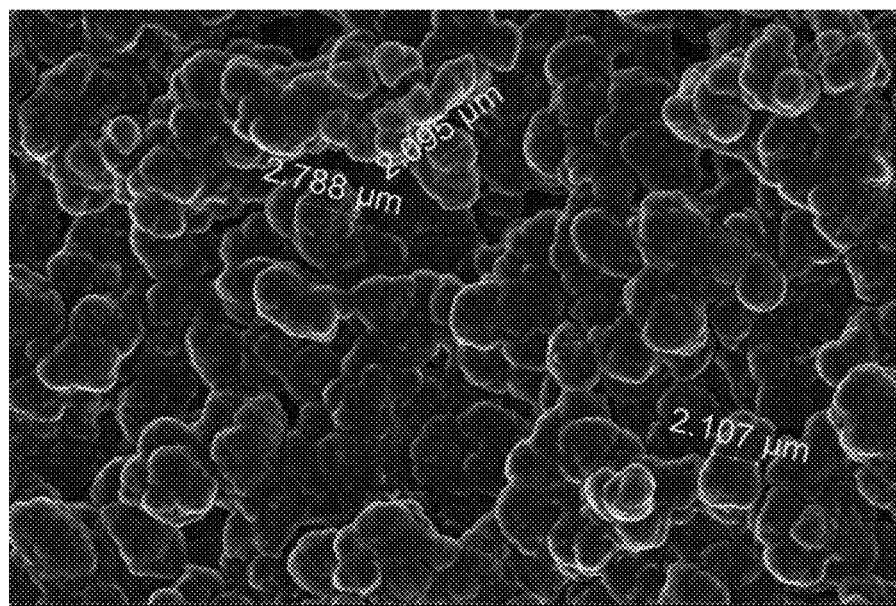
FIGS. 46-47 are micrographs of layers comprising lithium metal exposed to COS, in accordance with some embodiments.
Figure 47:
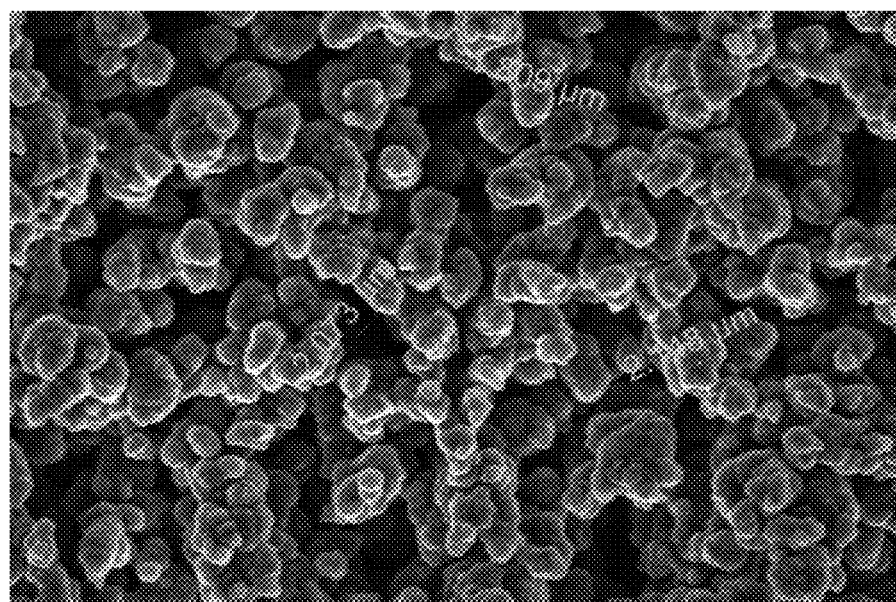
Figure 48:
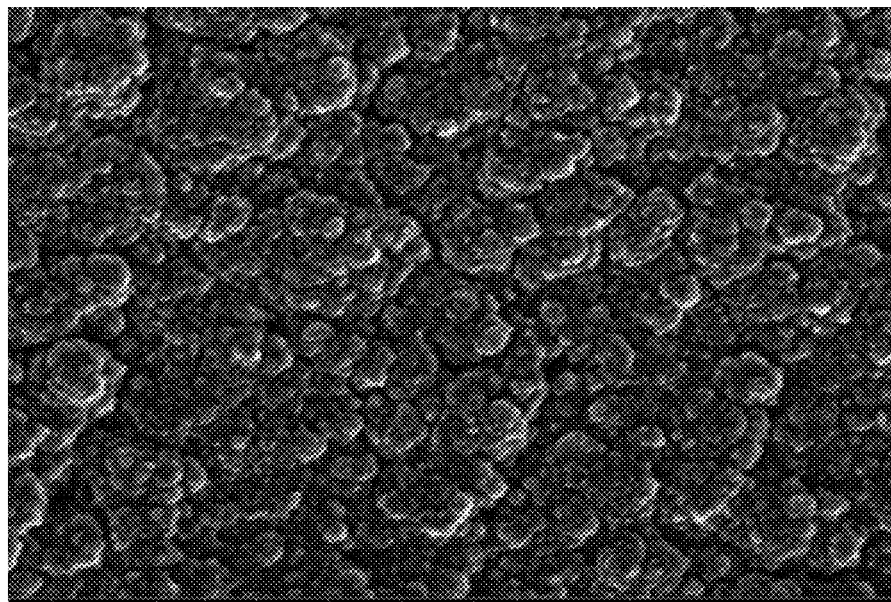
FIG. 48 is micrograph of a layer comprising lithium metal exposed to $SF_6$, in accordance with some embodiments.
Figure 49:
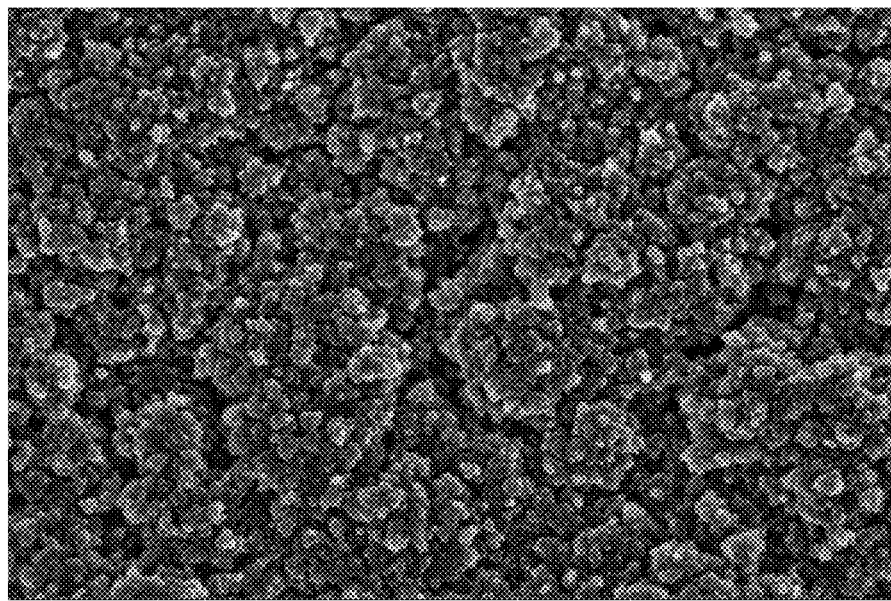
FIG. 49 is a micrograph of a layer comprising lithium metal exposed to acetylene, in accordance with some embodiments.

A layer comprising lithium metal was reacted with a variety of different gases. FIGS. 44 and 45 are scanning electron micrographs of a layer comprising lithium metal exposed to $SO_2$ (the article shown in FIG. 45 was exposed to more $SO_2$ than the article shown in FIG. 44). FIGS. 46 and 47 are scanning electron micrographs of a layer comprising lithium metal exposed to COS (the article shown in FIG. 47 was exposed to more COS than the article shown in FIG. 46). FIG. 48 is a scanning electron micrograph of a layer comprising lithium metal exposed to $SF_6$. FIG. 49 is a scanning electron micrograph of a layer comprising lithium metal exposed to acetylene.

EXAMPLE 4

This Example describes the morphology of a variety of passivating layers formed by depositing a layer from a mixture of a gas comprising lithium metal and a gas reactive with lithium metal to form a single layer comprising both lithium metal and a ceramic passivating the lithium metal.

Figure 50:
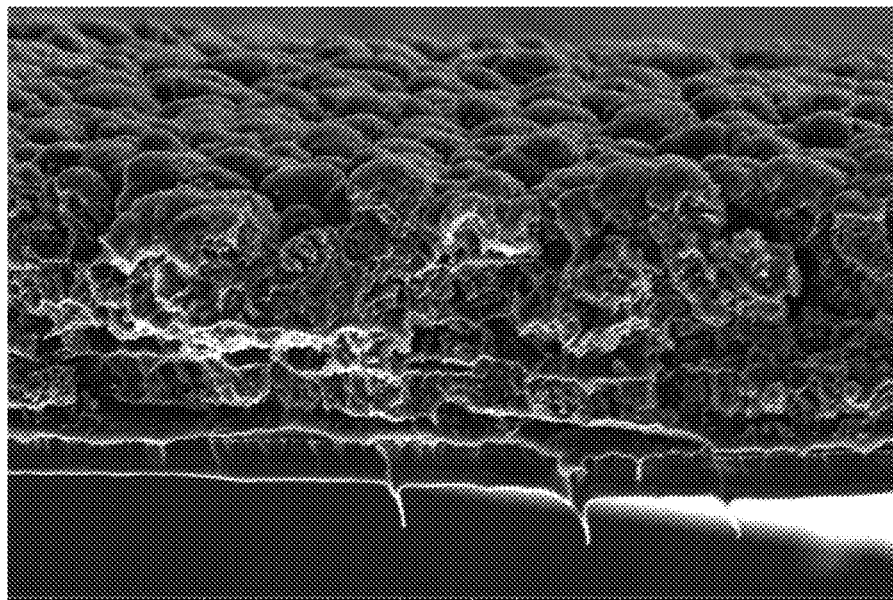
FIGS. 50-53 are micrographs of a layer formed from gaseous lithium metal and gaseous $CO_2$, in accordance with some embodiments.
Figure 51:
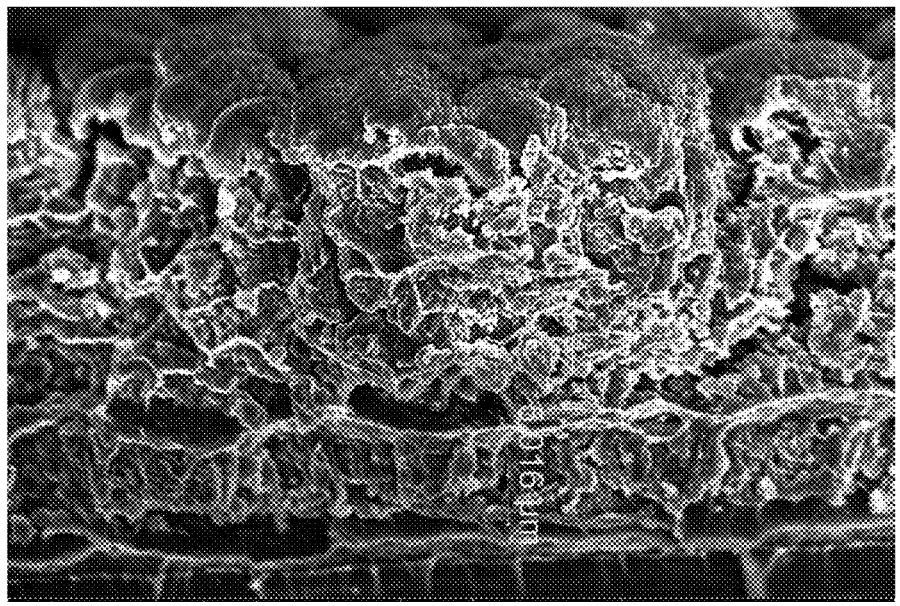
Figure 52:
Figure 53:
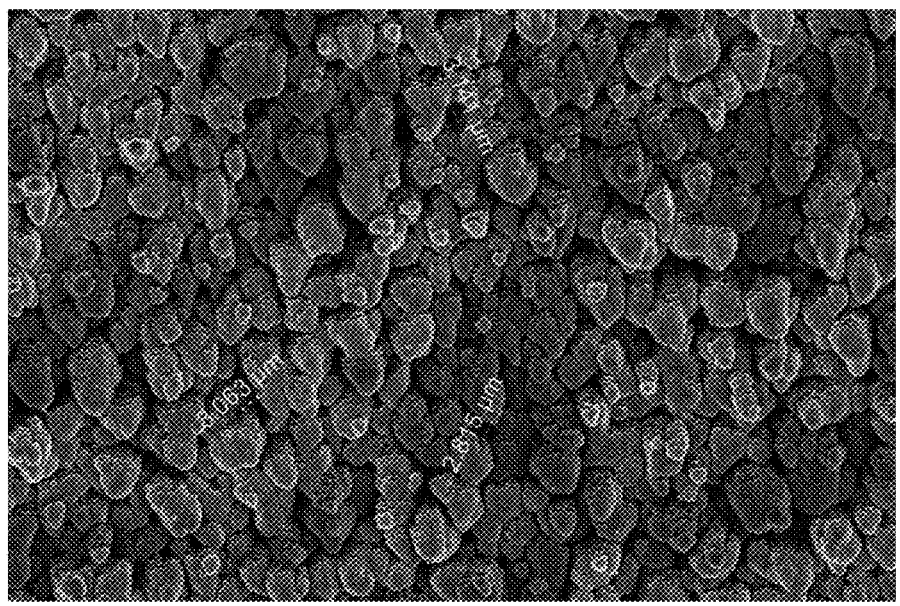

In a first experiment, gaseous lithium metal and $CO_2$ were introduced together into a module in a modular lithium deposition system to form a layer comprising both lithium metal and a ceramic formed by the reaction of lithium metal with $CO_2$. FIGS. 50-51 show side views of the resultant layer and FIGS. 52-53 show top views.

Figure 54:
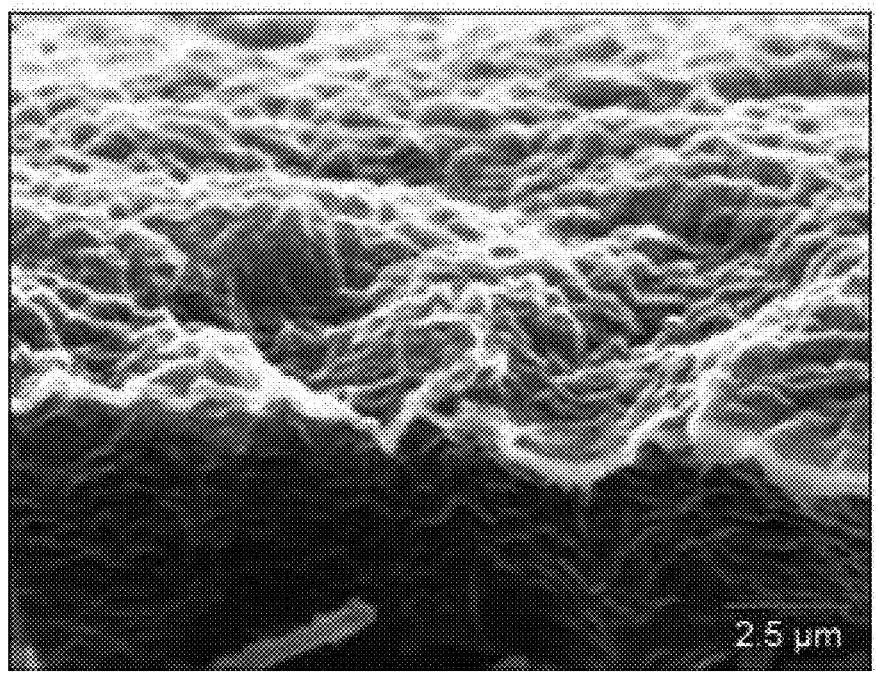
FIGS. 54-56 are micrographs of a layer formed from gaseous lithium metal and gaseous $CO_2$ in the presence of argon, in accordance with some embodiments.
Figure 55:
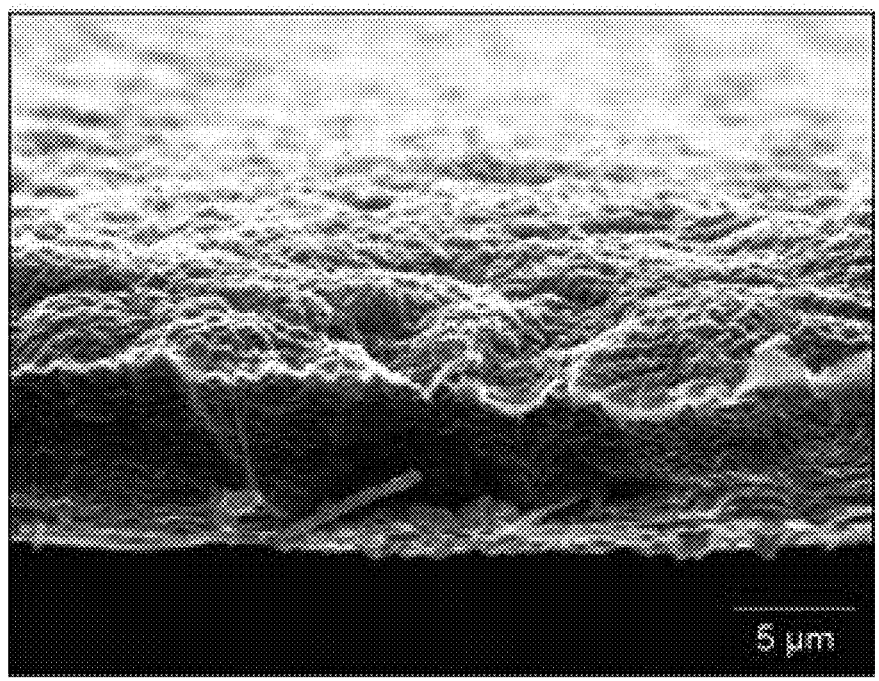
Figure 56:
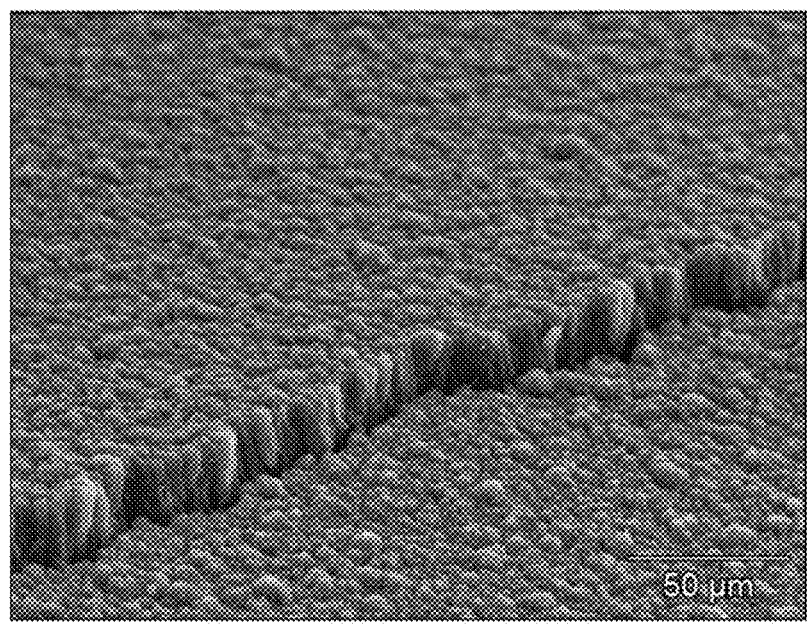

In a second experiment, gaseous lithium metal, $CO_2$, and argon were introduced together into a module in a modular lithium deposition system to form a layer comprising both lithium metal and a ceramic formed by the reaction of lithium metal with $CO_2$. FIGS. 54-55 show side views of the resultant layer and FIG. 56 shows a top view.

EXAMPLE 5

This Example shows several specific configurations of a modular lithium deposition system that may have particular utility.

Figure 57:
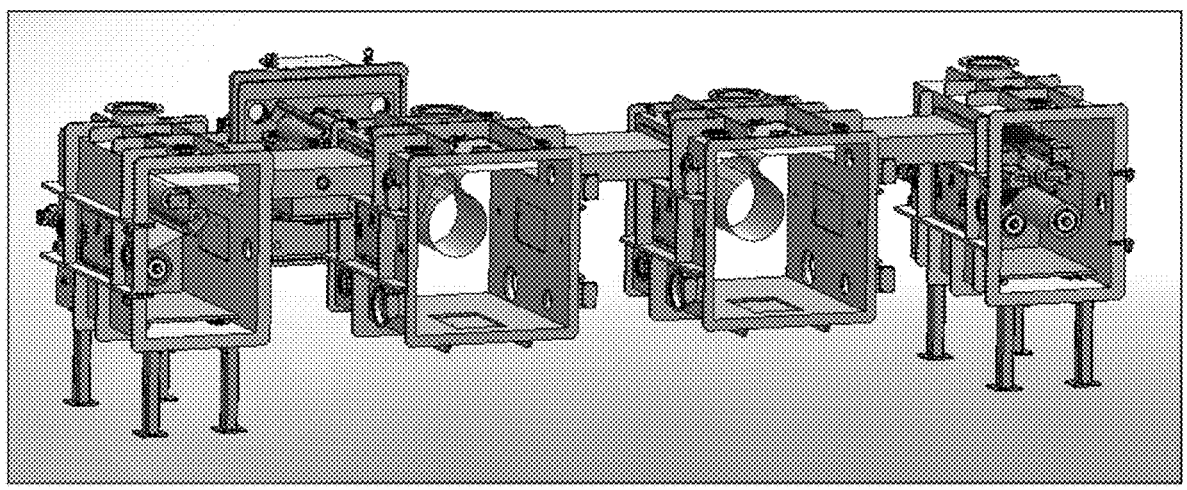
FIGS. 57-59 are schematic depictions of modular lithium deposition systems, in accordance with some embodiments.
Figure 58:
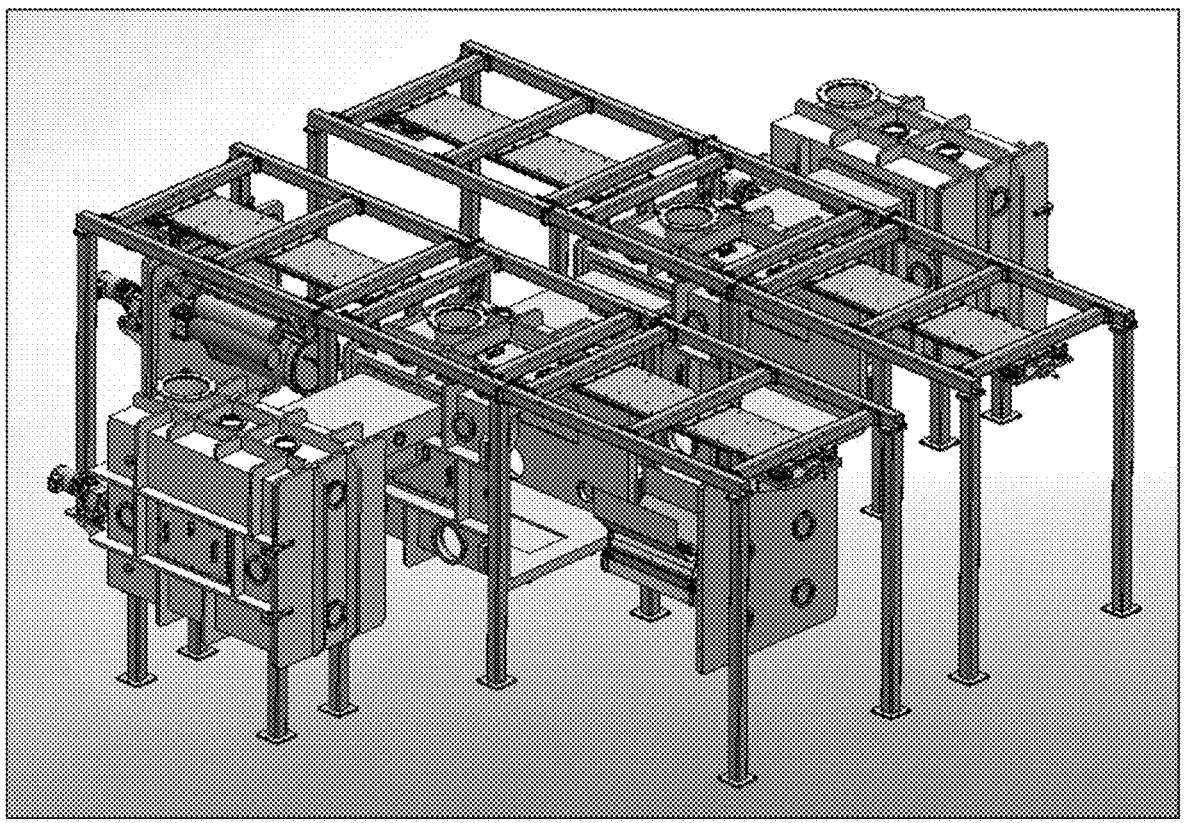

FIG. 57 shows a cross-section of one example of a modular lithium deposition system comprising three modules, which are, in order from left to right: a chamber in which a substrate is configured to be unwound from a roll, two vacuum chambers in which one or more layers may be deposited, and a chamber in which the substrate is configured to be wound around a roll. FIG. 58 shows an exploded view of this same modular lithium deposition system.

Figure 59:
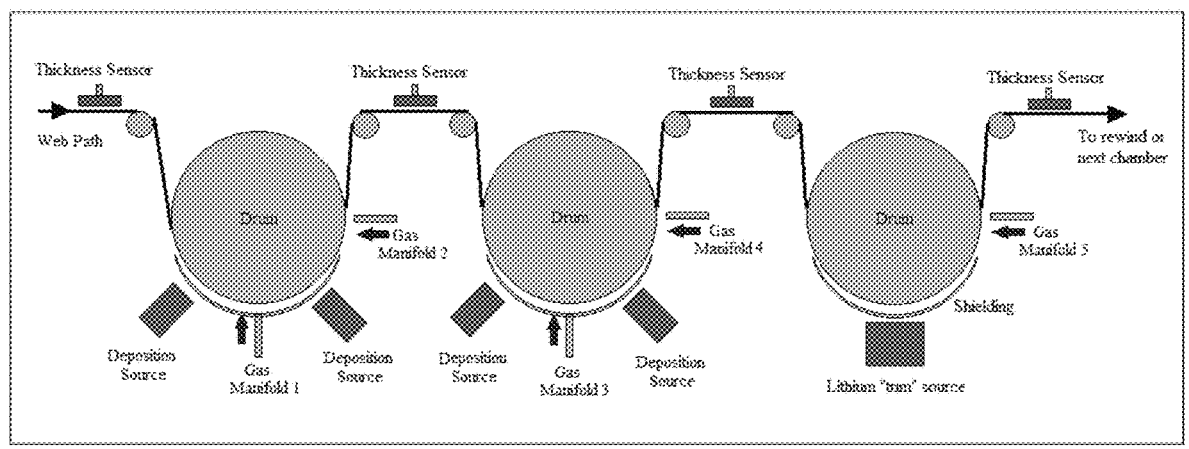

FIG. 59 shows one possible arrangement of a plurality of drums, sources of lithium metal (referred to as "deposition sources" and "lithium 'trim' sources"), sources of gas (referred to as "gas manifolds"), and thickness sensors.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A modular lithium deposition system, comprising:
   a first module;
   a second module;
   a lithium source; and
   a roll-to-roll handling system passing through the first module and the second module,
   wherein the first and second modules are configured to be reversibly placed in fluidic communication with each other via a component positioned therebetween that may be opened and closed,
   wherein each of the first and second modules is configured to deposit a material onto a substrate and/or is configured to perform a reaction on an article therein,
   wherein the first module comprises a first port for introducing a heated gas thereinto,
   wherein the first module comprises a second port for introducing a cooled gas thereinto, and
   wherein the first module comprises a shield positioned between the substrate and the first port but not between the substrate and the second port.

2. A modular lithium deposition system as in claim 1, wherein the first module and/or the second module comprises a vacuum chamber.

3. A modular lithium deposition system as in claim 1, wherein the roll-to-roll handling system comprises a plurality of drums configured to translate the substrate through a plurality of vacuum chambers positioned in the first and second modules.

4. A modular lithium deposition system as in claim 3, wherein the substrate comprises a polymer.

5. A modular lithium deposition system as in claim 2, wherein the vacuum chamber is configured to be held at a pressure of less than or equal to $10^{-6}$ Torr and greater than or equal to $10^{-7}$ Torr.

6. A modular lithium deposition system as in claim 1, wherein the modular lithium deposition system further comprises a vacuum chamber comprising electrodes configured to generate an oxygen plasma by applying a high frequency voltage to oxygen gas.

7. A modular lithium deposition system as in claim 1, wherein the cooled gas is an inert gas.

8. A modular lithium deposition system as in claim 1, wherein the modular lithium deposition system comprises a source of gas reactive with lithium metal.

9. A modular lithium deposition system as in claim 8, wherein gas supplied by the source of the gas reactive with lithium metal is positioned to react with lithium metal gas supplied by the lithium source to form a passivation layer disposed on the substrate, wherein the passivation layer comprises lithium and a reaction product of lithium metal with the gas reactive with lithium metal.

10. A modular lithium deposition system as in claim 8, wherein gas supplied by the source of gas reactive with lithium metal is positioned to react with a lithium metal layer deposited on the substrate to form a passivation layer disposed on the lithium metal layer, wherein the passivation layer comprises a reaction product of lithium metal with the gas reactive with lithium metal disposed on the lithium metal layer.

11. A modular lithium deposition system as in claim 1, wherein the modular lithium deposition system comprises a drum, and wherein the shield is positioned proximate the drum.

12. A modular lithium deposition system as in claim 1, wherein the first port is in fluidic communication with the lithium source.

13. A modular lithium deposition system as in claim 2, wherein the vacuum chamber further comprises one or more sensors.

14. A modular lithium deposition system as in claim 13, wherein the one or more sensors comprise a conductivity sensor, an optical sensor, a capacitance sensor, and/or a thickness sensor.

15. A modular lithium deposition system as in claim 1, wherein the modular lithium deposition system comprises a container for lithium metal in thermal communication with a heating system.

16. A modular lithium deposition as in claim 1, wherein the first module is different from the second module.

17. A modular lithium deposition as in claim 1, wherein the first module and the second module are of a same type.

18. A modular lithium deposition system as in claim 1, wherein first port is in fluidic communication a source of a species reactive with lithium metal.

* * * * *